(12) United States Patent
Nagao et al.

(10) Patent No.: US 12,540,456 B2
(45) Date of Patent: Feb. 3, 2026

(54) WORK VEHICLE AND WORK VEHICLE SPEED CONTROL METHOD

(71) Applicant: KUBOTA CORPORATION, Osaka (JP)

(72) Inventors: Kohei Nagao, Sakai (JP); Ryota Hamamoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 207 days.

(21) Appl. No.: 18/366,677

(22) Filed: Aug. 8, 2023

(65) Prior Publication Data

US 2024/0060274 A1 Feb. 22, 2024

(30) Foreign Application Priority Data

Aug. 22, 2022 (JP) .................................. 2022-131895

(51) Int. Cl.
*E02F 9/22* (2006.01)

(52) U.S. Cl.
CPC .......... *E02F 9/2296* (2013.01); *E02F 9/2228* (2013.01); *E02F 9/2285* (2013.01)

(58) Field of Classification Search
CPC ..... E02F 9/2296; E02F 9/2228; E02F 9/2285; E02F 9/2253
See application file for complete search history.

(56) References Cited

U.S. PATENT DOCUMENTS

| | | | |
|---|---|---|---|
| 2012/0205912 A1* | 8/2012 | Wakasa ................. | F03D 7/0284 290/44 |
| 2015/0367851 A1* | 12/2015 | Yoshizawa ............... | B60K 6/54 701/48 |
| 2017/0241448 A1* | 8/2017 | Kondo .................... | F16H 59/36 |

(Continued)

FOREIGN PATENT DOCUMENTS

| JP | 5687971 B2 | 2/2013 |
|---|---|---|
| JP | 2016108762 A * | 6/2016 |

(Continued)

OTHER PUBLICATIONS

English Translation (JP-2016108762-A) (Year: 2025).*
Japanese Office Action for corresponding JP Application No. 2022-131895, Oct. 14, 2025 (w/ English machine translation).

*Primary Examiner* — Erin M Piateski
*Assistant Examiner* — Eisen Yim
(74) *Attorney, Agent, or Firm* — MORI & WARD, LLP

(57) ABSTRACT

A speed control method for a work vehicle, includes driving an engine to rotate a first hydraulic pump provided in the work vehicle. Hydraulic fluid from the first hydraulic pump is supplied to a first hydraulic motor to rotate the first hydraulic motor to drive a first traveling device provided in a vehicle body of the work vehicle. A rotational speed of the first hydraulic motor is detected. Feedback control with respect to the engine and a control valve configured to control a pilot pressure of the first hydraulic pump is performed. The feedback control being performed to reduce a speed difference between the rotational speed detected and (Continued)

a target rotational speed of the first hydraulic motor corresponding to a target vehicle speed. A feedback gain of the feedback control is set based on a first coefficient which becomes larger as the target rotational speed becomes lower.

13 Claims, 24 Drawing Sheets

(56) References Cited

U.S. PATENT DOCUMENTS

| | | | | |
|---|---|---|---|---|
| 2019/0145083 A1* | 5/2019 | Rausch | ............... | E02F 3/431 |
| | | | | 60/327 |
| 2020/0021218 A1* | 1/2020 | Otake | ............... | H02M 7/44 |
| 2020/0240113 A1* | 7/2020 | Fukuda | ............... | F16H 61/40 |
| 2022/0224268 A1* | 7/2022 | Saeki | ............... | H02P 21/141 |
| 2023/0099135 A1* | 3/2023 | Hijikata | ............ | E02F 9/2217 |
| | | | | 60/325 |

FOREIGN PATENT DOCUMENTS

| | | |
|---|---|---|
| JP | 2017-053413 | 3/2017 |
| JP | 2017-067100 | 4/2017 |
| JP | 6695791 B2 | 7/2018 |
| JP | 2020-038002 | 3/2020 |
| JP | 2021-067146 | 4/2021 |
| WO | WO 2015/097900 | 7/2015 |

\* cited by examiner

WORK VEHICLE AND WORK VEHICLE SPEED CONTROL METHOD

CROSS-REFERENCE TO RELATED APPLICATIONS

The present application claims priority under 35 U. S. C. § 119 to Japanese Patent Application No. 2022-131895, filed Aug. 22, 2022. The contents of this application are incorporated herein by reference in their entirety.

BACKGROUND OF THE INVENTION

Field of the Invention

The present invention relates to a work vehicle and a speed control method for the work vehicle.

Discussion of the Background

Japanese Patent Application Laid-Open No. 2017-053413 discloses a technique of measuring an input of a travel lever and a rotational speed of a travel motor and adjusting a pilot pressure of a travel pump so that the rotational speed of the travel motor matches a command based on the input of the travel lever. Japanese Patent Application Laid-Open No. 2020-038002 discloses a method of detecting a primary pressure of pilot oil supplied to a remote control valve and a rotational speed of a travel motor, and controlling the primary pressure to achieve a target vehicle speed based on the detected primary pressure and rotation speed.

SUMMARY OF THE INVENTION

According to one aspect of the present invention, a speed control method for a work vehicle includes driving an engine to rotate a first hydraulic pump provided in the work vehicle, supplying hydraulic fluid from the first hydraulic pump to a first hydraulic motor to rotate the first hydraulic motor to drive a first traveling device provided in the vehicle body of the work vehicle, detecting a rotational speed of the first hydraulic motor, performing feedback control with respect to the engine and a control valve configured to control a pilot pressure of the first hydraulic pump, the feedback control being performed to reduce a speed difference between the rotational speed detected and a target rotational speed of the first hydraulic motor corresponding to a target vehicle speed; and setting a feedback gain of the feedback control based on a first coefficient which becomes larger as the target rotational speed becomes lower.

According to another aspect of the present invention, a speed control method for a work vehicle includes driving an engine to rotate a first hydraulic pump, supplying hydraulic fluid from the first hydraulic pump to a first hydraulic motor to drive a first traveling device provided in the vehicle body, detecting a first differential pressure of the first hydraulic motor, detecting a rotational speed of the first hydraulic motor, performing feedback control with respect to at least one of the engine and the control valve configured to control a pilot pressure of the first hydraulic pressure pump, the feedback control being performed to reduce a speed difference between the rotational speed detected and a target rotational speed of the first hydraulic motor corresponding to a target vehicle speed, and setting a feedback gain of the feedback control based on a second coefficient which becomes larger as the first differential pressure detected becomes larger.

According to further aspect of the present invention, a work vehicle includes a vehicle body, a first hydraulic motor configured to drive a first traveling device provided in the vehicle body, a first hydraulic pump configured to supply hydraulic fluid to the first hydraulic motor, an engine configured to drive the first hydraulic pump, a first rotational speed sensor configured to detect a rotational speed of the first hydraulic motor, and a control circuitry configured to perform feedback control with respect to at least one of the engine and a control valve configured to control a pilot pressure of the first hydraulic pump, the feedback control being performed to reduce a difference between a target rotational speed of the first hydraulic motor corresponding to a target vehicle speed and the target rotational speed detected. The control circuitry determines a feedback gain of the feedback control based on a first coefficient that increases as the target rotational speed decreases.

According to the other aspect of the present invention, a work vehicle includes a vehicle body, a first hydraulic motor configured to drive a first traveling device provided in the vehicle body, a first hydraulic pump configured to supply hydraulic fluid to the first hydraulic motor, a first hydraulic sensor configured to detect a first differential pressure of the first hydraulic motor, an engine configured to drive the first hydraulic pump, a first rotational speed sensor configured to detect a rotational speed of the first hydraulic motor, and a control circuitry configured to perform feedback control with respect to at least one of the engine and a control valve configured to control pilot pressure of the first hydraulic pump. The feedback control is performed to reduce a difference between the rotational speed detected and the target rotational speed of the first hydraulic motor corresponding to a target vehicle speed. The control circuitry is configured to determine a feedback gain of the feedback control based on a second coefficient that increases as the first differential pressure detected increases.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DESCRIPTION OF THE EMBODIMENTS

Figure 1:
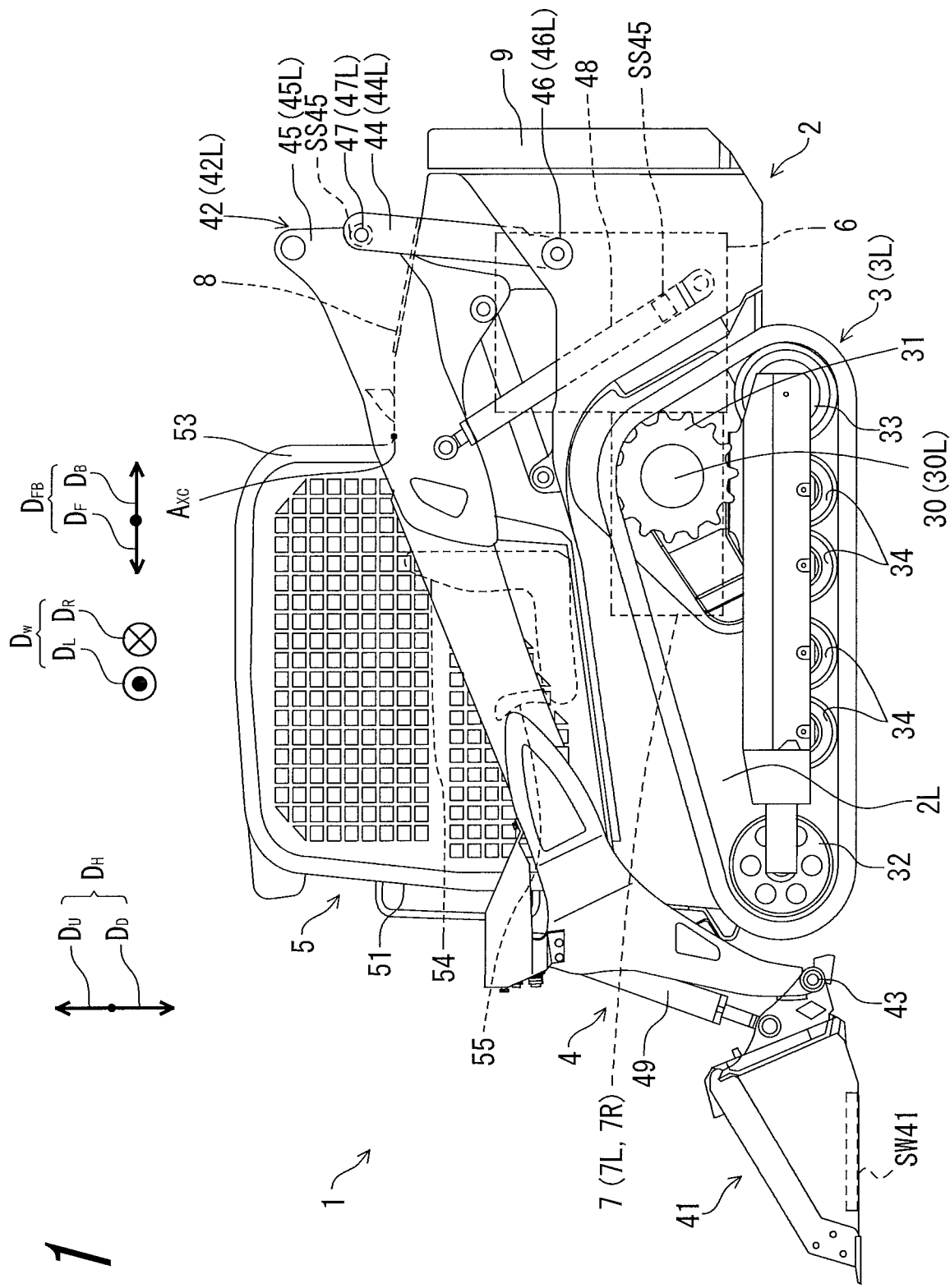
FIG. 1 is a side view of a work vehicle.

Hereinafter, the present invention will be described in detail based on the drawings showing embodiments thereof. In the drawings, like reference numerals indicate corresponding or substantially identical features.

First Embodiment

<Overall Configuration>

Figure 2:
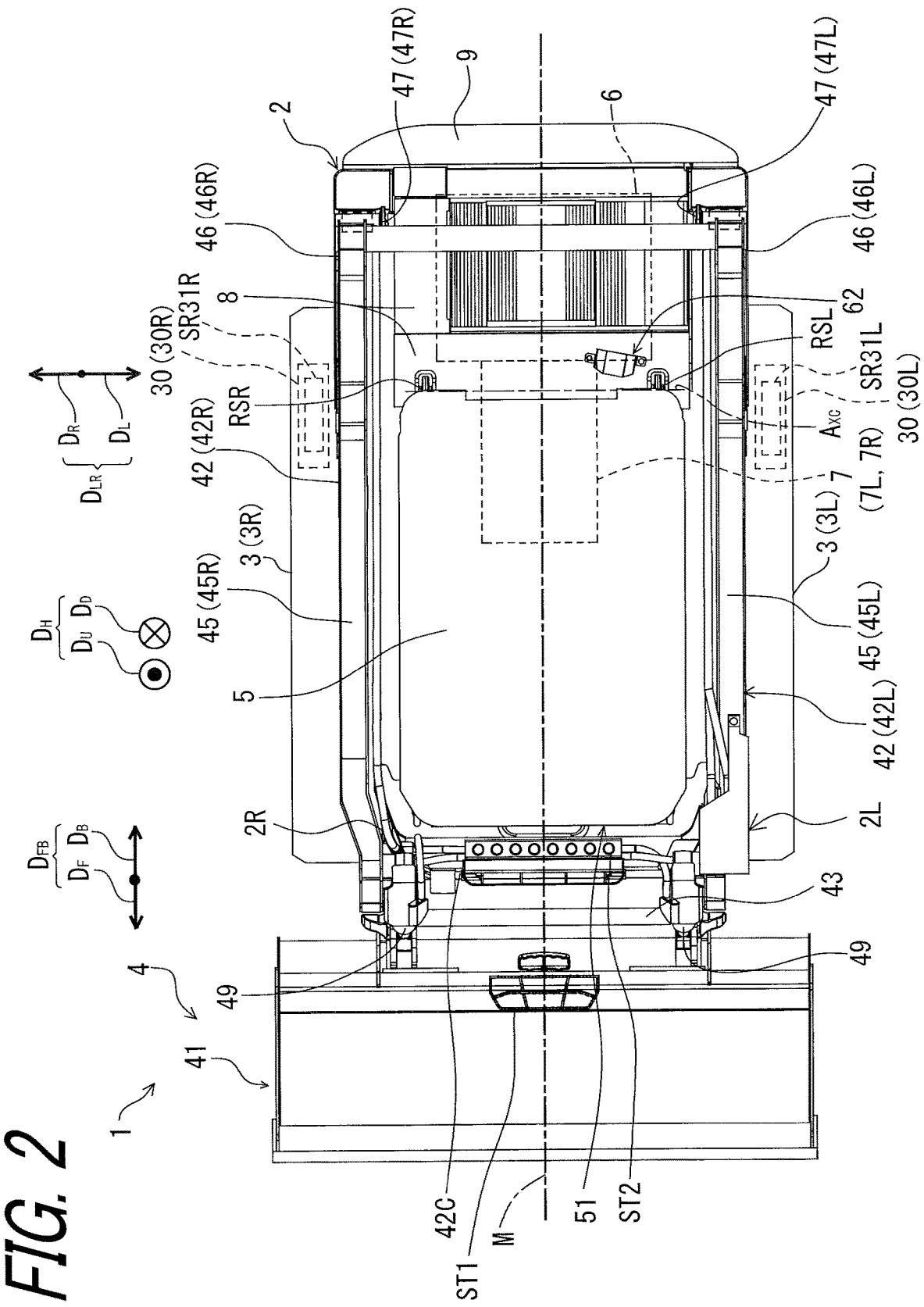
FIG. 2 is a top view of the work vehicle.

Referring to FIGS. 1 and 2, a work vehicle 1, such as a compact truck loader, includes a vehicle body 2, a pair of traveling devices 3, and a work device 4. The vehicle body 2 supports a traveling device 3 and a work device 4. In the illustrated embodiment, the traveling device 3 is a crawler type traveling device provided in the vehicle body 2. Therefore, each of the pair of traveling devices 3 includes a drive wheel 31 driven by the hydraulic motor devices 30, driven wheels 32 and 33, and a rolling wheel 34. However, each of the pair of traveling devices 3 is not limited to a crawler type traveling device. Each of the pair of traveling devices 3 may be, for example, a front wheel/rear wheel traveling device, or a traveling device having a front wheel and a rear crawler. The work device 4 includes a work equipment (bucket) 41 at the distal end of the work device 4. The proximal end of the work device 4 is attached to the rear portion of the vehicle body 2. The work device 4 includes a pair of arm assemblies 42 for rotatably supporting the bucket 41 via a bucket pivot shaft 43. Each of the pair of arm assemblies 42 includes a link 44 and an arm 45.

The link 44 is rotatable with respect to the vehicle body 2 about a fulcrum shaft 46. The arm 45 is rotatable with respect to the link 44 about a joint shaft 47. The work device 4 further includes a plurality of arm cylinders 48 and at least one equipment cylinder 49. Each of the plurality of arm cylinders 48 is rotatably connected to the vehicle body 2 and the arm 45, and moves the link 44, the arm 45 and the like to lift and lower the bucket 41. The at least one equipment cylinder 49 is configured to tilt the bucket 41. The vehicle body 2 includes a cabin 5. The cabin 5 is provided with a front window 51 which can be opened and closed, and an outer shape thereof is defined by a cab frame 53. The front window 51 may be omitted. A work vehicle includes a driver seat 54 and an operation lever 55 in a cabin 5. As shown in FIG. 2, the cab frame 53 is rotatable about rotational shafts RSL and RSR on the vehicle body 2. In FIGS. 1 and 2, a common pivot AXC defined by the rotational shafts RSL and RSR is illustrated. That is, the cab frame 53 is attached to the vehicle body 2 so as to be rotatable about a pivot AXC.

In the embodiment according to the present application, a front-back direction $D_{FB}$ (forward direction $D_F$/backward direction $D_B$) means a front-back direction (forward direction/backward direction) as seen from an operator seated on the driver seat 54 of the cabin 5. A leftward direction $D_L$, a rightward direction $D_R$, a width direction $D_W$ means the left direction, the right direction, and the left-right direction as viewed from the operator, respectively. An upward direction $D_U$, a downward direction $D_D$, height direction $D_H$ means an upward direction, a downward direction, and a height direction as viewed from the operator. The front-back, left-right (width), and up-down (height) directions of the work vehicle 1 coincide with the front-back, left-right (width), and up-down (height) directions as viewed from the operator, respectively.

FIG. 1 shows the left side of the work vehicle 1. As shown in FIG. 2, the vehicle body 2 is substantially plane-symmetric with respect to the vehicle body center surface M, and is a first side surface 2L which is a left side surface and a second side surface 2R which is a right side face. Among the pair of traveling devices 3, the traveling device 3 provided on the first side surface 2L is shown as the left traveling device 3L, and the traveling device 3 provided on the second side surface 2R is shown as the right traveling device 3R. Among the pair of arm assemblies 42, the arm assembly 42 provided on the left side with respect to the vehicle body center surface M is shown as the first arm assembly 42L, and the arm assembly 42 provided on the right side with respect to the vehicle body center surface M is shown as the second arm assembly 42R. The link 44 provided on the left side of the vehicle body center surface M is shown as a first link 44L. An arm 45 provided on the left side of the vehicle body center surface M is shown as a first arm 45L, and an arm 45 provided on the right side of the vehicle body center surface M is shown as a second arm 45R. The fulcrum shaft 46 provided on the left side of the vehicle body center surface M is shown as the first fulcrum shaft 46L. The fulcrum shaft 46 provided on the right side with respect to the vehicle body center surface M is shown as a second fulcrum shaft 46R. The joint shaft 47 provided on the left side with respect to the vehicle body center surface M is shown as a first joint shaft 47L, and the joint shaft 47 provided on the right side with respect to the vehicle body center surface M is shown as a second joint shaft 47R. Among the hydraulic motor devices 30, the hydraulic motor devices 30 provided on the left side with respect to the vehicle body center surface M are shown as the left hydraulic motor device 30L. The hydraulic motor devices 30 provided on the right side with respect to the vehicle body center surface M are shown as a right hydraulic motor device 30R.

Referring to FIGS. 1 and 2, the work vehicle 1 includes an engine 6 and provided at a rear portion of the vehicle body 2, and a plurality of hydraulic pumps including the left hydraulic pump 7L and the right hydraulic pump 7R. The engine 6 drives a plurality of hydraulic pumps 7. The left hydraulic pump 7L and the right hydraulic pump 7R are configured to discharge hydraulic fluid for driving hydraulic motor devices 30 for driving the drive wheel 31. The left hydraulic pump 7L and the right hydraulic pump 7R are collectively referred to as hydraulic pumps (7L, 7R). The plurality of hydraulic pumps 7 other than the left hydraulic pump 7L and the right hydraulic pump 7R are configured to discharge hydraulic fluid for driving a hydraulic actuator (a plurality of arm cylinders 48, at least one equipment cylinder 49, or the like) connected to the work device 4. The engine 6 is provided between a pair of arm assemblies 42 in the width direction $D_W$ of the work vehicle 1. The work vehicle 1 further includes a cover 8 for covering the engine 6. The work vehicle 1 further includes a bonnet cover 9 provided at the rear end of the vehicle body 2. The bonnet cover 9 is openable and closable such that a maintenance personnel can perform maintenance work on the engine 6 and the like.

Figure 3:
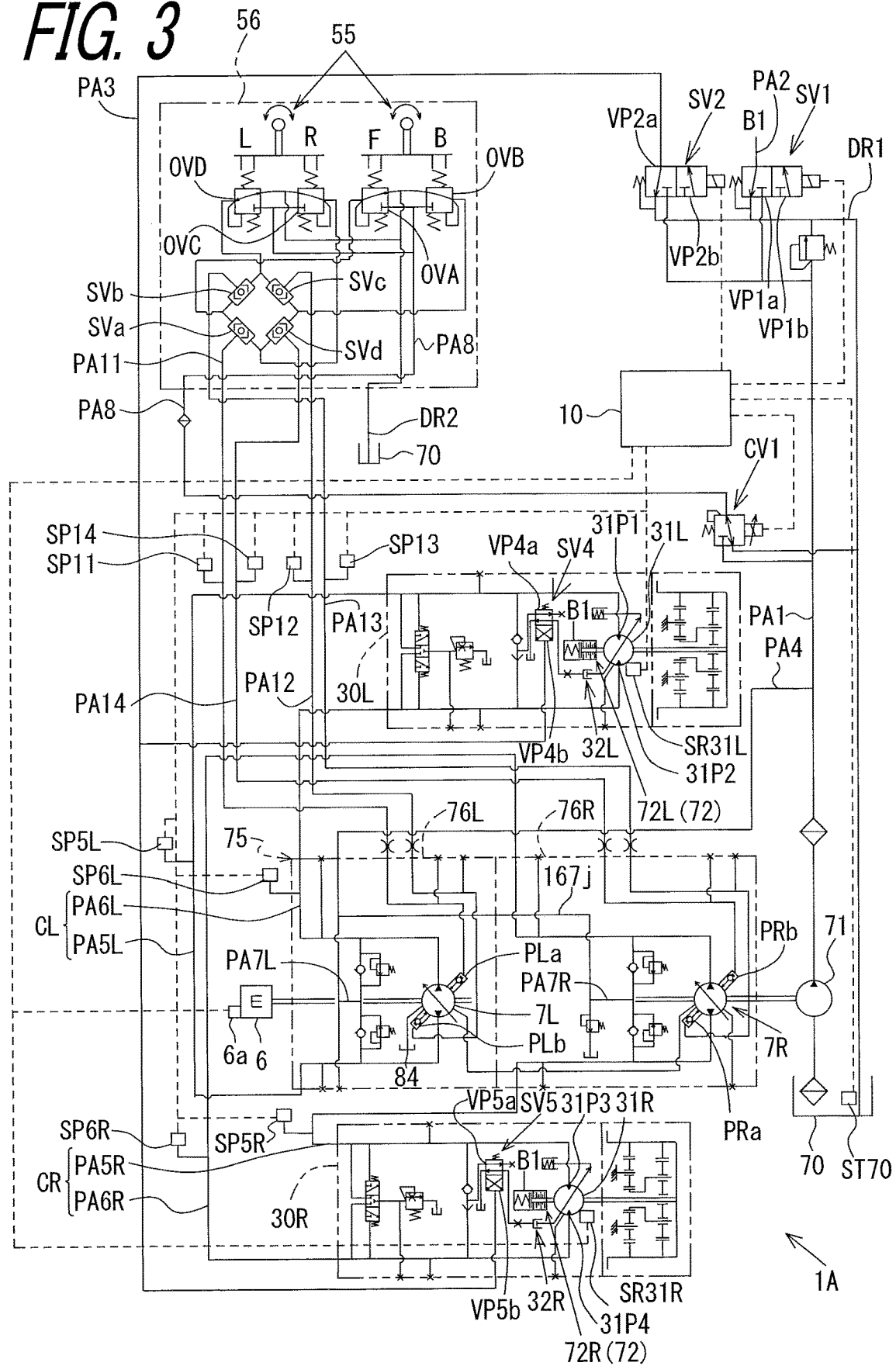
FIG. 3 is a hydraulic circuit diagram of a traveling system of the work vehicle according to the first embodiment.

FIG. 3 is a hydraulic circuit diagram of a travel system of the work vehicle 1. The work vehicle includes a hydraulic circuit 1A. The hydraulic circuit 1A includes a hydraulic fluid tank 70 and a pilot pump 71. The pilot pump 71 is a constant displacement gear pump driven by the power of the engine 6. The pilot pump 71 is configured to discharge the hydraulic fluid stored in the hydraulic fluid tank 70. In particular, the pilot pump 71 is configured to discharge a hydraulic fluid mainly used for control. For convenience of explanation, among the hydraulic fluid discharged from the pilot pump 71, the hydraulic fluid used for control is referred to as pilot oil, and the pressure of the pilot oil is referred to as pilot pressure. In particular, the pilot pump 71 is configured to supply pilot oil to a left hydraulic pump 7L and a right hydraulic pump 7R.

The hydraulic circuit 1A includes a pilot supply oil passage PA1 connected to a discharge port of a pilot pump 71. The pilot oil shall be supplied in the pilot supply oil passage PA1. The hydraulic circuit 1A includes a plurality of switching valves (brake switching valves, direction switching valve SV2) connected to the pilot supply oil passage PA1, and a plurality of brake mechanisms 72. The brake switching valve SV1 is connected to the pilot supply oil passage PA1. The brake switching valve SV1 is a direction switching valve (solenoid valve) for braking and releasing braking by the plurality of brake mechanisms 72. The brake switching valve SV1 is a two-position switching valve configured to switch a valve element to the first position VP1a and the second position VP1b by exciting. Switching of the valve element of the brake switching valve SV1 is performed by the brake pedal 13 (see FIG. 6). The brake pedal 13 is provided with a sensor 14. The operated variable detected by the sensor 14 is input to a controller (control circuitry) 10 composed of an ECU (Electric Control Unit). The controller 10 may be referred to as a control device.

The plurality of brake mechanisms 72 include a first brake mechanism 72L for braking the left traveling device 3L and a second brake mechanism 72R for braking the right traveling device 3R. The first brake mechanism 72L and the second brake mechanism 72R are connected to the brake switching valve via the oil passage PA2. The first brake mechanism 72L and the second brake mechanism 72R are configured to brake the traveling device 3 according to the pressure of the pilot oil (hydraulic fluid). When the valve element of the brake switching valve SV1 is switched to the first position VP1a, the hydraulic fluid is released from the oil passage PA2 in the section between the brake switching valve SV1 and the brake mechanisms 72, and the traveling device 3 is braked by the brake mechanisms 72. When the valve element of the brake switching valve SV1 is switched to the second position VP1b, the braking by the brake mechanisms 72 is released. When the valve element of the brake switching valve SV1 is switched to the first position VP1a, the braking by the brake mechanisms 72 is released, and when the valve element of the brake switching valve SV1 is switched to the second position VP1b, the traveling device 3 may be braked by the brake mechanisms 72.

The direction switching valve SV2 is an electromagnetic valve for changing the rotation of the left hydraulic motor device 30L and the right hydraulic motor device 30R. The direction switching valve SV2 is a two-position switching valve configured to switch a valve element to the first position VP2a or second position VP2b by excitation. Switching of the direction switching valve SV2 is performed by an operating member (not illustrated) or the like. The direction switching valve SV2 may be a proportional valve capable of adjusting the flow rate of the hydraulic fluid to be discharged, instead of a two-position switching valve.

The left hydraulic motor device 30L is a device for transmitting power to drive wheel 31 provided in the left traveling device 3L. The left hydraulic motor device 30L includes a left hydraulic motor 31L, a first swash plate switching cylinder 32L, and a first travel control valve (hydraulic switching valve) SV4. The left hydraulic motor 31L is a swash plate type variable capacity axial motor for driving the left traveling device 3L, and is a motor capable of changing the vehicle speed (rotation) to the first or second speed. The first swash plate switching cylinder 32L is configured to change the angle of the swash plate of the left hydraulic motor 31L by expansion and contraction. The first travel control valve SV4 expands and contracts the first swash plate switching cylinder 32L. The first travel control valve SV4 is a two-position switching valve configured to switch its valve element between the first position VP4a and the second position VP4b.

Switching of the first travel control valve SV4 is performed by a direction switching valve SV2 located on the upstream side and connected to the first travel control valve SV4. Specifically, the direction switching valve SV2 and the first travel control valve SV4 is connected by the oil passage PA3 and the switching operation of the first travel control valve SV4 is performed by hydraulic fluid flowing through the oil passage PA3. For example, the valve element of the direction switching valve SV2 is switched to the first position VP2a, the pilot oil is released in the section between the direction switching valve SV2 and the first travel control valve SV4, and the valve element of the first travel control valve SV4 is switched to the first position VP4a. As a result, the first swash plate switching cylinder 32L contracts, and the speed of the left hydraulic motor 31L is changed to the first speed. When the valve element of the direction switching valve SV2 is switched to the second position VP2b by the operation of the operating member, the pilot oil is supplied to the first travel control valve SV4 through the direction switching valve SV2, and the valve element of the first travel control valve SV4 is switched to the second position VP4b. As a result, the first swash plate switching cylinder 32L is extended, and the speed of the left hydraulic motor 31L is changed to the second speed.

The right hydraulic motor device 30R is a device for transmitting power to the drive wheel 31 provided in the right traveling device 3R. The right hydraulic motor device 30R includes a right hydraulic motor 31R, a second swash plate switching cylinder 32R, and a second travel control valve (hydraulic switching valve). The right hydraulic motor device 30R is a hydraulic motor for driving the right traveling device 3R, and operates similarly to the left hydraulic motor device 30L. That is, the right hydraulic motor 31R operates in the same manner as the left hydraulic motor 31L. The left hydraulic motor 31L and the right hydraulic motor 31R are collectively referred to as hydraulic motors (31L, 31R). The second swash plate switching cylinder 32R operates in the same manner as the first swash plate switching cylinder 32L. The second travel control valve SV5 is a two-position switching valve configured to switch its valve element between the first position VP5$a$ and the second position VP5$b$, and operates in the same manner as the first travel control valve SV4.

A drain oil passage DR1 is connected to the hydraulic circuit 1A. The drain oil passage DR1 is an oil passage to make the pilot oil flow from a plurality of the switching valves (a brake switching valve SV1 and a direction switching valve SV2) to the hydraulic fluid tank 70. For example, the drain oil passage DR1 is connected to a discharge port of a plurality of switching valves (a brake switching valve SV1 and a direction switching valve SV2). That is, when the brake switching valve SV1 is at the first position VP1$a$, the hydraulic fluid is discharged from the oil passage PA2 to the drain oil passage DR1 in the interval between the brake switching valve SV1 and the brake mechanisms 72. When the direction switching valve SV2 is located at the first position VP1$a$, the pilot oil in the oil passage PA3 is discharged to the drain oil passage DR1.

The hydraulic circuit 1A further includes a first charge oil passage PA4 and a hydraulic drive device 75. The first charge oil passage PA4 is branched from the pilot supply oil passage PA1 and connected to the hydraulic drive device 75. The hydraulic drive device 75 drives the left hydraulic motor device 30L and the right hydraulic motor device 30R. The hydraulic drive device 75 includes a first drive circuit 76L for driving the left hydraulic motor device 30L and a second drive circuit 76R for driving the right hydraulic motor device 30R.

The first drive circuit 76L includes a left hydraulic pump 7L and a drive oil passage. PA5L, PA6L and a second charge oil passage PA7L. The driving oil passages PA5L and PA6L are oil passages for connecting the left hydraulic pump 7L and the left hydraulic motor 31L. The hydraulic circuit formed by the driving oil passages PA5L and PA6L is referred to as a left hydraulic circuit CL. The second charge oil passage PA7L, which is connected to the drive oil passages PA5L and PA6L is an oil passage for replenishing the drive oil passages PA5L and PA6L with the hydraulic fluid from the pilot pump 71. The left hydraulic motor 31L has a first connection port 31P1 connected to the drive oil passage PA5L and a second connection port 31P2 connected to the drive oil passage PA6L. The hydraulic fluid for rotating the left traveling device 3L in the forward direction is input to the left hydraulic motor 31L via the first connection port 31P1, and hydraulic fluid for rotating the left traveling device 3L in the backward direction is discharged from the left hydraulic motor 31L via the first connection port 31P1. The hydraulic fluid for rotating the left traveling device 3L in the backward direction is input to the left hydraulic motor 31L via the second connection port 31P2, and hydraulic fluid for rotating the left traveling device 3L in the forward direction is discharged from the left traveling device 3L.

Similarly, the second drive circuit 76R includes a right hydraulic pump 7R, drive oil passages PA5R and PA6R, and a third charge oil passage PA7R. The driving oil passages PA5R and PA6R are oil passage connecting the right hydraulic pump 7R and the right hydraulic motor 31R. The hydraulic circuit formed by driving oil passages PA5R and PA6R is referred to as the right hydraulic circuit CR. The third charge oil passage PA7R is an oil passage PA2 which is connected to the drive oil passages PA5R and PA6R and replenishes the drive oil passages PA5R and PA6R with the hydraulic fluid from the pilot pump 71. The right hydraulic motor 31R includes a third connection port 31P3 connected to the drive oil passage PA5R, and a fourth connection port 31P4 connected to the drive oil passage PA6R. The hydraulic fluid for rotating the right traveling device 3R in the forward direction is input to the right hydraulic motor 31R through the third connection port 31P3, and the hydraulic fluid for rotating the right traveling device 3R in the backward direction is discharged from the right hydraulic motor 31R through the third connection port 31P3. The hydraulic fluid for rotating the right traveling device 3R in the backward direction is input to the right hydraulic motor 31R through the fourth connection port 31P4, and hydraulic fluid for rotating the right traveling device 3R in the forward direction is discharged from the right traveling device 3R. That is, the hydraulic motors (31L, 31R) are configured to drive the traveling devices 3L, 3R. The hydraulic pumps 7L, 7R are configured to discharge hydraulic fluid for driving hydraulic motors (31L, 31R). The drive oil passages (PA5L, PA6L, PA5R, PA6R) are oil passages that connect hydraulic pumps 7L, 7R and hydraulic motors (31L, 31R).

The left hydraulic pump 7L and right hydraulic pump 7R are swash plate type variable capacity axial pump which is driven by the power of the engine 6. The left hydraulic pump 7L which is connected to the left hydraulic motor 31L via the left hydraulic circuit CL includes a first port PLA and a second port PLb to which the pilot pressure acts. The left hydraulic pump 7L is configured to change the angle of the swash plate in accordance with the pilot pressure acting on the first port PLa and a second port PLb, and supply the hydraulic fluid to the left hydraulic motor 31L. Specifically, the left hydraulic pump 7L supplies hydraulic fluid to the left hydraulic motor 31L via a left hydraulic circuit CL so as to drive a left traveling device 3L forward when the hydraulic pressure applied to a second port PLb is higher than the hydraulic pressure applied to a first port PLa, and hydraulic fluid is supplied to the left hydraulic motor 31L via a left hydraulic circuit CL so as to drive the left traveling device 3L backward when the hydraulic pressure applied to a second port PLb is higher than the hydraulic pressure applied to a first port PLa.

The right hydraulic pump 7R which is connected to the right hydraulic motor 31R via the right hydraulic circuit CR, includes a third port PRa and a fourth port PRb to which the pilot pressure acts. Specifically, the right hydraulic pump 7R is configured such that when the hydraulic pressure applied to the third port PRa is higher than the hydraulic pressure applied to the fourth port PRb, the right hydraulic pump 7R supplies hydraulic fluid to the right hydraulic motor 31R via a right hydraulic circuit CR so as to drive the right traveling device 3R forward, and when the hydraulic pressure applied to the fourth port PRb is higher than the hydraulic pressure applied to the third port PRa, the right hydraulic pump 7R supplies hydraulic fluid to the right hydraulic motor 31R via a right hydraulic circuit CR so as to drive the right traveling device 3R backward. The left hydraulic pump 7L and the right hydraulic pump 7R can change the output (discharge amount of the hydraulic fluid) and the discharge direction of the hydraulic fluid in accordance with the angle of the swash plate.

The output of the left hydraulic pump 7L and the right hydraulic pump 7R and the discharge direction of the hydraulic fluid are changed by the operation device 56 for operating the traveling direction of the work vehicle 1. Specifically, the outputs of the left hydraulic pump 7L and the right hydraulic pump 7R and the discharge direction of the hydraulic fluid are changed in accordance with the operation of the operation lever 55 provided in the operation device 56. In other words, the operation device 56 is a device configured to select at least one of the left traveling device 3L and the right traveling device 3R, and to operate the traveling direction of the work vehicle by instructing at least one of the traveling devices to move forward or backward. An instruction of the traveling direction is input by the user via the operation lever 55. The operation lever 55 may be referred to as a travel instruction input device.

As shown in FIG. 3, the hydraulic circuit 1A includes as pilot supply passage PA8 which is branched from the pilot supply oil passage PA1 and connected to the operation device 56, and a primary pressure control valve CV1 provided on a pilot supply oil passage PA8). In the following embodiments, the pilot supply oil passage PA1 and the pilot supply oil passage PA8 are collectively referred to as the primary pilot oil passage. The primary pressure control valve CV1 is an electromagnetic proportional valve including a solenoid, and is configured to adjust the pilot pressure supplied to the operation device 56 by adjusting the opening degree in accordance with the current applied to the solenoid. The opening degree of the primary pressure control valve CV1 is controlled by the current supplied from the controller 10. In some cases, the pilot pressure output from the primary pressure control valve CV1 increases as the magnitude of the current increases, and in other cases, the pilot pressure output from the primary pressure control valve CV1 decreases as the magnitude of the current increases. In the following embodiments, the primary pressure control valve CV1 may be referred to as a hydraulic pressure adjusting mechanism. The detailed operation of the primary pressure control valve CV1 will be described later.

The operation device 56 includes an operation valve OVA for forward movement, an operation valve OVB for backward movement, an operation valve OVC for right turning, an operation valve OVD for left turning, and an operation lever 55. The operation device 56 has first to fourth shuttle valves SVa, SVb, SVc, and SVd. The operation valves OVA, OVB, OVC, and OVD are operated by a single operation lever 55. The operation valves OVA, OVB, OVC, and OVD change the pressure of the hydraulic fluid in accordance with the operation of the operation lever 55, and the changed hydraulic fluid is transferred to the first port Pla and the second port PLb of the left hydraulic pump 7L and the third port PRa and the fourth port PRb of the right hydraulic pump 7R. Although the operation valves OVA, OVB, OVC, and OVD are operated by one operation lever 55 in this embodiment, a plurality of operation lever 55 may be used. In the following embodiments, one or a plurality of operation levers 55 may be referred to as a first operation device.

Each of the operation valves OVA, OVB, OVC, and OVD has an input port (primary port), an discharge port, and an output port (secondary port). As shown in FIG. 3, the input port is connected to the pilot supply oil passage PA8. The discharge port is connected to the drain oil passage D which goes to hydraulic fluid tank 70. The operation lever 55 can be tilted in a front-back direction, width direction orthogonal to front and back, and an oblique direction from the neutral position. In response to the tilt of the operation lever 55, the operation valves OVA, OVB, OVC and OVD of the operation device 56 are operated. Thus, the pilot pressure corresponding to the operated variable of the operation lever 55 from the neutral position is output from the secondary ports of the operation valves OVA, OVB, OVC, and OVD. The relationship between the pilot pressure applied to the primary port outputted from the primary pressure control valve CV1 and the pilot pressure applied to the secondary port will be described later.

A secondary port of the operation valve OVA and a secondary port of the operation valve OVC are connected to an input port of a first shuttle valve SVa, and an output port of the first shuttle valve SVa is connected to a first port PLa of a left hydraulic pump 7L via a first pilot oil passage PA11. A secondary port of the operation valve OVA and a secondary port of the operation valve OVD are connected to an input port of a second shuttle valve SVb, and an output port of the second shuttle valve SVb is connected to a third port PRa of a right hydraulic pump 7R via a third pilot oil passage PA13. A secondary port of the operation valve OVB and a secondary port of the operation valve OVD are connected to an input port of a third shuttle valve SVc, and an output port of the third shuttle valve SVc is connected to a second port PLb of a left hydraulic pump 7L via a second pilot oil passage PA12. A secondary port of the operation valve OVB and a secondary port of the operation valve OVC are connected to an input port of a fourth shuttle valve SVd, and an output port of the fourth shuttle valve SVd is connected to a fourth port PRb of a right hydraulic pump 7R via a fourth pilot oil passage PA14. That is, the pilot supply oil passage PA8, the first pilot oil passage PA11 and the fourth pilot oil passage PA14 connect the pilot pump 71 and the left hydraulic pump 7L. The pilot supply oil passage PA8, the second pilot oil passage PA12, and the third pilot oil passage PA13 connect the pilot pump 71 and the right hydraulic pump 7R.

When the operation lever 55 is tilted to the front side, the forward operation valve OVA is operated and the pilot pressure is output from the operation valve OVA. This pilot pressure acts on the first port PLa from the first shuttle valve SVa via the first pilot oil passage PA11 connecting the operation device 56 and the first port PLa of the left hydraulic pump 7L, and also acts on the third port PRa from the second shuttle valve SVb via the third pilot oil passage PA13 connecting the operation device 56 and the third port PRa of the right hydraulic pump 7R. As a result, the output shaft of the left hydraulic pump 7L and the output shaft of the right hydraulic pump 7R rotate forward (forward rotation) at a speed corresponding to the tilt amount of the operation lever 55, and the work vehicle 1 moves straight forward.

When the operation lever 55 is tilted rearward, the operation valve OVB for the backward movement is operated, and pilot pressure is output from the operation valve OVB. This pilot pressure acts on the second port PLb of the left hydraulic pump 7L via the second pilot oil passage PA12 connecting the operation device 56 and the second port applied from the third shuttle valve SVc and also acts on the fourth port PRb via the fourth pilot oil passage PA14 connecting the operation device 56 and the fourth port PRb of the right hydraulic pump 7R. As a result, the output shaft of the left hydraulic pump 7L and the output shaft of the right hydraulic pump 7R are rotated reversely (backward rotation) at a speed corresponding to the tilt amount of the operation lever 55, and the work vehicle 1 moves straight backward.

When the operation lever 55 is tilted to the right side, the operation valve OVC for turning right is operated, and the pilot pressure is output from the operation valve OVC. This pilot pressure acts on the first port PLa of the left hydraulic pump 7L via the first pilot oil passage PA11 from the first shuttle valve SVa, and acts on the fourth port PRb of the right hydraulic pump 7R via the fourth pilot oil passage PA14 of the fourth shuttle valve SVd. Thereby, the operation lever 55 moves curvedly to the right with the degree of bending corresponding to the operation position.

Also, when the operation lever 55 is tilted to the left side, the operation valve OVD for turning to the left is operated, and the pilot pressure is output from the operation valve OVD. This pilot pressure acts on the third port PRa of the right hydraulic pump 7R from the second shuttle valve SVb via the third pilot oil passage PA13, and acts on the second port PLb of the left hydraulic pump 7L from the third shuttle valve SVc via the second pilot oil passage PA12. As a result, the operation lever 55 moves curvedly to the left with a degree of bending corresponding to the operation position.

That is, when the operation lever 55 is tilted to the front side obliquely to the left, the work vehicle 1 advances at a speed corresponding to the operation position of the operation lever 55 in the front-rear direction, and bends to the left at a degree of bending corresponding to the operation position of the operation lever 55 in the left direction. When the operation lever 55 is tilted to the front side obliquely to the right, the work vehicle 1 rotates to the right while the right at a speed corresponding to the operating position of the operation lever 55. When the operation lever 55 is tilted to the left obliquely rearward, the work vehicle 1 turns to the left while moving backward at a speed corresponding to the operating position of the operation lever 55. When the operation lever 55 is tilted to the rear side obliquely to the right, the work vehicle 1 rotates to the right while moving backward at a speed corresponding to the operation position of the operation lever 55.

Next, the detailed operation of the primary pressure control valve CV1 will be described. The work vehicle 1 includes a setting member 11 (see FIG. 6) for setting a target rotational speed of the engine 6. The setting member 11 is an accelerator pedal which is a speed input device different from the operation device 56 described above, a swingably supported accelerator lever, or a turnable indoor dial. The setting member 11 is provided with a sensor 12. The operated variable detected by the sensor 12 is input to the controller 10. The engine rotational speed corresponding to the operated variable detected by the sensor 12 is the target rotational speed of the engine 6. In other words, the target rotational speed of the engine 6 is set based on the operated variable of the setting member 11. The controller 10 outputs a rotation command indicating, for example, a fuel injection amount, an injection timing, and a fuel injection rate to the injector in order to become the target rotational speed of the engine 6 as determined. Alternatively, the controller 10 outputs a rotation command indicating the fuel injection pressure or the like to the supply pump or the common rail in order to become the target rotational speed of the engine 6 as determined. In the following embodiments, the one or more operation levers 55 and the setting member 11 described above may be referred to as at least one operation device 56. A speed sensor 6a for detecting an actual engine rotational speed (referred to as an actual rotational speed of the engine 6) is connected to the controller 10, and the actual rotational speed of the engine 6 is input to the controller 10. The speed sensor 6a is, for example, a potentiometer configured to detect the rotational speed of a rotating member connected to the crankshaft of the engine 6. When a load is applied to the engine 6, the actual rotational speed of the engine 6 is reduced from the target rotational speed of the engine 6. Decrease amount of the actual rotational speed from the target rotational speed when a load is applied to the engine 6 from the target rotational speed (the difference between the target rotational speed of the engine and the actual rotational speed of the engine) is referred to as a drop amount of the engine.

Figure 4:
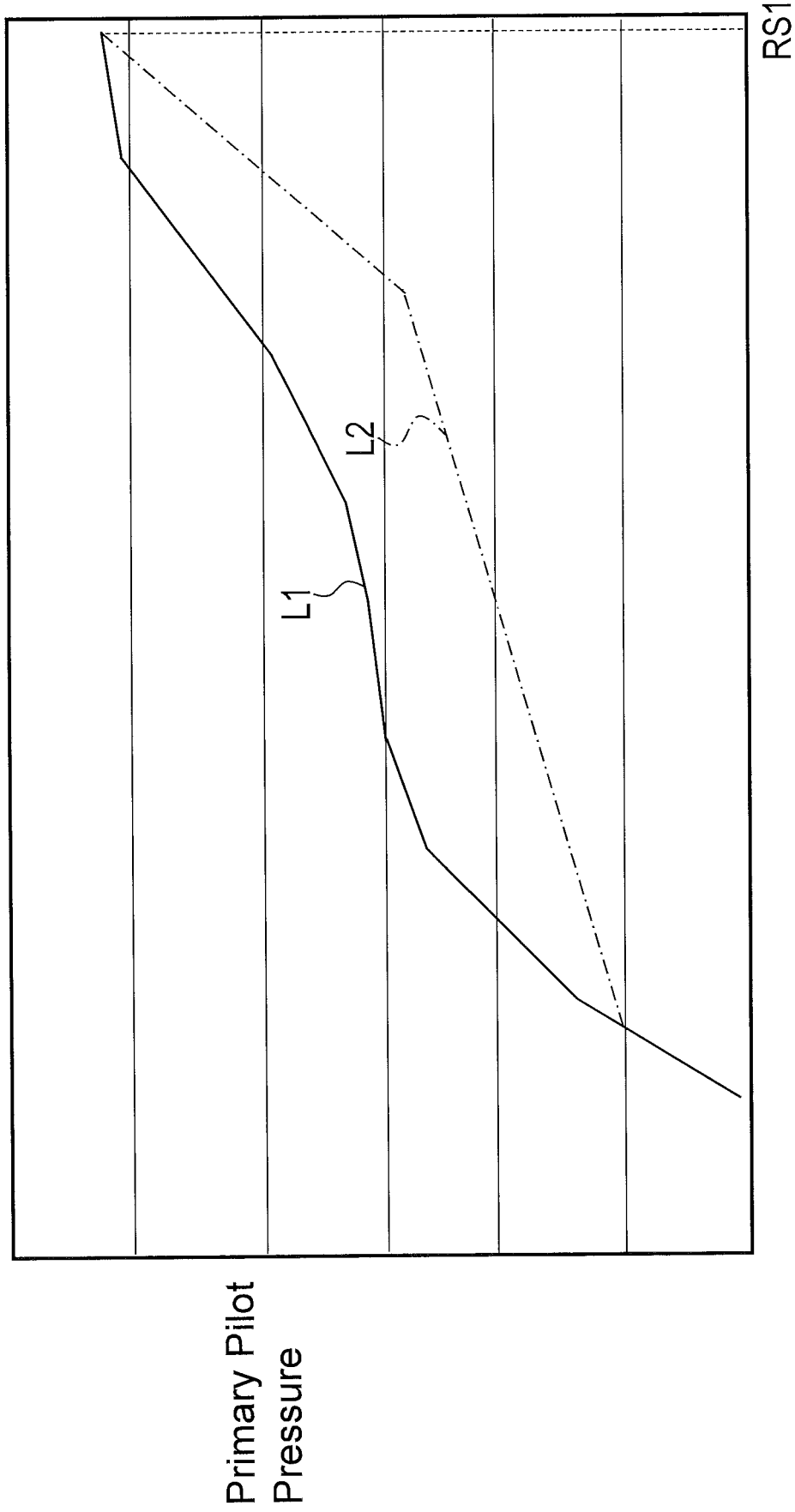
FIG. 4 is diagram showing a relationship between engine rotational speed, primary pilot pressure, and a set line.

The primary pressure control valve CV1 can set a pilot pressure (primary pilot pressure) acting on the input ports (primary ports) of the operation valves OVA, OVB, OVC, and OVD based on a decrease amount (drop amount) $\Delta E1$ of the rotational speed (engine rotational speed E1) of the engine 6. In other words, the primary pressure control valve CV1 is a control valve provided between the pilot pump 71 and the operation valves OVA, OVB, OVC, and OVD and configured to feed pilot oil to the operation valves OVA, OVB, OVC, and OVD and to convert the pressure of the pilot oil supplied to the operation valves OVA, OVB, OVC, and OVD into primary pilot pressure. The rotational speed of the engine 6 can be detected by the speed sensor 6a of the engine rotational speed E1. The engine rotational speed E1 detected by the speed sensor 6a is input to the controller 10. The speed sensor 6a may be referred to as speed sensor 6a. FIG. 4 shows the relationship among the engine rotational speed, the traveling primary pressure (primary pilot pressure), and the set lines L1 and L2. The set line L1 shows the relationship between the engine rotational speed E1 when the decrease amount $\Delta E1$ is less than a predetermined value (less than the anti-stall determination value) and the traveling primary pressure. The set line L2 shows the relationship between the engine rotational speed E1 when the decrease amount $\Delta E1$ is equal to or greater than the anti-stall determination value and the traveling primary pressure. When the difference between the rotational speed RS determined based on the operated variable of the setting member 11 and the actual rotational speed of the engine 6 is smaller than a predetermined stall determination speed difference (anti-stall determination value), the primary pilot pressure corresponding to the rotational speed RS changes according to the third relationship indicated by the set line L1. When the difference between the rotational speed RS and the actual rotational speed of the engine 6 is equal to or greater than a predetermined stall determination speed difference (anti-stall determination value), the primary pilot pressure corresponding to the rotational speed RS changes according to the fourth relationship shown in the set line L2.

When the decrease amount $\Delta E1$ is less than the anti-stall determination value, the controller 10 adjusts the opening of the primary pressure control valve CV1 so that the relationship between the engine rotational speed E1 and the primary pilot pressure matches the reference pilot pressure indicated by the set line L1. When the decrease amount $\Delta E1$ is equal to or greater than the anti-stall determination value, the controller 10 adjusts the opening of the primary pressure control valve CV1 so that the relationship between the engine rotational speed E1 and the traveling primary pressure coincides with the set line L2 lower than the reference pilot pressure. At the set line L2, the primary pilot pressure for a predetermined engine rotational speed E1 is lower than the traveling primary pressure at the set line L1. That is, when attention is paid to the same engine rotational speed E1, the traveling primary pressure of the set line L2 is set lower than the traveling primary pressure of the set line L1. Therefore, by the control based on the set line L2, the pressure (pilot pressure) of the hydraulic fluid entering the operation valves OVA, OVB, OVC, and OVD is suppressed to be low. As a result, the angle of the swash plate of the left hydraulic pump 7L and the right hydraulic pump 7R is adjusted, the load acting on the engine 6 is reduced, and stalling of the engine 6 can be prevented. Although FIG. 4 shows one set line L2, a plurality of set lines L2 may be provided. For example, the set line L2 may be set for each engine rotational speed E1. Further, it is preferable that the controller 10 has data indicating the set line L1 and the set line L2, control parameters such as functions, and the like. as functions.

Figure 5:
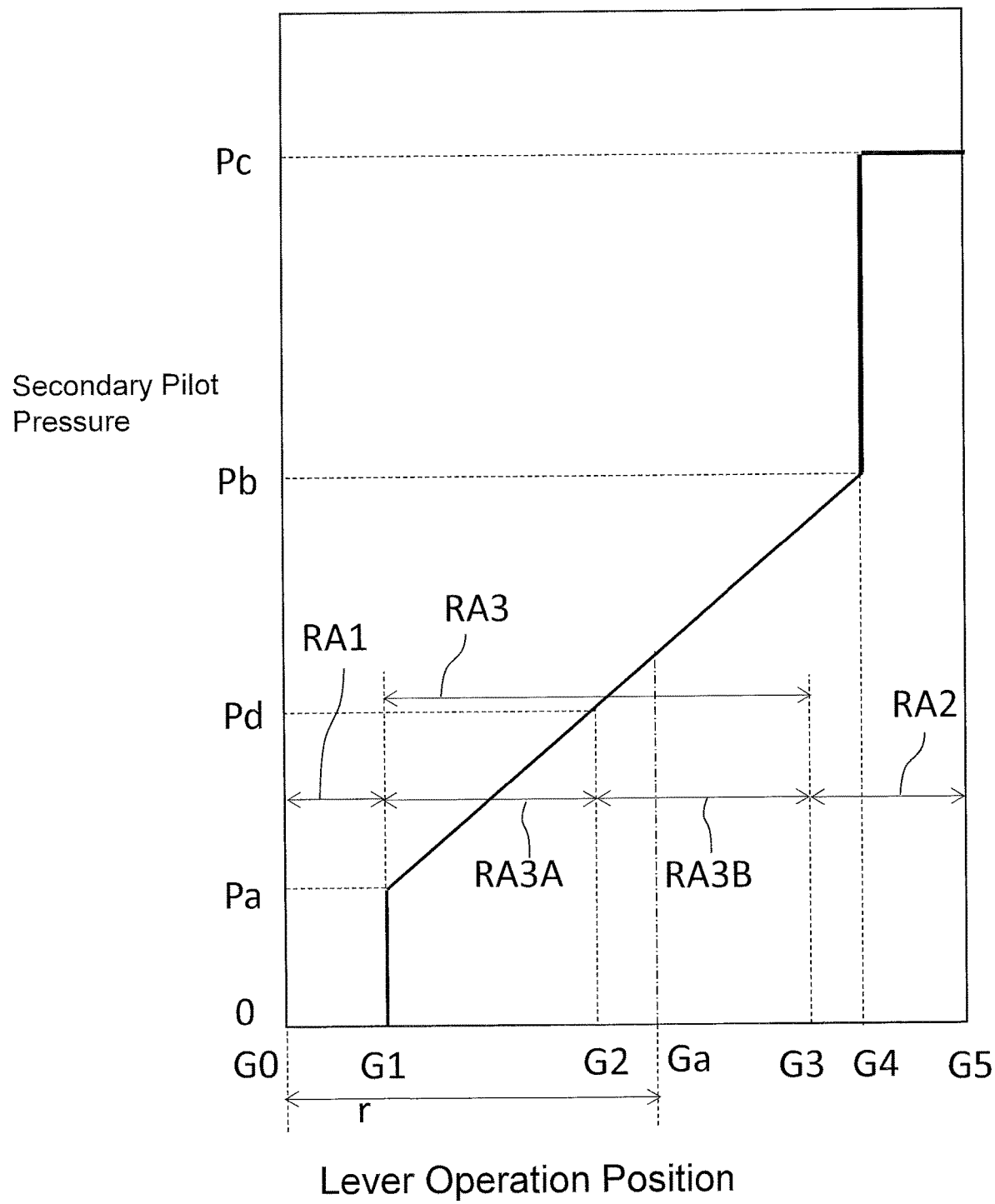
FIG. 5 is a diagram showing a relationship between an operating position of an operation lever and a secondary pilot pressure.

Secondly, the following describes the secondary pilot pressure output from the secondary port of the operation valves OVA, OVB, OVC, OVD. FIG. 5 is a diagram showing the relationship between the operating position of the operation lever and the secondary pilot pressure. Referring to FIG. 4, the lever operation position is an operation start position (neutral position, G0 position) in which the origin is the start position of the lever stroke, and approaches the operation end position (G5 position) in which the end position of the lever stroke is the operation end position (0 position) as the lever operation position is away from the origin. The operation area of the operation lever 55 is divided into a neutral area RA1 in which the operation target does not operate (from the G0 position to the G1 position in the drawings), a near full-operation area RA2 near the operation end (from the G3 position to the G5 position in the drawings), and an intermediate area RA3 between the neutral area RA1 and the near full-operation area RA2 (from the G1 position to the G3 position in the drawings). The intermediate area RA3 is further divided into a slow speed area RA3A extending from the G1 position to the G2 position and an intermediate speed area RA3B extending from the G2 position to the G3 position.

In the neutral area RA1, the secondary pilot pressure is not supplied even if the operation lever 55 is operated. On the other hand, in the near full-operation area RA2, the speed of the operation target is not adjusted, so that the operation lever 55 is operated to the operation end position (G5 position) without stopping in the middle. In the intermediate area RA3, the operation lever 55 is stopped at an arbitrary position within the area or the position thereof is changed so that the speed of the operation target becomes the speed desired by the operator. For example, the ratio of each of the operation areas RA1, RA3A, RA3B and RA2 to the lever stroke is as follows.

Neutral area RA1: 0% or more and less than 15% Slow speed range RA3A: 15% or more and less than 45% Intermediate speed area RA3B: 45% or more and less than 75% Near full-operation area RA2: 75% to 100% In the characteristic diagram shown in FIG. 5, when the operation lever 55 is operated from the G0 position to the G1 position, a secondary pilot pressure (Pa) is generated, and when the operation lever 55 is operated from the G1 position to the G4 position, the secondary pilot pressure increases from Pa to Pb in proportion to the operated variable of the operation lever 55. Then, at position G4, the primary pilot pressure is short-cut and flows to the secondary side, and the secondary pilot pressure rises from Pb to the maximum output pressure Pc at once. While the operation lever 55 is operated from the G4 position to the G5 position, the secondary pilot pressure is constant at the maximum output pressure (Pc) and becomes equal to the primary pilot pressure. That is, the operation device 56 outputs the primary pilot pressure input to the operation device 56 to the first port PLa and the fourth port PRb when the displacement of the operation lever 55 for instructing movement in the leftward direction from the neutral position is equal to or greater than the first displacement value (the displacement from G0 to G4). The operation device 56 outputs the primary pilot pressure input to the operation device 56 to the second port PLb and the third port PRa when the displacement of the operation lever 55 for instructing movement in the right direction from the neutral position is equal to or greater than a first displacement value (displacement from G0 to G4). The operation device 56 outputs the primary pilot pressure input to the operation device 56 to the first port PLa and the third port PRa when the displacement of the operation lever 55 for instructing movement in the forward direction from the neutral position is equal to or greater than a first displacement value (displacement from G0 to G4). The operation device 56 outputs the primary pilot pressure input to the operation device 56 to the second port PLb and the fourth port PRb when the displacement of the operation lever 55 for instructing movement in the backward direction from the neutral position is equal to or greater than a first displacement value (displacement from G0 to G4). The characteristic value of the longitudinal secondary pilot pressure may be different from the characteristic value of the lateral secondary pilot pressure. Assuming that the characteristic values of the longitudinal secondary pilot pressures corresponding to G0 to G5 and Pa to Pc are G0' to G5' and Pa' to Pc, the operation device 56 may output the primary pilot pressure input to the operation device 56 to the first port PLa and the third port PRa when the displacement of the operation lever 55 for instructing movement in the forward direction from the neutral position is equal to or greater than a second displacement value (displacement from G0' to G4'). The operation device 56 may output the primary pilot pressure input to the operation device 56 to the second port PLb and the fourth port PRb when the displacement of the operation lever 55 for instructing movement in the rearward direction from the neutral position is equal to or greater than the second displacement value (the displacement from G0' to G4'). In addition, Pa and Pb (Pa' and Pb') are values independent of the magnitude of the primary pilot pressure, but when the primary pilot pressure is lower than Pa or Pb (Pa' or Pb'), the secondary pilot pressure reaches a plateau at the magnitude of the primary pilot pressure. That is, the operation valves (OVA, OVB, OVC, OVD) are configured to convert the pressure of the pilot oil from the primary pilot pressure to the secondary pilot pressure in accordance with the first operated variable (operation lever position) of the operation device 56, and output the pilot oil. The pilot oil at secondary pilot pressure is applied to ports (PLa, PRa, PLb, PRb) that provide hydraulic pressure to swash plate of hydraulic pumps (7L, 7R). When the first operated variable is equal to or greater than the threshold amount (first displacement value), the operation valves (OVA, OVB, OVC, OVD) are converted into a secondary pilot pressure equal to the primary pilot pressure.

Based on the features of the operation valves OVA, OVB, OVC and OVD described above, the movement of the work vehicle 1 corresponding to the operation of the operation lever 55 will be described in more detail. When an operated variable of the operation lever 55 in the front-rear direction is larger than an operated variable of the operation lever 55 in the right direction, and the operation position of the operation lever 55 in the right direction is operated from the G1 position to the G3 position, the work vehicle bends to the right in a large circle by rotating in the same direction in a state in which the magnitude of the rotational speed of the left hydraulic pump 7L is larger than the magnitude of the rotational speed of the right hydraulic pump 7R. When the operation position of the operation lever 55 in the right direction becomes the same position as the operation position in the front-rear direction, the rotational speed of the right hydraulic pump 7R becomes 0, and only the left hydraulic pump 7L rotates, whereby the work vehicle 1 makes a right pivotal turn (right pivot turn). In addition, when the operation position of the operation lever 55 in the right direction is operated between the G4 position and the G5 position, the output shaft of the left hydraulic pump 7L rotates in the forward direction and the output shaft of the right hydraulic pump 7R rotates in the reverse direction so that the work vehicle 1 turns to the right side.

Further, when the operated variable in the front-rear direction of the operation lever 55 is larger than the operated variable in the left direction and the operation position of the operation lever 55 in the left direction is operated from the G1 position to the G3 position, the work vehicle bends to the left in a large turn by rotating in the same direction with the magnitude of the rotational speed of the right hydraulic pump 7R being larger than the magnitude of the rotational speed of the left hydraulic pump 7L. When the operation position of the operation lever 55 in the left direction becomes the same position as the operation position in the front-rear direction, the rotational speed of the left hydraulic pump 7L becomes 0, and only the right hydraulic pump 7R rotates, so that the work vehicle 1 makes a left pivotal turn (left pivot turn). Further, when the operating position of the operation lever 55 in the leftward direction is operated between the G4 position and the G5 position, the operating position becomes larger than the operating position in the front-rear direction, the output shaft of the right hydraulic pump 7R rotates in the forward direction and the output shaft of the left hydraulic pump 7L rotates in the reverse direction, so that the work vehicle turns to the left. In the present embodiment, the turning means the movement of the work vehicle 1 when the operation position to the right is operated between the G4 position and the G5 position, or when the operation position to the left is operated between the G4 position and the G5 position.

On the other hand, when the operating position in the forward direction of the operation lever 55 is operated between the G4 position and the G5 position, the operating position becomes larger than the operating position in the left-right direction, the output shafts of the left hydraulic pump 7L and the right hydraulic pump 7R rotate in the forward direction, and the work vehicle advances at high speed. When the operating position of the operation lever 55 in the backward direction is operated between the G4 position and the G5 position, the operating position becomes larger than the operating position in the left-right direction, the output shafts of the left hydraulic pump 7L and the right hydraulic pump 7R are inverted, and the work vehicle 1 moves backward at high speed. The operation of the operation lever 55 in the front-rear direction is the same as that in the left-right direction.

Figure 6:
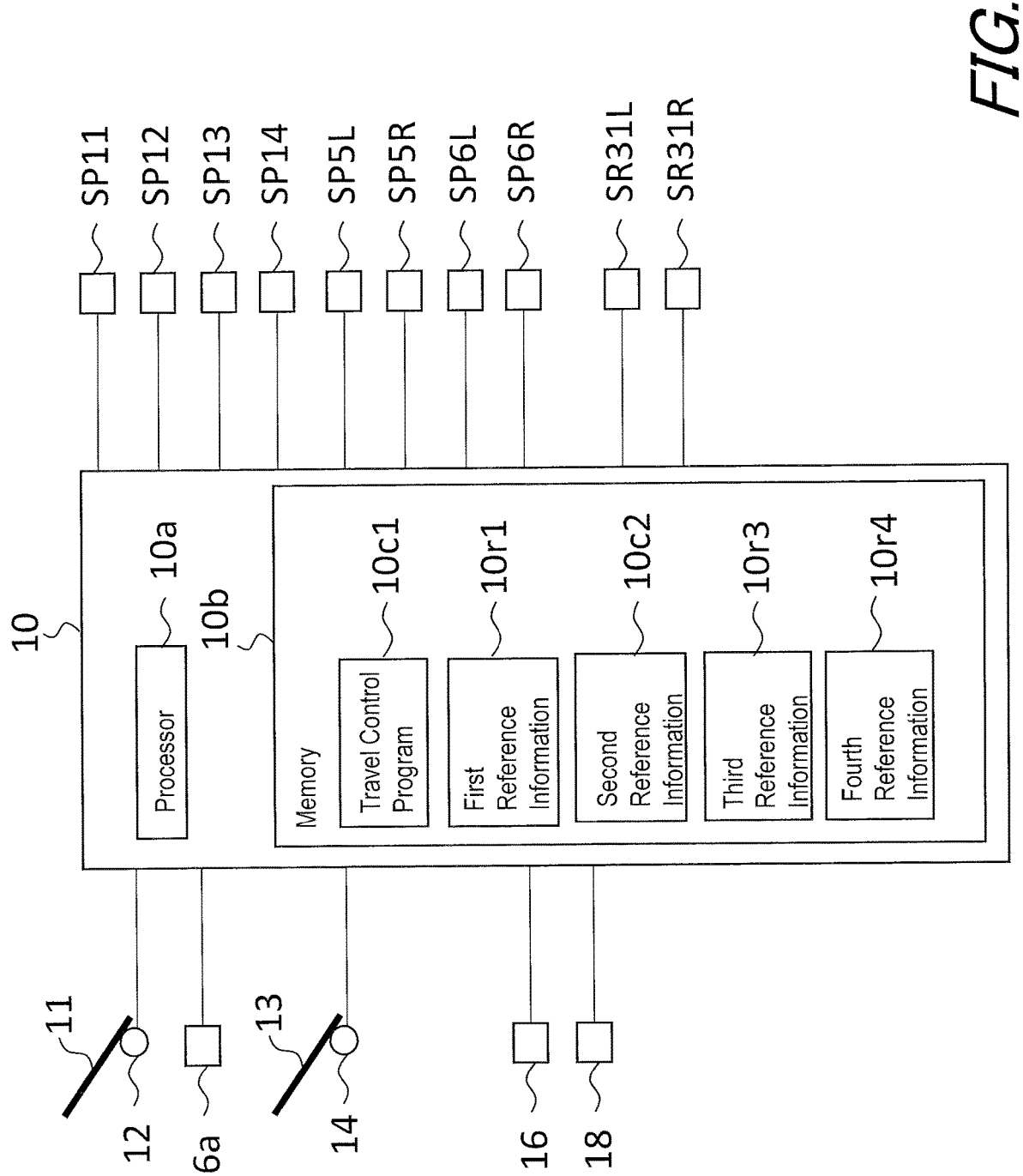
FIG. 6 is a block diagram of the work vehicle.

The work vehicle 1 includes various switches and sensors connected to the controller 10 described above. FIG. 6 is a block diagram of the work vehicle 1. Referring to FIG. 6, the work vehicle 1 includes a creep setting member 16 provided around the driver seat 54. The creep setting member 16 may be referred to as an input device. The creep setting member 16 is provided with, for example, a touch panel, a slidable slide-type switch, or a dial. Creep is to control for running the work vehicle 1 at an upper limit speed or less regardless of the operated variable of at least one operation device 56 (the setting member 11, one or a plurality of operation levers 55) to which the user's speed alteration operation is input. The upper limit speed is input by the creep setting member 16. The creep setting member 16 is configured so as to switch between the normal mode and the creep mode. A state in which the upper limit speed is set by the creep setting member 16 is referred to as a creep mode. The state other than the creep mode is referred to as the normal mode.

In the normal mode, the target rotational speed of the engine 6 is set by the operation of the setting member 11, and the primary pilot pressure corresponding to the target rotational speed is obtained based on the set line L1 or L2 in FIG. 4. The secondary pilot pressure is set based on the operated variable of one or a plurality of operation levers 55, and the hydraulic motors (31L, 31R) and hydraulic pumps (7L, 7R) are controlled. That is, in the normal mode, it is possible to change the speed of the work vehicle 1 in accordance with the operated variable of at least one operation device, and to run the work vehicle 1 at a speed higher than the upper limit speed. On the other hand, in the creep mode, the set line L1 or L2 in FIG. 4 is not used to determine the traveling primary pressure, but the primary pilot pressure is determined to be smaller than the primary pilot pressure in the normal mode by using first reference information 10r1 described later or the like. The setting after the secondary pilot pressure in the creep mode is the same as that in the normal mode, but since the secondary pilot pressure is equal to or less than the primary pilot pressure, the speed of the work vehicle is limited to an upper limit speed or less regardless of the operated variable of at least one operation device (setting member 11, one or a plurality of operation levers 55) by limiting the primary pilot pressure.

Referring to FIGS. 3 and 6, the work vehicle 1 includes a hydraulic pressure sensor SP11 for detecting the hydraulic pressure of a first pilot oil passage PA11, a hydraulic pressure sensor SP12 for detecting the hydraulic pressure of a second pilot oil passage PA12, an hydraulic pressure sensor SP13 for detecting the hydraulic pressure of a third pilot oil passage PA13, and a hydraulic pressure sensor SP14 for detecting the hydraulic pressure of a fourth pilot oil passage PA14. As described above, the secondary pilot pressure output from the secondary ports of the operation valves OVA, OVB, OVC, and OVD changes in accordance with the operation position of the operation lever 55. Therefore, the hydraulic pressure sensors SP11 to SP14 are sensors for detecting the secondary pilot pressure. The hydraulic pressure sensors SP11 to SP14 may be referred to as an additional hydraulic pressure sensor.

A work vehicle 1 includes a hydraulic pressure sensor SP5L for detecting the hydraulic pressure of a drive oil passage PA5L, a hydraulic pressure sensor SP6L for detecting the hydraulic pressure in the drive oil passage PA6L, a hydraulic pressure sensor SP5R for detecting the hydraulic pressure in the drive oil passage PA5R, and a hydraulic pressure sensor SP6R for detecting the hydraulic pressure in the drive oil passage PA6R. That is, the hydraulic pressure sensors (SP5L, SP6L, SP5R, SP6R) are configured to detect the hydraulic pressure of the hydraulic fluid in the drive oil passages (PA5L, PA6L, PA5R, PA6R). The states of the left hydraulic motor 31L and the right hydraulic motor 31R can be detected from the pressure difference between the hydraulic pressure sensor SP5L and the hydraulic sensor SP6L and the pressure difference between the hydraulic sensor SP5R and the hydraulic sensor SP6R.

Referring to FIGS. 2, 3, and 6, the work vehicle 1 includes a rotation speed sensor SR31L for detecting the rotational speed of the left hydraulic motor 31L and a rotation speed sensor SR31R for detecting the rotational speed of the right hydraulic motor 31R, which are connected to the rotational shaft of the left hydraulic motor 31L. The states of the left hydraulic motor 31L and the right hydraulic motor 31R can be detected from the magnitude of the rotational direction and rotational speed detected from the rotation speed sensor SR31L and the magnitude of the rotational direction and rotational speed detected from the rotation speed sensor SR31R. The work vehicle 1 may include an operation detection sensor 18 for detecting the operation position of the operation lever 55. The operation detection sensor 18 is connected to a controller 10 to be described later. The operation detection sensor 18 is a position sensor for detecting the position of the operation lever 55.

<Configuration of Controller 10>

The controller 10 includes a processor 10a and a memory 10b as shown in FIG. 6 in order to realize the control of the vehicle speed in the creep mode described above. The processor 10a may be referred to as an electronic circuit (circuitry). The memory 10b includes a volatile memory and a non-volatile memory. The memory 10b includes at least a travel control program 10c1 for realizing the above-described control, first reference information 10r1, second reference information 10r2.

The first reference information 10r1 represents a first correspondence relationship between the rotational speed RS of the engine 6 detected by the speed sensor 6a and the primary pilot pressure in the normal mode. That is, the first reference information 10r1 represents the first correspondence relationship represented by the set line L1 in FIG. 4. The second reference information 10r2 represents a second correspondence relationship between the rotational speed RS of the engine 6 detected by the speed sensor 6a and the primary pilot pressure, which is used to control the primary pilot pressure when the drop amount of the engine 6 is large in the normal mode. That is, the second reference information 10r2 represents the second correspondence relationship represented by the set line L2 in FIG. 4.

The processor 10a executes the following control while executing the travel control program 10c1 while referring to the first reference information 10r1, and the second reference information 10r2. First, when the normal mode is selected by the creep setting member 16, the processor 10a acquires the rotational speed RS of the engine 6 from the speed sensor 6a, finds a primary pilot pressure corresponding to the detected rotational speed RS of the engine 6 from the first reference information 10r1, and controls the primary pressure control valve CV1 so that the primary pilot pressure is obtained. When the normal mode is selected and the drop amount of the engine 6 is large, the processor 10a determines a primary pilot pressure corresponding to the rotational speed RS of the engine 6 detected by the speed sensor 6a from the second reference information 10r2, and controls a primary pressure control valve CV1 so that the primary pilot pressure becomes the determined primary pilot pressure.

The memory 10b further includes third reference information 10r3 and fourth reference information 10r4. When the creep mode is selected by the creep setting member 16, the processor 10a determines the target rotational speed of the hydraulic motors (31L, 31R) by acquiring the upper limit speed input by the creep setting member 16. Based on the information obtained from the hydraulic pressure sensors SP5L, SP6L, SP5R, SP6R, the processor 10a determines a first differential pressure DP1, which is one of the differential pressures of the hydraulic motor differential pressures of the hydraulic motors (31L, 31R). The processor 10a acquires the rotational speed RSd of the first hydraulic motor having the first differential pressure DP1 among the hydraulic motors (31L, 31R) from the first rotation speed sensor configured to detect the rotation speed of the first hydraulic motor among the rotation speed sensors (SR31L, SR31R). The processor 10a performs feedback control for controlling the control valve (primary pressure control valve CV1) of the pilot pressure of the first hydraulic motor in order to reduce the speed difference e between the target rotational speed of the first hydraulic motor corresponding to the target vehicle speed and the rotational speed of the first hydraulic motor detected by the first rotation speed sensor. The processor 10a extracts information for obtaining the primary pilot pressure from the third reference information 10r3 and the fourth reference information 10r4, and determines the gain of the feedback control based on the extracted information, the absolute value DP1 of the first differential pressure DP1, and the target rotational speed RSi.

In the following embodiments, of the left traveling device 3L and the right traveling device 3R, the traveling device 3 driven by the first hydraulic motor is referred to as a first traveling device. Among the first swash plate switching cylinder 32L and the second swash plate switching cylinder 32R, the cylinder provided in the first hydraulic motor is referred to as a first motor pilot port. The pilot pressure applied to the first motor pilot port is referred to as a first motor pilot pressure. Among the hydraulic pumps (7L and 7R), the hydraulic pumps that supply the hydraulic fluid to the first hydraulic motor are referred to as first hydraulic pumps. Among the ports (any of PLa, PRa, PLb, and PRb) of the first hydraulic pump, a port in which the pilot pressure input by the primary pilot pressure is limited is referred to as a first pump pilot port. The pilot pressure applied to the first pump pilot port is referred to as the first pump pilot pressure. One of driving oil passages (PA5L, PA6L, PA5R, PA6R), one of the two oil passages connecting the first hydraulic motor and the first hydraulic pump is referred to as a first oil passage, and the other oil passage is referred to as a second oil passage. The pilot pressure of the first oil passage is referred to as a first hydraulic pressure, and the pilot pressure of the second oil passage is referred to as a second hydraulic pressure. Among the hydraulic pressure sensors (SP5L, SP6L, SP5R, SP6R), hydraulic pressure sensor configured to detect the second oil pressure is referred to as a second hydraulic pressure sensor. Among the first to fourth pilot oil passages PAl1 to PA14, an oil passage connecting the operation valves OVA, OVB, OVC, and OVD to the first pump pilot port is referred to as a secondary pilot oil passage.

Among the left traveling device 3L and the right traveling device 3R, the traveling device provided on the opposite side of the first hydraulic motor of the vehicle body 2 is referred to as a second traveling device. Among the hydraulic motors (31L, 31R), the hydraulic motor configured to drive the second traveling device is referred to as a second hydraulic motor. The differential pressure of the second hydraulic motor is referred to as a second differential pressure. Among the first swash plate switching cylinder 32L and the second swash plate switching cylinder 32R, the cylinder provided in the second hydraulic motor is referred to as a second motor pilot port. The pilot pressure applied to the second motor pilot port is referred to as a second motor pilot pressure. Among the hydraulic pumps (7L, 7R), the hydraulic pump that supplies the hydraulic fluid to the second hydraulic motor is referred to as a second hydraulic pump. Among the ports (any of PLa, PRa, PLb, and PRb) of the second hydraulic pump, a port in which the pilot pressure input by the primary pilot pressure is limited is referred to as a second pump pilot port. The pilot pressure applied to the second pump pilot port is referred to as the second pump pilot pressure. Among the driving oil passages (PA5L, PA6L, PA5R, PA6R), one of the two oil passages connecting the second hydraulic motor and the second hydraulic pumps is referred to as a third oil passage, and the other oil passage is referred to as a fourth oil passage. The pilot pressure of the third oil passage is referred to as a third hydraulic pressure, and the pilot pressure of the fourth oil passage is referred to as a fourth hydraulic pressure. Among the hydraulic pressure sensors s (SP5L, SP6L, SP5R, SP6R), an oil pressure sensor configured to detect the third oil pressure is referred to as a third oil pressure sensor, and an oil pressure sensor configured to detect the fourth oil pressure is referred to as a fourth oil pressure sensor. Among the rotation speed sensors (SR31L, SR31R), the rotation speed sensor configured to detect the rotational speed of the second hydraulic motor is referred to as a second rotation speed sensor. Among the first to fourth pilot oil passages PA11 to PA14, an oil passage connecting the operation valves OVA, OVB, OVC, and OVD to the second pump pilot port is referred to as an additional secondary pilot oil passage.

Figure 7:
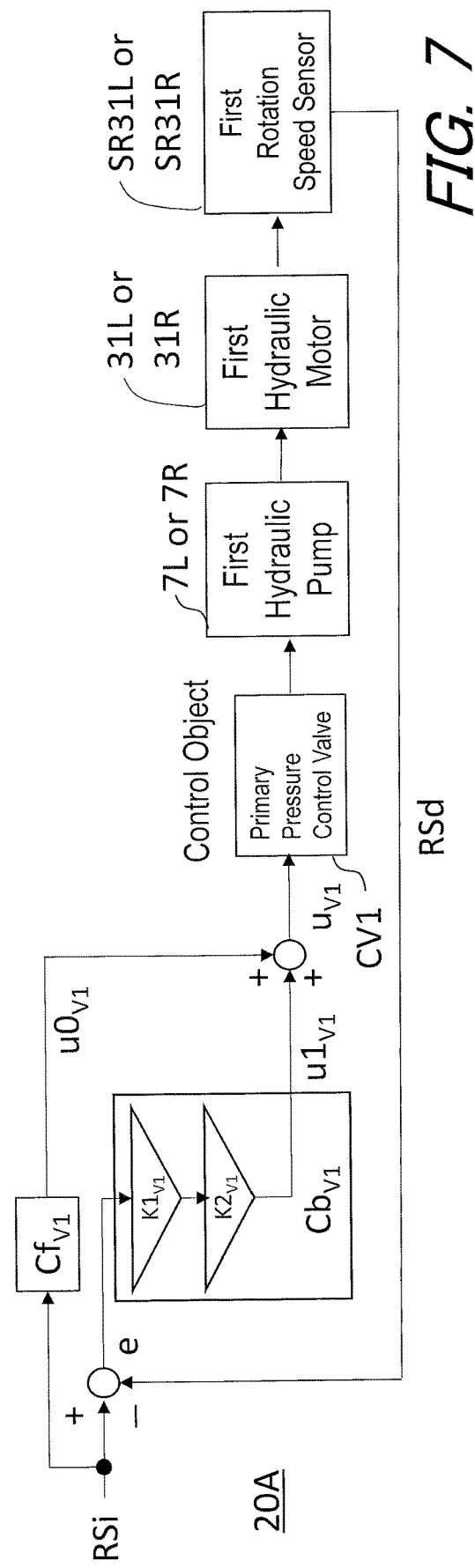
FIG. 7 shows a control block diagram in the first embodiment.

FIG. 7 shows a control block diagram in the first embodiment. The control system 20A according to the first embodiment includes a feed forward controller $Cfv_1$ and a feedback controller $Cbv_1$. The feed forward controller $Cfv_1$ outputs a primary pilot pressure $u0_{v1}$ corresponding to the target rotational speed RSi of the first hydraulic motor. The memory 10b stores a list or conversion formula for the primary pilot pressure $u0_{v1}$ corresponding to the target rotational speed RSi. The processor 10a calculates a target rotational speed RSi of the first hydraulic motor from the upper limit speed input by the creep setting member 16. The processor 10a executing the feed-forward controller $Cfv_1$ derives the primary pilot pressure $u0_{v1}$ from the calculated target rotational speed RSi by using a stored list or conversion equation.

The feedback controller $Cbv_1$ derives adjusted primary pilot pressure $u1_{v1}$ by multiplying speed difference e between the actual rotational speed RSd of the first hydraulic motor detected and the target rotational speed RSi by gain $K1_{v1}$ and gain $K2_{v1}$. In the following first embodiment, the gain $K1_{v1}$ and the gain $K2_{v1}$ are also referred to as a first coefficient and a second coefficient, respectively. That is, the controller 10 determines the feedback gain of the feedback control based on the first coefficient (gain $K1_{v1}$) and the second coefficient (gain $K2_{v1}$). Then, the processor 10a inputs the sum of the primary pilot pressure $u0_{v1}$ and the adjusted primary pilot pressure $u1_{v1}$ to the primary pressure control valve CV1 as the operated variable $u_{v1}$. That is, the processor 10a inputs a current to the solenoid of the primary pressure control valve CV1 so that the primary pilot pressure output from the primary pressure control valve CV1 becomes $u_{v1}$.

Figure 8:
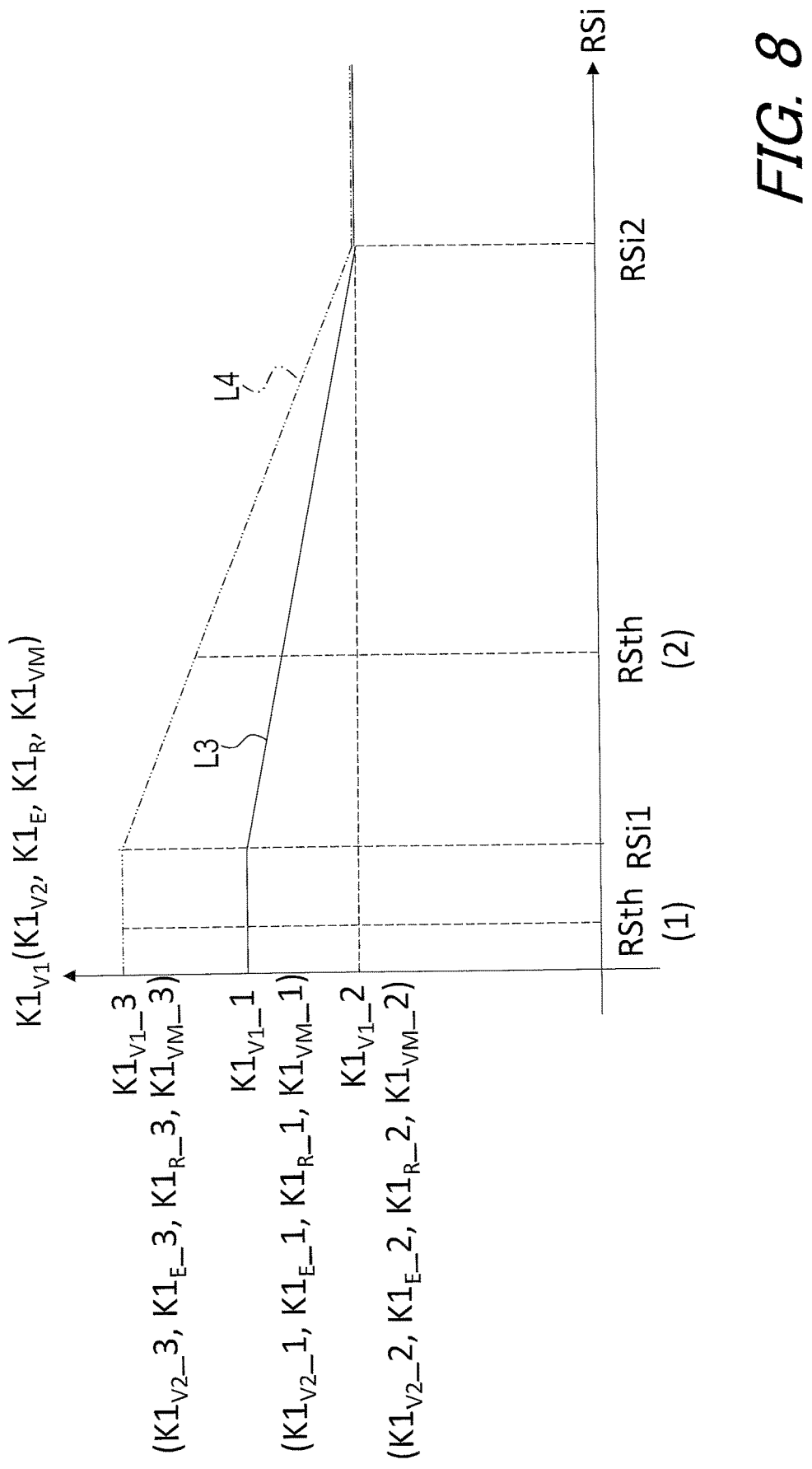
FIG. 8 is a diagram showing the relationship between the target rotational speed of the first hydraulic motor and the first coefficient in the embodiment.

The gain $K1_{v1}$ is a value that increases as the target rotational speed RSi decreases, and the third reference information 10r3 stores a correspondence relationship between the first coefficient (gain $K1_{v1}$) and the target rotational speed RSi of the first hydraulic motor. FIG. 8 is a diagram showing the relationship between the target rotational speed RSi of the first hydraulic motor and the first coefficient (gain $K1_{v1}$) in the embodiment. FIG. 8, the relationship between the target rotational speed RSi of the first hydraulic motor and the first coefficient (gain $K1_{v1}$) is represented by one of set lines L3 and L4. The set line L3 represents a correspondence relationship in a normal case where at least one of conditions 1 to 3 described below is not satisfied. The set line L3 represents a correspondence relationship in a special case where all of conditions 1 to 3 described below are satisfied.

Referring to the set line L3, the first coefficient (gain $K1_{v1}$) is set as a first value when the target rotational speed RSi is equal to or less than the first target rotational speed. RSi1. The first coefficient (gain $K1_{v1}$) is set as a second value $K1_{v1}\_2$ which is smaller than the first value $K1_{v1}\_1$ when the target rotational speed RSi is equal to or higher than a second target rotational speed RSi1 that is higher than the first target rotational speed RSi2. Preferably, the first value $K1_{v1}\_1$ is 1.2 times the second value $K1_{v1}\_2$. Preferably, the first target rotational speed RSi1 is 1 rpm, and the second target rotational speed RSi2 is 50 rpm. When the target rotational speed RSi is higher than the first target rotational speed RSi1 and lower than the second target rotational speed RSi2, the first coefficient (gain K1V1) takes a value between the first value $K1_{v1}\_1$ and the second value $K1_{v1}\_2$. Preferably, when target rotational speed RSi is higher than first target rotational speed RSi1 and lower than the second target rotational speed RSi2, the first coefficient (gain $K1_{v1}$) monotonically decreases as target rotational speed RSi increases.

The relationship between the target rotational speed RSi and the first coefficient (gain $K1_{v1}$) is represented by the set line L4 when all of the following conditions 1 to 3 are satisfied.

[Condition 1] The absolute value of the variation per unit time of the actual rotational speed RSd of the first hydraulic motor is smaller than a first threshold value, or the variation is smaller than a second threshold value that is smaller than a value obtained by multiplying the first threshold value by −1. For this purpose, the controller 10 obtains a variation per unit time of the rotational speed RSd of the first hydraulic motor detected by the first rotation speed sensor. The first threshold value is a positive value and the second threshold value is a negative value. The fact that the absolute value of the variation is smaller than the first threshold value means that the work vehicle is substantially stopped, and the fact that the variation is smaller than the second threshold value means that the work vehicle is substantially greatly decelerated. The fact that the work vehicle substantially stops or greatly decelerates despite the user's intention to operate is highly likely to be a special state such as deceleration on an upward slope or catching on an obstacle (rock or the like). In such a case, the gain is increased to perform control close to the user's intention, thereby improving the user experience.

[Condition 2] The above-described speed difference e is greater than the third threshold. When this condition is satisfied, it means that the actual rotational speed RSd is not equal to the target rotational speed RSi in consideration of noise. The third thresholds are determined in consideration of noise of the rotation speed sensors (SR31L, SR31R). This condition is intended not to increase the gain when the speed difference e is negligibly small. [Condition 3] The target rotational speed RSi is equal to or smaller than the third target rotational speed RSth which is equal to or smaller than the second target rotational speed RSi2. When it is desired to further increase the gain $K1_{v1}$ when the target rotational speed RSi is small, the third target rotational speed RSth is set by the user or the manufacturer. By default, the third target rotational speed RSth is set to be equal to the second target rotational speed RSi2. The third target rotational speed RSth may be equal to or lower than the first target rotational speed RSi1 (represented as RSth (1) in FIG. 8) or may be higher than the first target rotational speed RSi1 and equal to or lower than the second target rotational speed RSi2 (represented as RSth (2) in FIG. 8). In either case, when the above [Condition 1] and [Condition 2] are satisfied, the relationship shifts from the set line L3 to the set line L4 when the third target rotational speed RSth becomes equal to or lower than the RSth.

The value of the first coefficient (gain $K1_{r1}$) represented by the set line L4 is greater than the value of the first coefficient (gain $K1_{r1}$) represented by the set line L3. On the set line L4, when the target rotational speed RSi is equal to or lower than the first target rotational speed RSi1, the first coefficient (gain $K1_{r1}$) is set to the third value $K1_{r1\_3}$. When the target rotational speed RSi is higher than the first target rotational speed RSi1, and lower than the second target rotational speed RSi2, the first coefficient (gain $K1_{r1}$) takes a value between the third value $K1_{r1\_3}$ and the second value $K1_{r1\_2}$. Preferably, when target rotational speed RSi is higher than first target rotational speed RSi1 and lower than second target rotational speed RSi2, first coefficient (gain $K1_{r1}$) monotonically decreases as target rotational speed RSi increases. As described above, the controller 10 determines the first condition to the third condition, and all of the first condition to the third conditions are true, the first coefficient (gain $K1_{r1}$) is increased from the value of the first coefficient (gain $K1_{r1}$) when any one of the first condition to the third condition is false.

Figure 9:
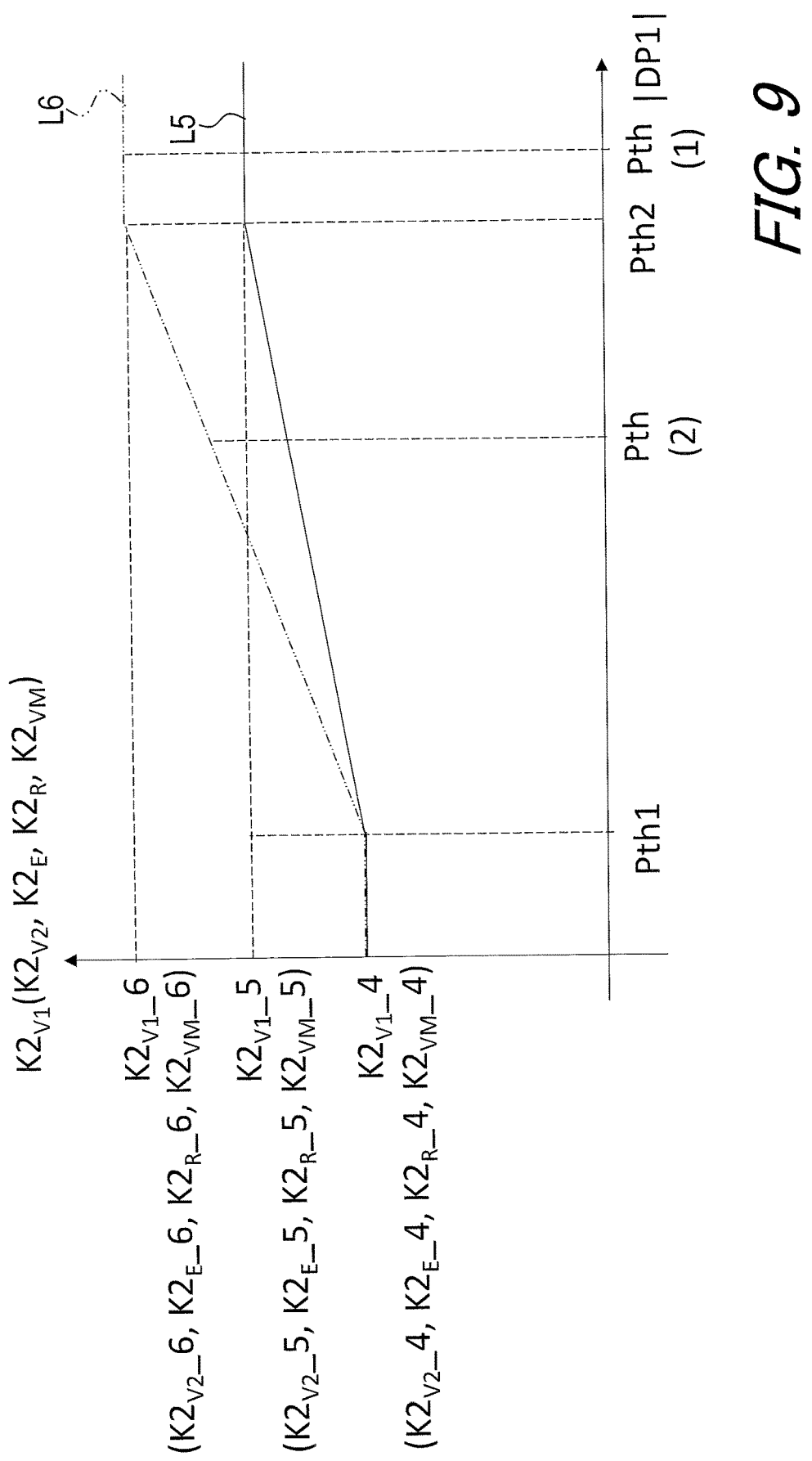
FIG. 9 is a diagram showing a relationship between an absolute value of a first differential pressure and a first coefficient in the embodiment.

The gain $K2_{r1}$ is a value that increases as the absolute value DP1 of the first differential pressure DP1 increases, and the fourth reference information 10r4 stores a correspondence relationship between the second coefficient (gain $K2_{r1}$) and the absolute value DP1 of the first differential pressure DPL. FIG. 9 is a diagram showing the relationship between the absolute values DP1 of the first differential pressure DP1 and the second coefficient (gain $K2_{r1}$). As shown in FIG. 9, the correspondence relationship between the absolute values DP1 of the first differential pressure DP1 and the second coefficient (gain $K2_{r1}$) is represented by either the set line L5 or L6. The set line L5 represents a correspondence relationship in a normal case in which at least one of the above-described conditions 1 and 2 and the below-described condition 4 is not satisfied. The set line L6 represents a correspondence relationship of a special case having all of the following:

With reference to the set line L5, the second coefficient (gain $K1_{r2}$) is set to absolute value DP1 of first differential pressure DP1 is equal to or less than the first threshold pressure Pth1, the fourth value $K1_{r2\_4}$ is set. When the absolute value DP1 of the first differential pressure DP1 is equal to or greater than a second threshold pressure Pth1 greater than the first threshold pressure Pth2, the second coefficient (gain $K1_{r2}$) is set to a fifth value $K1_{r2\_5}$ greater than the fourth value $K1_{r2\_4}$. Preferably, the fifth value $K1_{r2\_5}$ is 1.4 times the fourth value $K1_{r2\_4}$. Preferably, the first threshold pressure Pth1 is 10 MPa and the second threshold pressure Pth2 is 35 MPa. When the absolute value DP1 is smaller than a second threshold pressure Pth1 that is larger than the first threshold pressure Pth2, the second coefficient (gain $K1_{r2}$) takes a value between the fourth value $K1_{r2\_4}$ and the fifth value $K1_{r2\_5}$. Preferably, when the absolute value DP1 is smaller than a second threshold pressure Pth1 greater than the first threshold pressure Pth2, the second coefficient (gain $K1_{r2}$) monotonically increases as the absolute value DP1 increases.

A case where the relationship between the target rotational speed RSi and the second coefficient (gain $K2_{r1}$) is represented by the set line L6 is a case where all of the above-described conditions 1 to 3 and a condition 4 described later are satisfied.

[Condition 4] The absolute value DP1 of the first differential pressure DP1 is equal to or greater than the third threshold pressure Pth which is equal to or greater than the first threshold pressure Pth1. The third threshold pressure Pth is set by a user or a manufacturer when it is desired to further increase the gain $K2_{r1}$ when the absolute value DP1 of the first differential pressure DP1 is large. Default is set equal to the first threshold pressure Pth1. There may be any of a case that the third threshold pressure Pth is equal to or greater than the second threshold pressure Pth2 (represented as Pth (1) in FIG. 9) or equal to or greater than the first threshold pressure Pth1 and less than the second threshold pressure Pth2 (represented as Pth (2) in FIG. 9) In either case, when [Condition 1] and [Condition 2] are satisfied, the relationship shifts from the set line L5 to the set line L6 when the pressure becomes equal to or greater than Pth.

The value of the second coefficient (gain $K2_{r1}$) represented by the set line L6 is greater than the value of the second coefficient (gain $K2_{r1}$) represented by the set line L5. In the set line L6, when the absolute value DP1 of the first differential pressure DP1 is equal to or greater than the second threshold pressure Pth2, the second coefficient (gain $K2_{r1}$) is set to the sixth value $K2_{r1\_6}$. When the absolute value DP1 of the first differential pressure DP1 is larger than the first threshold pressure Pth1 and smaller than the second threshold pressure Pth2, the second coefficient (the gain $K2_{r1}$) takes a value between the fourth value $K1_{r2\_4}$ and the sixth value $K2_{r1\_6}$. Preferably, when the absolute value DP1 of the first differential pressure DP1 is greater than the first threshold pressure Pth1 and less than the second threshold pressure Pth2, the second coefficient (gain $K2_{r1}$) monotonically increases as the absolute value DP1 of the first differential pressure DP1 increases. As described above, the controller 10 determines the first condition to the fourth condition, and when all of the first condition to the fourth condition are true, increases the second coefficient (gain $K2vi$) from the value of the second coefficient (gain $K2_{r1}$) when any one of the first condition to the fourth condition is false.

Operation of Work Vehicle According to First Embodiment

Figure 10:
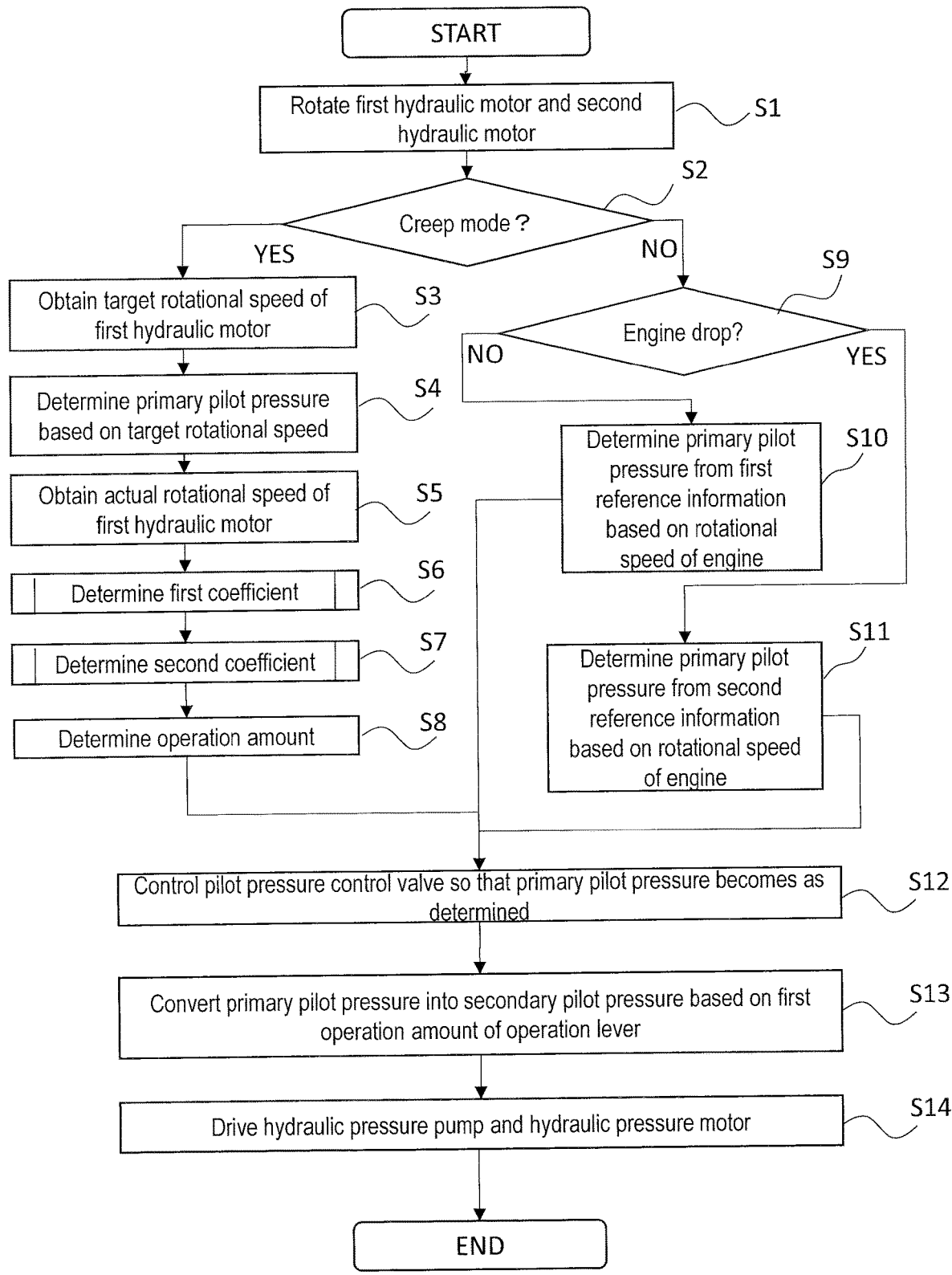
FIG. 10 is a flowchart showing the operation of the work vehicle according to the first embodiment.

FIG. 10 is a flowchart illustrating the operation of the work vehicle 1 according to the first embodiment. In this flowchart, the processing from step S1 to step S14 is executed at predetermined sampling intervals (for example, 20 μs). In step S1, the processor 10a drives the engine 6 to rotate the first hydraulic pumps. The processor 10a supplies the hydraulic fluid from the first hydraulic pump to the first hydraulic motor that drives the first traveling device provided in the vehicle body 2 to rotate the first hydraulic motor. In addition, the processor 10a causes the second hydraulic motor to rotate by sending the hydraulic fluid from the second hydraulic pump to the second hydraulic motor that drives the second traveling device provided on the opposite side of the first traveling device in the vehicle body 2. In step S2, the processor 10a determines whether or not the creep mode is selected by the creep setting member 16. That is, the control method according to the present embodiment includes determining whether or not the mode is selected by the creep setting member 16. When the creep mode is set, that is, when the upper limit speed is set (Yes in step S2), the process proceeds from step S3 to step S8. When the normal mode is set, that is, when the upper limit speed is not set, or when an invalid upper limit speed not having the first correspondence relationship or the second correspondence relationship is set (No in step S2), the process proceeds from step S9 to step S11.

In the creep mode (Yes in step S2), in step S3, the processor 10a acquires the upper limit speed input by the creep setting member 16, that is, the target rotational speed RSi of the first hydraulic motor. That is, in the control method according to the present embodiment, the upper limit speed input by the creep setting member 16, that is, the target rotational speed RSi of the first hydraulic motor is acquired. In step S4, the processor 10a executes the processing of the feed forward controller CfV1 and outputs the primary pilot pressure u0V1. In step S5, the first rotational speed sensor detects the rotational speed RSd of the first hydraulic motor, and the processor 10a obtains the detected rotational speed RSd.

Figure 11:
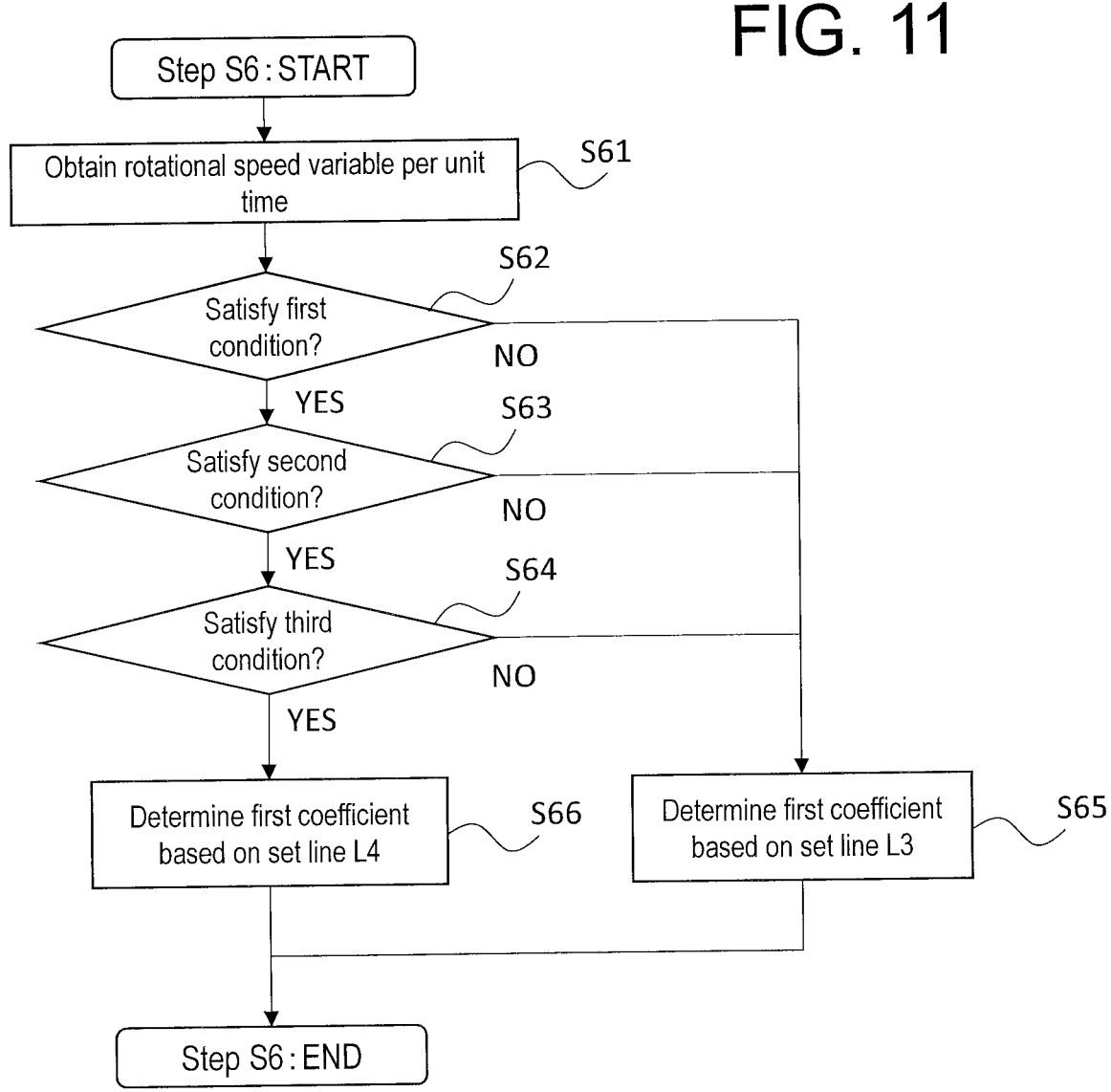
FIG. 11 is a flowchart illustrating the operation of the method for determining the first coefficient.

In step S6, the processor 10a refers to the third reference information 10r3, and a first coefficient (gain $K1_{v1}$) is determined. FIG. 11 is a flowchart illustrating an operation of a method of determining the first coefficient (gain $K1_{v1}$). In step S61, the processor 10a obtains a variation of the rotational speed RSd per unit time. In step S62, the processor 10a determines a first condition that is true when the absolute magnitude of the variation is smaller than a first threshold value or when the variation is smaller than a second threshold value that is smaller than a value obtained by multiplying the first threshold value by −1, and false otherwise. When the first condition is true (Yes in step S62), the process proceeds to step S63, and when the first condition is false (No in step S62), the process proceeds to step S65. In step S63, the processor 10a determines a second condition that is true when the absolute value of a velocity difference e is greater than the third threshold value, and is false otherwise. When the second condition is true (Yes in step S63), the process proceeds to step S64, and when the second condition is false (No in step S63), the process proceeds to step S65. In step S64, the processor 10a determines a third condition that is true when the target rotational speed RSi is equal to or lower than a third target rotational speed RSth that is lower than the second target rotational speed RSi2 and is false otherwise. When the third condition is true (Yes in step S64), the process proceeds to step S66, and when the third condition is false (No in Step S66), then, the process proceeds to Step S65. When any one of first condition, second condition, and third condition is false (when No in any one of steps S62 to S64), in step S65, the processor 10a is configured to determine the first coefficient (gain $K1_{v1}$) corresponding to the target rotational speed RSi based on: the set line L3. When all of the first condition, second condition, and third condition are true (when all of the steps S62 to S64 are Yes), in step S65, the processor 10a determines the first coefficient (gain $K1_{v1}$) corresponding to the target rotational speed RSi based on the set line L4. When the target rotational speed RSi is equal to or lower than the third target rotational speed RSth, as the set line L4 is higher than the set line L3, in step S66, the processor 10a increases the first coefficient (gain $K1_{v1}$) from the value determined in step S65.

Figure 12:
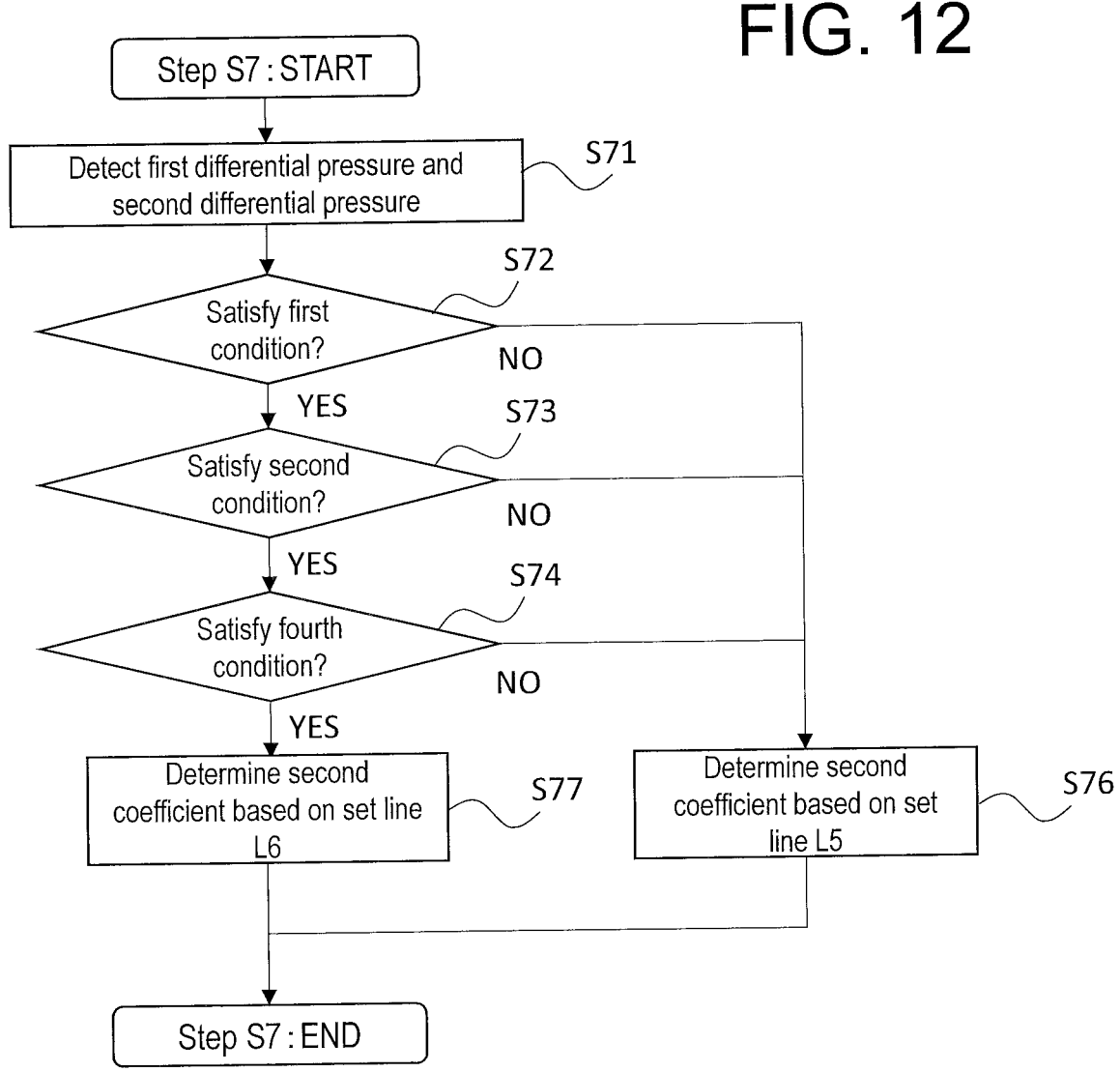
FIG. 12 is a flowchart showing the operation of the method for determining the second coefficient.

In step S7, the processor 10a determines the second coefficient (gain $K2_{v1}$) with reference to the fourth reference information 10r4. FIG. 12 is a flowchart illustrating an operation of a method of determining the second coefficient (gain $K2_{v1}$). In step S71, the hydraulic pressure sensors s SP5L, SP6L, SP5R, SP6R detect the first differential pressure DP1 and the second differential pressure, and the processor 10a determines the first differential pressure DP1 and the second differential pressure. In step S72, the processor 10a determines the first condition described above. When the first condition is true (Yes in step S72), the process proceeds to step S73, and when the first condition is false (No in step S72), the process proceeds to step S76. In step S73, the processor 10a determines the second condition described above. When the second condition is true (Yes in step S73), the process proceeds to step S74, and when the second condition is false (No in step S73), the process proceeds to step S76. In step S74, the processor 10a determines a fourth condition that is true when the absolute value DP1 of the first differential pressure DP1 is equal to or greater than a third threshold pressure Pth that is greater than the first threshold pressure Pth1, and is false otherwise. When the fourth condition is true (Yes in step S74), the process proceeds to step S77, and when the third condition is false (No in step S74), the process proceeds to step S76. When any one of the first condition, the second condition, and the fourth condition is false (No in any one of steps S72 to S74), in step S76, the processor 10a determines the second coefficient (gain $K2_{v1}$) corresponding to the absolute value DP1 of the first differential pressure DP1 based on the set line L5. The absolute value of the second differential pressure is smaller than the absolute value of the first differential pressure DP1, and according to FIG. 9, the second coefficient (gain $K2_{v1}$) is set to be larger as the absolute value DP1 of the first differential pressure DP1 is larger. Therefore, when the absolute value DP1 of the first differential pressure DP1 is larger than the absolute value of the second differential pressure, the processor 10a increases the second coefficient (gain $K2_{v1}$). When all of the first condition, the second condition, and the fourth condition are true (when all of the steps S72 to S74 are Yes), in step S77, the processor 10a determines the second coefficient (gain $K2_{v1}$) corresponding to the absolute value DP1 of the first differential pressure DP1 based on the set line L6. When the absolute value DP1 of the first differential pressure DP1 is equal to or less than the third threshold pressure Pth, the set line L6 is above the set line L5, and therefore, in step S77, the processor 10a increases the second coefficient (gain K2v1) from the value determined in step S76.

In step S8, the processor 10a determines the operated variable $u0_{v1}=u0_{v1}+K1_{v1}*K2_{v1}*e$ based on based on the obtained primary pilot pressure $u0_{v1}$, the first coefficient (gain $K1_{v1}$), and the second coefficient (gain $K2_{v1}$). That is, the operated variable $u_{v1}$ of the feedback control is input to the primary pressure control valve CV1 that adjusts the primary pilot pressure which is the hydraulic pressure of the primary pilot oil passage connecting the pilot pump 71 for discharging the pilot oil toward the pilot ports (PLa, PRa, PLb, PRb) of at least one of the hydraulic pumps (first hydraulic pump, second hydraulic pump) and the operation valves (OVA, OVB, OVC, OVD) operated by the travel instruction input device (operation lever 55) to which the instruction of the travel direction by the user is input.

In step S12, the processor 10a controls the primary pressure control valve CV1 such that the determined operated variable becomes the primary pilot pressure output from the primary pressure control valve CV1. Accordingly, the processor 10a performs feedback control with the control valve (primary pressure control valve CV1) of the pilot pressure of the first hydraulic pump as a control target so as to reduce the speed difference e between the target rotational speed RSi of the first hydraulic motor corresponding to the target vehicle speed and the detected rotation speed RSD. The feedback gain is determined based on the first coefficient (gain $K1_{r1}$) that increases as the target rotational speed RSi decreases, and is determined based on the second coefficient (gain $K2_{r1}$) that increases as the absolute value DP1 of the detected first differential pressure DP1 increases.

In the normal mode (No in step S2), in step S9, the processor 10a acquires the rotational speed RS of the engine 6 detected by the speed sensor 6a. Then, the processor 10a determines whether or not there is an engine drop. That is, in step S9, the processor 10a determines whether or not the decrease amount ΔE1 of the engine 6 is equal to or larger than the anti-stall determination value. When there is no engine drop (No in step S9), in step S10, the processor 10a obtains the primary pilot pressure from the first reference information 10r1 based on the rotational speed RS of the engine 6. When there is an engine drop (Yes in step S9), in step S11, the processor 10a obtains the primary pilot pressure from the second reference information 10r2 based on the rotational speed RS of the engine 6. After completion of the processing of step S10 or step S11, the processing of step S12 is executed.

In step S12, the processor 10a controls primary pressure control valve CV1 to supply the pilot oil to the operation valves OVA, OVB, OVC, OVD to become the primary pilot pressure obtained in step S10 or step. In Step S13, the operation valves OVA, OVB, OVC, and OVD convert the primary pilot pressure into the secondary pilot pressure based on the lever position (first operated variable) of the operation lever 55 (first operation device). In step S14, the secondary pilot pressure of the pilot oil is applied to ports (PLa, PRa, PLb, PRb) providing hydraulic pressure to the swash plate of the hydraulic pumps (the first hydraulic pump and the second hydraulic pump), and the hydraulic motors (31L and 31R) and hydraulic pumps (the first hydraulic pump and the second hydraulic pump) are controlled.

Operation and Effect of First Embodiment

When feeding back the vehicle speed of the work vehicle 1, even if the speed difference e is the same, if the target vehicle speed is small, the deviation from the target is large, and if the target vehicle speed is large, the deviation from the target is small. In the control method of the work vehicle 1 or the work vehicle 1 according to the first embodiment, since the feedback gain is increased as the traveling speed becomes slower, the vehicle speed can be quickly returned to the target vehicle speed even if there is an influence of such a deviation. In addition, when feeding back the speed of the work vehicle 1, it is more difficult to control the swash plates of the hydraulic pumps (the first hydraulic pumps and the second hydraulic pumps) as the absolute value DP1 of the first differential pressure DP1 is higher. In the control method for the work vehicle 1 or the work vehicle 1 according to the first embodiment, the feedback gain is increased as the absolute value DP1 of the first differential pressure DP1 is higher. Therefore, regardless of the magnitude of the first differential pressure DP1, it is possible to perform control of the primary pilot pressure to quickly return to the target vehicle speed.

Second Embodiment

Figure 13:
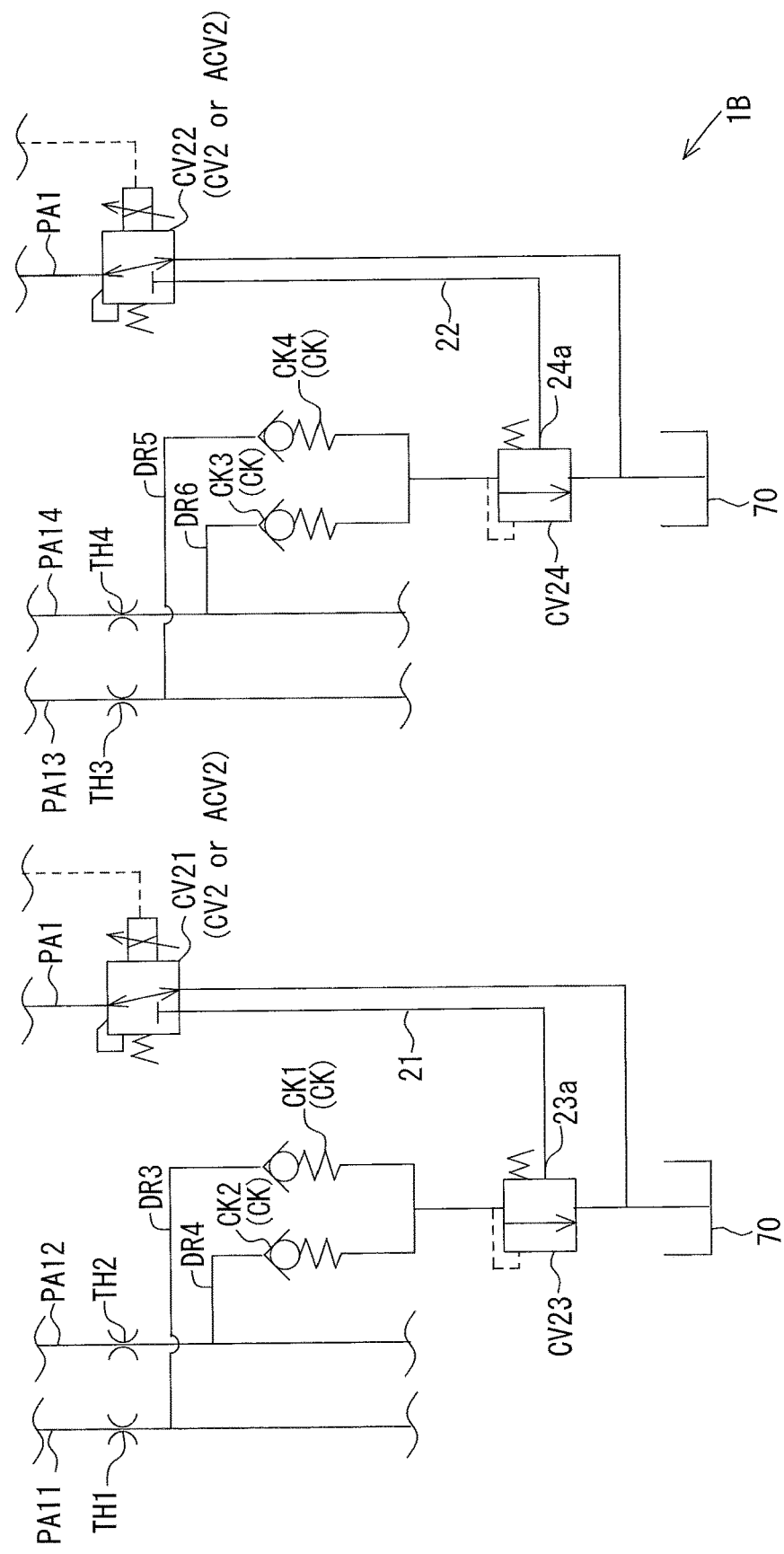
FIG. 13 is a hydraulic circuit diagram of a traveling system of the work vehicle according to the second embodiment.

Although the primary pilot pressure is controlled in order to realize the creep mode in the first embodiment, the secondary pilot pressure may be controlled. FIG. 13 is a hydraulic circuit diagram of a traveling system of the work vehicle 1 according to the second embodiment. FIG. 13 shows a configuration added to FIG. 3. In FIG. 13, the same components as those in FIG. 3 are denoted by the same reference numerals, and a detailed description thereof will be omitted. In the second embodiment, the work vehicle 1 includes a hydraulic circuit 1B. With respect to the configuration of the hydraulic circuit 1B, the hydraulic circuit 1A includes relief valves CV23 and CV24, proportional valves CV21 and CV22, discharge oil passages DR3 to DR6, and check valves CK1 to. CK4, and throttles TH1 to TH4.

The relief valves CV23, CV24 are balance type relief valves whose set pressures for opening are variable based on pressures of the pilot oil, and have control ports 23a, 24a for receiving the pilot oil. The relief valves CV23, CV24 are configured to open when pressures at the input ports are greater than pressures at the control ports 23a, 24a. At this time, the pilot oil is discharged to the hydraulic fluid tank 70. The proportional valves CV21 and CV22 are connected to the hydraulic fluid passages 21 and 22 connected to the control ports 23a and 24a, and are supplied with pilot oil from the pilot pump 71. The proportional valves CV21 and CV22 are solenoid proportional valves whose opening degrees can be changed by exciting solenoids, and are controlled by the controller 10.

The proportional valves CV21, CV22 are connected to the pilot supply oil passage PA1, controlled to be a pressure by adding an offset a in consideration of outflow of the pilot oil from the relief valves CV23 and CV24 to the primary pressure control valve CV1 in the first embodiment, and operated in a normal mode to be a value obtained by adding an offset a to the set line L1 when the anti-stall control is not performed, and to be a value obtained by adding the offset a to the set line L2. Among the proportional valves CV21 and CV22, the proportional valve that controls the hydraulic pressure of the pilot oil in the secondary pilot oil passage may be referred to as a secondary pressure control valve CV2, and the proportional valve that controls the pilot oil in the additional secondary pilot oil passage may be referred to as an additional secondary pressure control valve ACV2. That is, the secondary pressure control valve CV2 controls the secondary pilot pressure which is the hydraulic pressure of the pilot oil in the secondary pilot oil passage. The additional secondary pressure control valve ACV2 controls an additional secondary pilot pressure which is a hydraulic pressure of the pilot oil in the additional secondary pilot oil passage. The controller 10 performs feedback control by controlling the pilot pressure control valve of the first hydraulic pump (Secondary pressure control valve CV2 and additional secondary pressure control valve ACV2) to reduce the speed difference e between the target rotational speed RSi of the first hydraulic motor corresponding to the target vehicle speed and the detected rotational speed RSd. Further, the operated variable of the feedback control is input to the secondary pressure control valve CV2 and the additional secondary pressure control valve ACV2 which adjust the secondary pilot pressure which is the hydraulic pressure of the secondary pilot oil passage connecting the operation valves OVA, OVB, OVC, OVD controlled by the travel instruction input device (operation lever 55) to which the instruction of the traveling direction by the user is input and the pilot ports (PLa, PRa, PLb, PRb) of the at least one hydraulic pumps (first hydraulic pumps, second hydraulic pumps).

The discharge oil passage DR3 is connected to the first pilot oil passage PA11. The discharge oil passage DR4 is connected to the second pilot oil passage PA12. The discharge oil passage DR5 is connected to the third pilot oil passage PA13. The discharge oil passage DR6 is connected to the fourth pilot oil passage PA14. The check valves CK1 to CK4 block the discharge oil passages DR3 to DR6 unless the pressures on the sides where the throttles TH1 to TH4 are located do not become larger than the pressures on the sides where the relief valves CV23 and CV24 are located by a predetermined value or more.

In the discharge oil passage DR3 and the discharge oil passage DR4, the pilot pressure increases when the left hydraulic pump 7L rotates in the forward direction and in the reverse direction, respectively. Therefore, when the pilot pressure on one side of either one becomes equal to the primary pilot pressure, the pilot pressure on the other side becomes significantly smaller than the primary pilot pressure. In the discharge oil passage DR5 and the discharge oil passage DR6, the pilot pressure becomes high when the right hydraulic pump 7R rotates in the forward direction and in the reverse direction, respectively. Therefore, when the any one side of the pilot pressure becomes equal to the primary pilot pressure, the other side of the pilot pressure becomes much smaller than the primary pilot pressure. Thus, normally, only one of the check valves CK1 and CK2 is opened. Therefore, the proportional valves CV21 and CV22 can perform the above-described control by controlling the pressures of the proportional valves CV21 and CV22 so that the pressures obtained by the control of the primary pressure control valve CV1 according to the first embodiment plus the pressure loss due to the outflow of the pilot oil from the relief valves CV23 and CV24.

The throttle TH1 is provided in the first pilot oil passage PA11 between the first shuttle valve SVa and the discharge oil passage DR3 and configured to reduce the flow rate of the pilot oil in the first pilot oil passage PA11. The throttle TH2 is provided in the second pilot oil passage PA12 between the second shuttle valve SVb and the discharge oil passage DR4, and is configured to reduce the flow rate of the pilot oil in the second pilot oil passage PA12. The throttle TH3 is provided in the third pilot oil passage PA13 between the third shuttle valve SVc and the discharge oil passage DR5, and is configured to reduce the flow rate of the pilot oil in the third pilot oil passage PA13. The throttle TH4 is provided in the fourth pilot oil passage PA14 between the fourth shuttle valve SVd and the discharge oil passage DR6, and is configured to reduce the flow rate of the pilot oil in the fourth pilot oil passage PA14.

Figure 14:
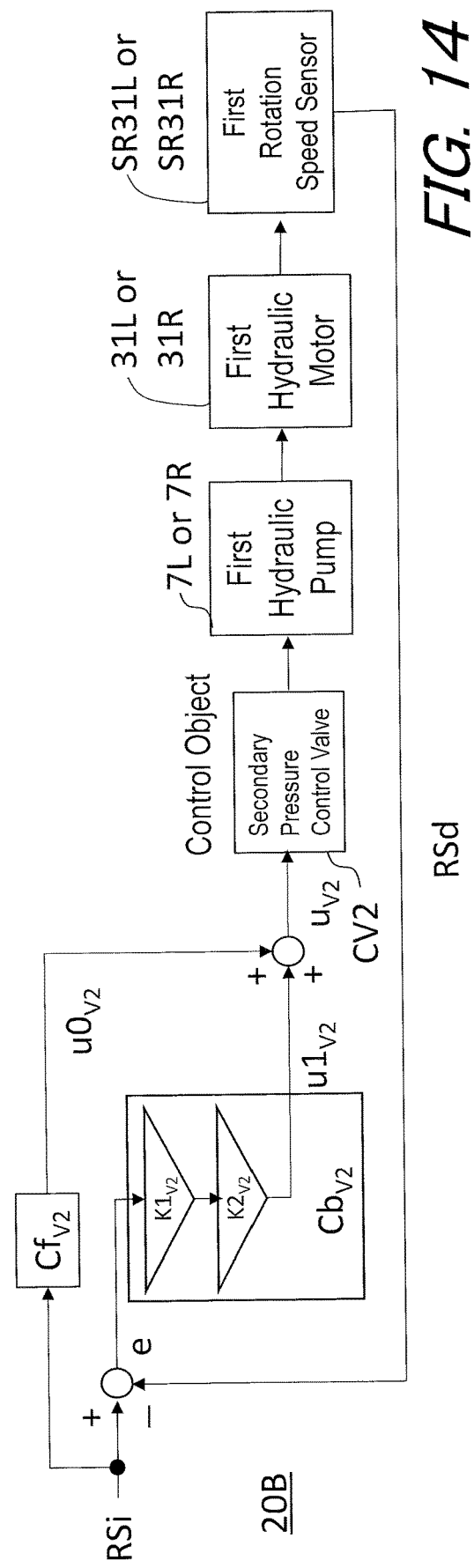
FIG. 14 shows a control block diagram in the second embodiment.

FIG. 14 is a control block diagram according to the second embodiment. The main difference between the control system 20B according to the second embodiment and the control system 20A according to the first embodiment is that the control target is the secondary pressure control valve CV2. However, most parts of the control system according to the second embodiment are the same as those of the control system 20A, and thus the difference will be mainly described. The control system 20B includes a feed-forward controller Cfv2 and a feedback controller $Cb_{v2}$. The feed-forward controller Cfv2 outputs the secondary pilot pressure $u0_{v2}$ corresponding to the target rotational speed RSi of the first hydraulic motor. The memory 10b stores a list or a conversion formula of the secondary pilot pressure $u0_{v2}$ corresponding to the target rotational speed RSi. The processor 10a executing the feed-forward controller Cfv2 derives the secondary pilot pressure $u0_{v2}$ from the calculated target rotational speed RSi by means of a stored list or a conversion equation.

The feedback controller $Cbv_2$ multiplies the speed difference e between the actual rotational speed RSd of the first hydraulic motor detected by the first rotational speed sensor and the target rotational speed RSi by the gain $K1_{v2}$ and the gain $K2_{v2}$ to derive the adjusted secondary pilot pressure $u1_{v2}$. In the following first embodiment, the gain $K_{v2}$ and the gain $K2_{v2}$ are also referred to as a first coefficient and a second coefficient, respectively. That is, the controller 10 determines the feedback gain of the feedback control based on the first coefficient (gain $K1_{v2}$) and the second coefficient (gain $K2_{v2}$). Then, the processor 10a inputs the sum of the secondary pilot pressure $u0_{v2}$ and the adjusted secondary pilot pressure $u1_{v2}$ to the secondary pressure control valve $C_{v2}$ as the operated variable $u_{v2}$. That is, the processor 10a inputs a current to the solenoid of the secondary pressure control valve CV2 so that the secondary pilot pressure output from the secondary pressure control valve CV2 becomes uV2.

The gain $K1_{v2}$ is a value that increases as the target rotational speed RSi decreases, and the third reference information 10r3 stores a correspondence relationship between the first coefficient (gain $K1_{v2}$) and the target rotational speed RSi of the first hydraulic motor. This correspondence relationship is represented by replacing the first value $K1_{v1\_1}$ in FIG. 7 with the first value $K1_{v2\_1}$ corresponding to the gain $K1_{v2}$, replacing the second value $K1_{v1\_2}$ in FIG. 8 with the second value $K1_{v2\_2}$ corresponding to the gain $K1_{v2}$, and replacing the third value $K1_{v1\_3}$ in FIG. with the third value $K1_{v2\_3}$ corresponding to the gain $K1_{v2}$. Note that as long as the magnitude relationship among the first value $K1_{v2\_1}$, the second value $K1_{v2\_2}$, and the third value $K1_{v2\_3}$ does not change, $K1_{v1\_1}$ and $K1_{v2\_1}$ may be the same value or different values, $K1_{v1\_2}$ and $K1_{v2\_2}$ may be the same value or different values, and $K1_{v1\_3}$ and $K1_{v2\_3}$ may be the same value or different values. The characteristics of the set line L3 and the set line L4, and the conditions for the transition of the set line L3 and the set line L4 are the same as those in the first embodiment.

The gain $K2_{v2}$ is a value that increases as the absolute value DP1 of the first differential pressure DP1 increases, and the fourth reference information 10r4 stores a correspondence relationship between the second coefficient (gain $K2_{v2}$) and the absolute value DP1 of the first differential pressure DPL. This correspondence relationship is represented by replacing the fourth value $K2_{v1\_4}$ in FIG. 9 with the fourth value $K2_{v2\_4}$ corresponding to the gain $K2_{v2}$, replacing the fifth value $K2_{v1\_5}$ in FIG. 9 with the fifth value $K2_{v2\_5}$ corresponding to the gain $K2_{v2}$, and replacing the sixth value $K3_{v1\_6}$ in FIG. 9 with the sixth value $K2_{v2\_6}$ corresponding to gain $K2_{v2}$. Note that as long as the magnitude relationship among the fourth value $K2_{v2\_4}$, the fifth value $K2_{v2\_5}$, and the sixth value $K2_{v2\_6}$ does not change, $K2_{v1\_4}$ and $K2_{v2\_4}$ may be the same value or different values, $K2_{v1\_5}$ and $K2_{v2\_5}$ may be the same value or different values, and $K2_{v1\_6}$ and $K3_{v2\_6}$ may be the same value or different values. The characteristics of the set line L5 and the set line L5, and conditions for the transition of the set line L5 and the set line L6 are the same as those in the first embodiment.

Figure 15:
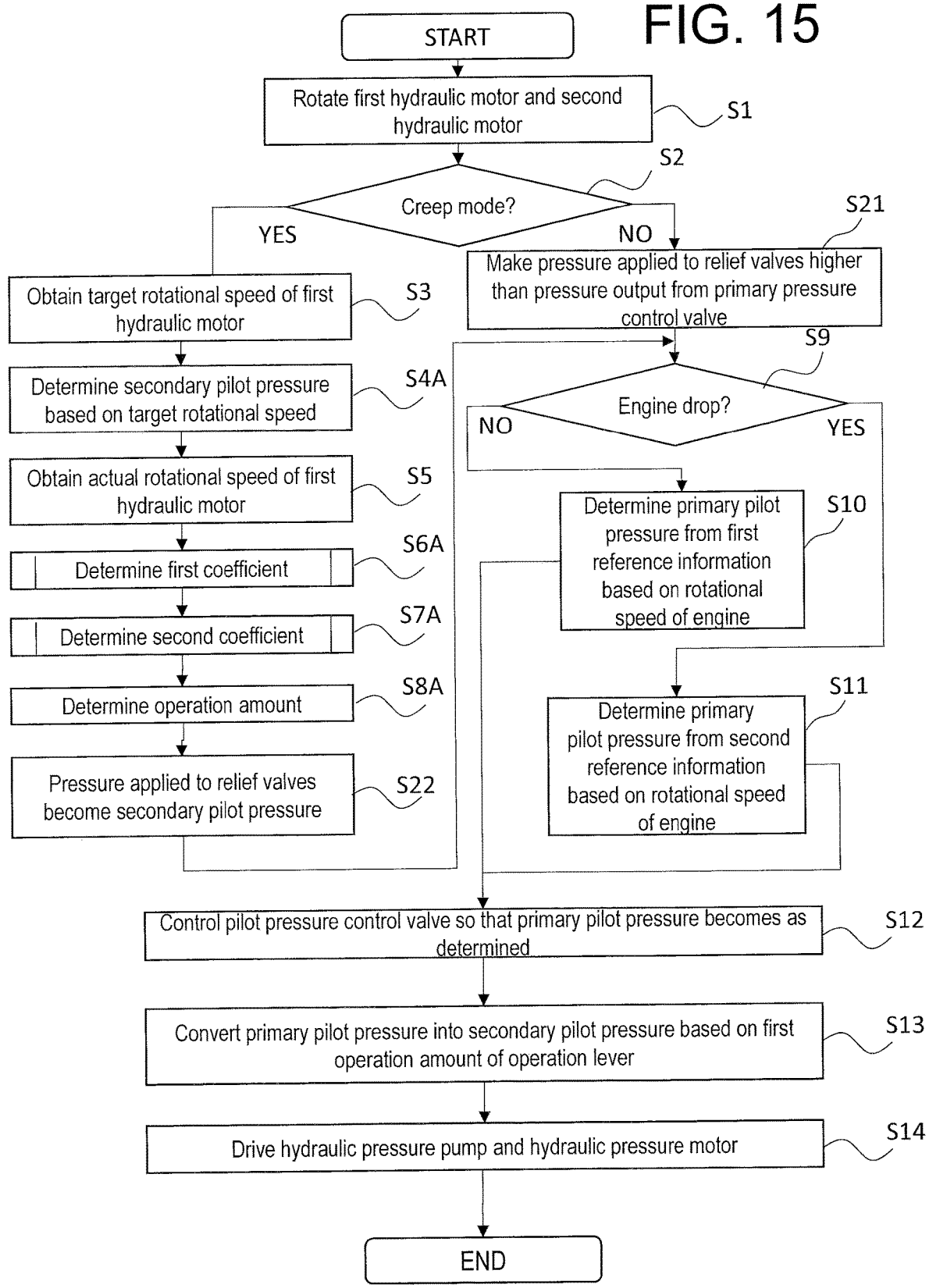
FIG. 15 is a flowchart showing the operation of the work vehicle according to the second embodiment.

FIG. 15 is a flowchart illustrating the operation of the work vehicle 1 according to the second embodiment. In this flowchart, the processing from step S1 to step S14 is executed at predetermined sampling intervals (for example, 20 μs). In FIG. 15, the same processes as those in FIG. 10 are denoted by the same step numbers, and description thereof is omitted. In the normal mode (Yes in step S2), in step S21, the processor 10a controls the proportional valves CV21 and CV22 so that the pressures applied to the relief valves CV23 and CV24 are higher than the pressures output from the primary pressure control valve CV1 as described above. Thereby relief valves CV23, CV24 are closed.

In the creep mode (Yes in step S2), after step S3, in step S4A, the processor 10a executes the processing of the feed forward controller Cfv2 and outputs the secondary pilot pressure u0V2. After step S5, in step S6A, the processor 10a determines the first coefficient (gain K1V2) with reference to the third reference information 10r3 storing the correspondence relationship between the first coefficient (gain K1V2) and the target rotational speed RSi of the first hydraulic motor. The determination method is the same as that in the first embodiment. Thereafter, in step S7A, the processor 10a determines the second coefficient (gain $K2_{V2}$) with reference to the fourth reference information 10r4 that stores the correspondence relationship between the second coefficient (gain $K2_{V2}$) and the absolute value DP1 of the first differential pressure DPL. The determination method is the same as that in the first embodiment.

In step S8A, the processor 10a determines the operated variable $u_{V2}=u0_{V2}+K1_{V2}*K2_{V2}*e$ based on the obtained secondary pilot pressure $u0_{V2}$, the first coefficient (gain $K1_{V2}$) and the second coefficient (gain $K2_{V2}$). That is, the operated variable $u_{V2}$ of the feedback control is input to the secondary pressure control valve CV2 and the additional secondary pressure control valve ACV2 which adjust the secondary pilot pressure which is the hydraulic pressure of the secondary pilot oil passage connecting the operation valves (OVA, OVB, OVC, OVD) operated by the travel instruction input device (operation lever 55) to which the instruction of the traveling direction is input by the user and the pilot ports (PLa, PRa, PLb, PRb) of the at least one hydraulic pumps (first hydraulic pumps, second hydraulic pumps).

Thereafter, in step S22, the processor 10a is configured to control secondary pressure control valve CV2 and the additional secondary pressure control valve ACV2 (proportional valves CV21 and CV22) such that the pressures applied to the relief valves CV23, CV24 become secondary pilot pressures equal to the operated variable uV2. That is, the processor 10a performs feedback control on the control valves (the secondary pressure control valveCV2 and the additional secondary pressure control valve ACV2) of the pilot pressure of the first hydraulic pump so as to reduce the speed difference e between the target rotational speed RSi of the first hydraulic motor corresponding to the target vehicle speed and the detected rotational speed RSd. After step S22, the process proceeds to step S9.

Operation and Effect of Second Embodiment

In the control method of the work vehicle 1 or the work vehicle 1 according to the second embodiment, it is possible to control the secondary pilot pressure to quickly return to the target vehicle speed as in the first embodiment.

Modification of Second Embodiment

Figure 16:
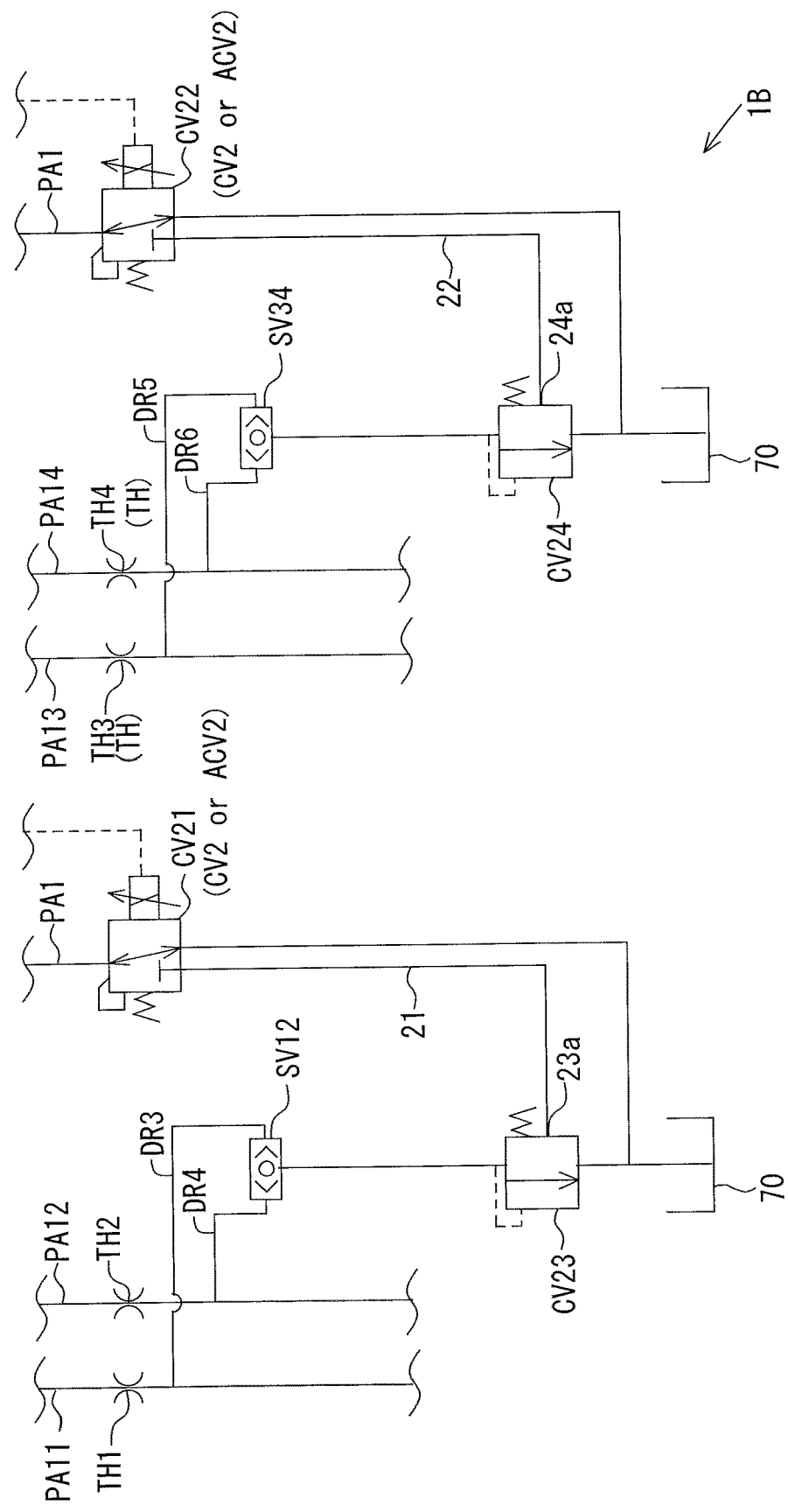
FIG. 16 is a hydraulic circuit diagram of a traveling system of the work vehicle in a modified example of the second embodiment.

FIG. 16 is a hydraulic circuit diagram according to a modification of the second embodiment. In the example of FIG. 16, shuttle valves SV12 and SV34 are provided instead of the check valves CK1 to CK4 of the example of FIG. 13. The shuttle valve SV12 connect the discharge oil passage DR3 and the discharge oil passage DR4, whichever has the higher hydraulic pressure, to the relief valve CV23. The shuttle valve SV34 connect the discharge oil passage DR5 and the discharge oil passage DR6, whichever has the higher hydraulic pressure, to the relief valves CV24. Even with this configuration of the hydraulic circuit, the above-described control can be executed. In the circuit shown in FIG. 9 or 11, the primary pressure control valve CV1 may be omitted. Further, at least one of the combinations of the secondary pressure control valve CV2 and the balance type relief valve and the combination of the additional secondary pressure control valve ACV2 and the balance type relief valve may be realized by solenoid proportional type relief valve.

The second embodiment shows an example in which the processor 10a controls the second pump pilot pressure applied to the second pump pilot port of the second hydraulic pump in accordance with the absolute value of the first differential pressure when the absolute value of the first differential pressure is greater than the absolute value of the second differential pressure. However, when the difference between the absolute value of the first differential pressure DP1 and the absolute value of the second differential pressure is within a predetermined range, the processor 10a may control the second pump pilot pressure applied to the second pump pilot port of the second hydraulic pump in response to the absolute value of the second differential pressure. In this case, the absolute value DP1 of the first differential pressure DP1 in FIG. 9 may be read as the absolute value of the second differential pressure, and the processor 10a may control such that the sum of the product of the second coefficient on the vertical axis and the second differential pressure and the secondary pilot pressure u0V2 is output from the additional secondary pressure control valve ACV. With this configuration, when the absolute value of the first differential pressure DP1 and the absolute value of the second differential pressure are not significantly different from each other, it is possible to realize an operation such as turning close to the user's desire by separately controlling the left and right traveling device.

Third Embodiment

Figure 17:
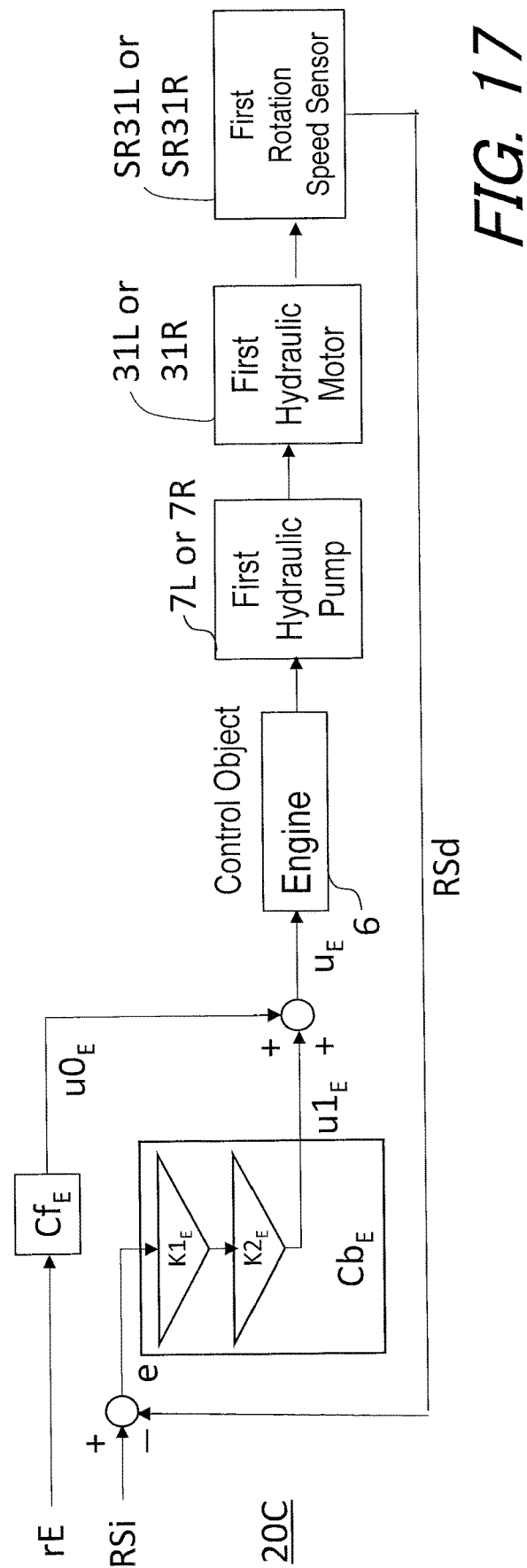
FIG. 17 is a control block diagram according to the third embodiment.

In the first embodiment and the second embodiment, the controller 10 controls the first pump pilot pressure and the second pump pilot pressure. However, the controller 10 may control not only these pilot pressures but also the engine rotational speed. FIG. 17 shows a control block diagram in the third embodiment. The control system 20C according to the third embodiment is mainly different from the control system 20A according to the first embodiment in that the control target is the target rotational speed of the engine 6. However, most parts of the control system 20C according to the third embodiment are the same as those of the control system 20A, and thus the difference will be mainly described. The control system 20C includes a feed-forward controller $Cf_E$ and a feedback controller $Cb_E$. The feed-forward controller $Cf_E$ outputs a target engine rotation speed $u0_E$ which corresponds to the operated variable $r_E$ of the setting member 11. The memory 10b stores a list or a conversion formula of the target engine rotation speed $u0_E$ corresponding to the operated variable $r_E$. The processor 10a executing the feedforward controller $Cf_E$ derives the target engine rotation speed $u0_E$ from the operated variable $r_E$ with the aid of a stored list or conversion equation.

The feedback controller $Cb_E$ derives the adjusted target engine rotation speed $u1_E$ by multiplying the speed difference e between the actual rotational speed RSd of the first hydraulic motor detected by the first rotation speed sensor and the target rotational speed RSi by the gain $K1_E$ and the gain $K2_E$. In the following third embodiment, the gain $K1_E$ and the gain $K2_E$ are also referred to as a first coefficient and a second coefficient, respectively. That is, the controller 10 determines the feedback gain of the feedback control based on the first coefficient (gain $K1_E$) and the second coefficient (gain $K2_E$). Then, the processor 10a calculates the sum of the target engine rotation speed $u0_E$ and the adjusted target engine rotation speed $u1_E$ as the operated variable $u_E$ and outputs the rotation command related to the operated variable $u_E$ to the injector, the supply pump, or the common rail.

The gain $K1_E$ is a value that increases as the target rotational speed RSi decreases, and the third reference information 10r3 stores a correspondence relationship between the first coefficient (gain $K1_E$) and the target rotational speed RSi of the first hydraulic motor. This correspondence relationship is represented by replacing the first value $K1_{V1\_1}$ in FIG. 8 with the first value $K1_{E\_1}$ corresponding to the gain $K1_E$, replacing the second value $K1_{V1\_2}$ in FIG. 8 with the second value $K1_{E\_2}$ corresponding to the gain $K1_E$, and replacing the third value $K1_{V1\_3}$ in FIG. 8 with the third value $K1_{E\_3}$ corresponding to the gain $K1_E$. Note that the magnitude relationship among the first value $K1_{E\_1}$, the second value $K1_{E\_2}$, and the third value $K1_{E\_3}$ is the same as that in the first embodiment. The characteristics of the set line L3 and the set line L4, and the condition as to which of the set line L3 and the set line L4 the transition is made are the same as in the first embodiment.

The gain $K2_E$ is a value that increases as the absolute value DP1 of the first differential pressure DP1 increases, and the fourth reference information 10r4 stores a correspondence relationship between the second coefficient (gain $K2_E$) and the absolute value DP1 of the first differential pressure DPL. This correspondence relationship is represented by replacing the fourth value $K2_{V1\_4}$ in FIG. 9 with the fourth value $K2_{E\_4}$ corresponding to the gain $K2_E$, replacing the fifth value $K2_{V1\_5}$ in FIG. 9 with the fifth value $K2_{E\_5}$ corresponding to the gain $K2_E$, and replacing the sixth value $K3_{V1\_6}$ in FIG. 9 with the sixth value $K2_{E\_6}$ corresponding to the gain $K2_E$. Note that the magnitude relationship among the fourth value $K2_{E\_4}$, the fifth value $K2_{E\_5}$, and the sixth value $K2_{E\_6}$ is the same as in the first embodiment. The characteristics of the set line L5 and the set line L5, and the condition as to which of the set line L5 and the set line L6 the transition is made are the same as in the first embodiment.

Figure 18A:
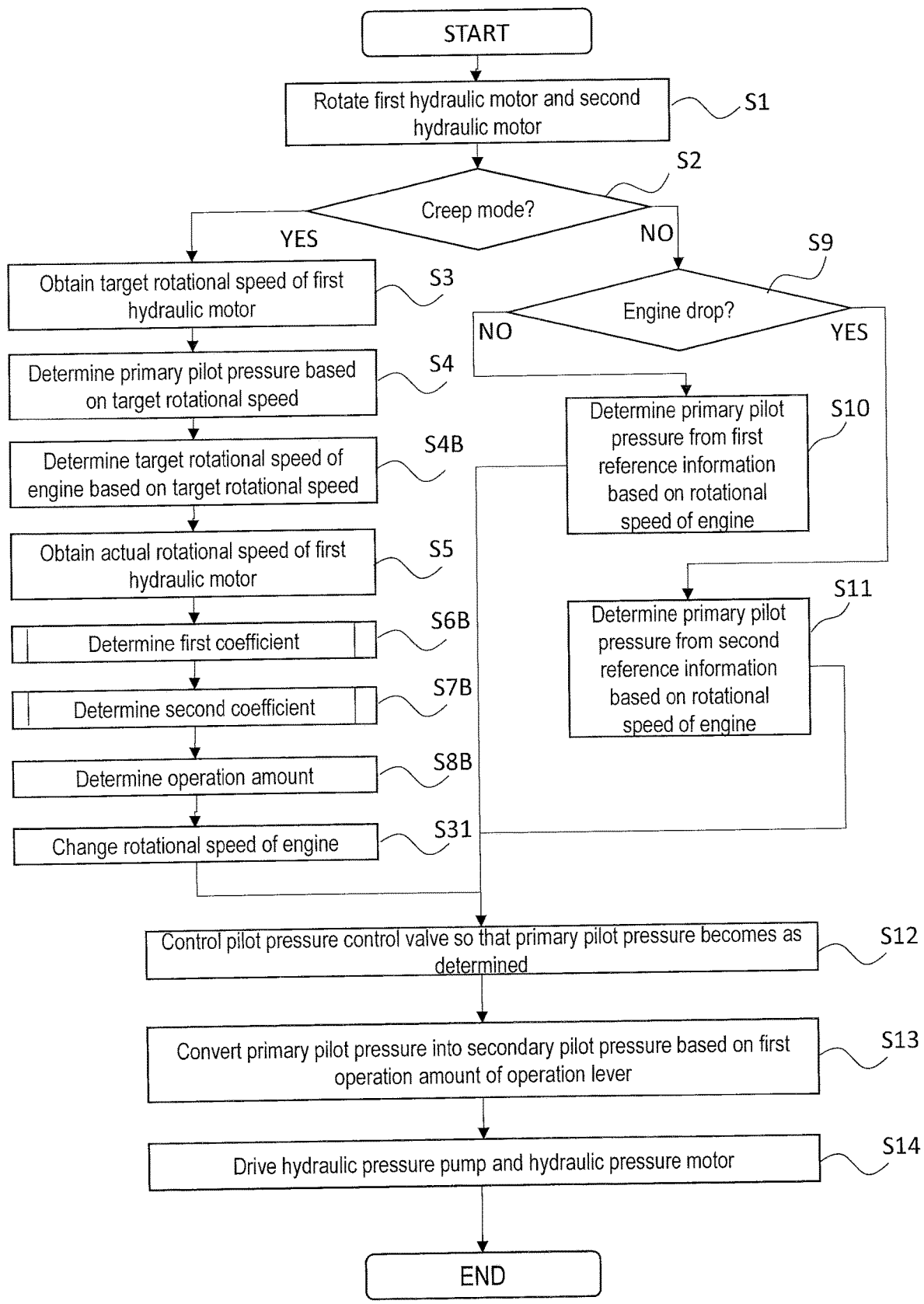
FIG. 18A is a flowchart showing the operation of the work vehicle according to the third embodiment.
Figure 18B:
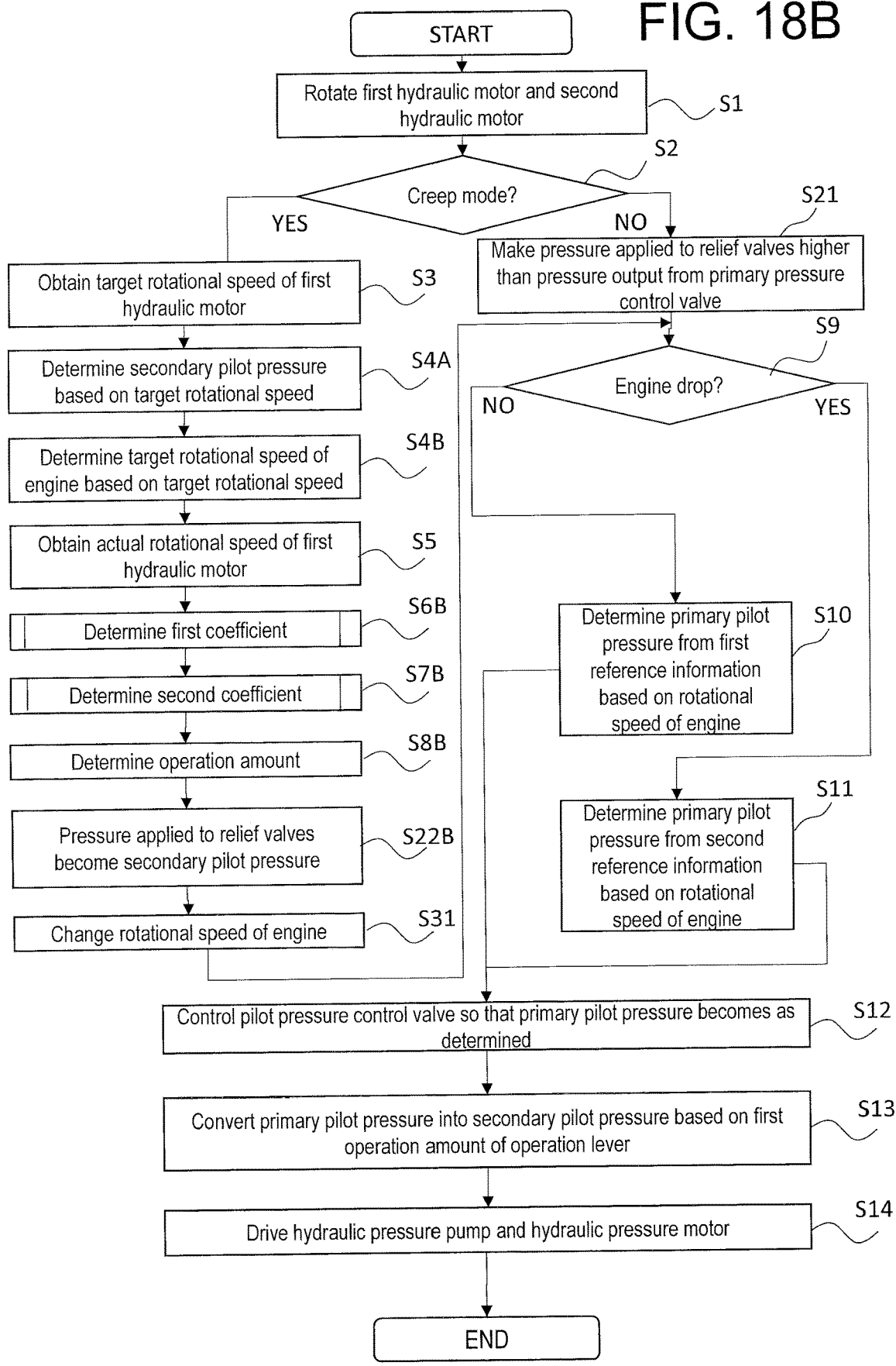
FIG. 18B is a flowchart showing the operation of the work vehicle according to the third embodiment.

FIGS. 18A and 18B are flowcharts showing the operation of the work vehicle 1 according to the third embodiment. FIG. 18A is a flowchart showing the operation of the work vehicle 1 according to the third embodiment having the hydraulic circuit 1A according to the first embodiment. FIG. 18B is a flowchart showing the operation of the work vehicle 1 according to the third embodiment having the hydraulic circuit 1B according to the second embodiment. In FIG. 18A, the same operations as those in the first embodiment are denoted by the same reference numerals and will not be described in detail. In FIG. 18B, the same operations as those in the second embodiment are denoted by the same reference numerals and will not be described in detail.

Referring to FIG. 18A, in step S4 after step S4B in the first embodiment, the processor 10a executes the processing of the feed-forward controller $Cf_E$ to output the target engine rotational speed $u0_E$ corresponding to the operated variable $r_E$ of the setting member 11. In step S6B after step S5, the processor 10a determines the first coefficient (gain $K1_E$) with reference to the third reference information 10r3 that stores the correspondence relationship between the first coefficient (gain $K1_E$) and the target rotational speed RSi of the first hydraulic motor. The determination method is the same as that in the first embodiment. Thereafter, in step S7B, the processor 10a determines the second coefficient (gain $K2_E$) with reference to the fourth reference information 10r4 that stores the correspondence relationship between the second coefficient (gain $K2_E$) and the absolute value DP1 of the first differential pressure DP1. The determination method is the same as that in the first embodiment.

In step S8B, the processor 10a determines the operated variable $u_E = u0_E + K1_E * K2_E * e$ based on the calculated target engine rotation speed uOE, the first coefficient (gain $K1_E$), and the second coefficient (gain $K2_E$). The processor 10a sets the operated variable $u_E$ of the feedback control as a target rotational speed of the engine 6 that rotates the hydraulic pumps (the first hydraulic pump and the second hydraulic pump).

In step S31, the processor 10a outputs, to the injector, the supply pump, or the common-rail, a rotation command for setting the obtained operated variable $u_E$ to the target rotational speed. As a result, the processor 10a performs feedback control on the engine 6 so as to reduce the speed difference e between the target rotational speed RSi of the first hydraulic motor corresponding to the target vehicle speed and the detected rotational speed RSd. The feedback gain is determined based on the first coefficient (gain $K1_E$) that increases as the target rotational speed RSi decreases, and is determined based on the second coefficient (gain $K2_E$) that increases as the absolute value DP1 of the detected first differential pressure DP1 increases. In Step S12, the processor 10a controls the primary pressure control valve CV1 so that the primary pilot pressure $u0_{V1}$ obtained in Step S4 becomes the primary pilot pressure output from the primary pressure control valve CV1.

In FIG. 18B, the same processes as those in FIG. 15 and FIG. 18A are denoted by the same reference numerals. Referring to FIG. 18B, after the process of step S5, steps S6B to S8B are executed. In step S22B instead of step S22 of the second embodiment, the processor 10a obtains the secondary pilot pressure with reference to the third reference information 10r3 as shown in FIG. 12. The secondary pressure control valve CV2 is controlled so that the secondary pilot pressure u0V2 obtained in step S4A becomes the secondary pilot pressure output from the secondary pressure control valve CV2. After step S22B, the above-described step S31 is executed. After step S31, the process proceeds to step S9.

Operation and Effect of Third Embodiment n the method of controlling the work vehicle 1 or the work vehicle 1 according to the third embodiment, it is possible to control the rotation speed of the engine 6 to quickly return to the target vehicle speed as in the first embodiment.

Fourth Embodiment

Figure 19:
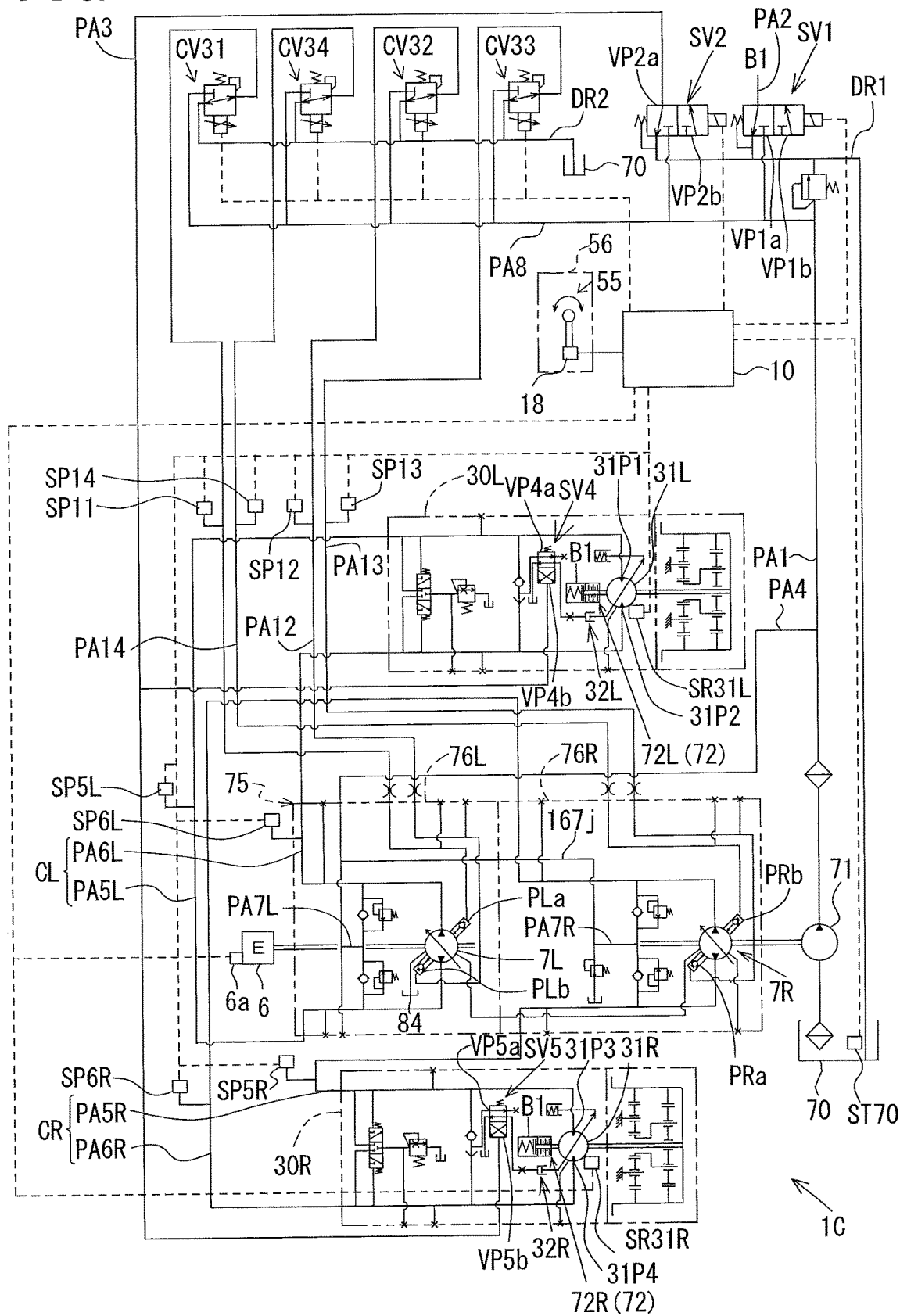
FIG. 19 is a hydraulic circuit diagram of a traveling system of the work vehicle according to the fourth embodiment.

Although the operation lever 55 according to the above-described embodiment directly controls the operation valves OVA, OVB, OVC, and OVD, the work vehicle 1 may detect the operated variable of the operation lever 55 by a separate sensor such as a potentiometer and control the control valve that controls the first pump pilot pressure and the second pump pilot pressure based on the operated variable detected by the sensor. In this case, control similar to that of the second embodiment can be realized by adjusting the operated variable detected from the sensor. FIG. 19 is a hydraulic circuit diagram of a traveling system of the work vehicle 1 according to the fourth embodiment. In FIG. 19, the same components as those in FIG. 3 are denoted by the same reference numerals, and a detailed description thereof will be omitted. In the fourth embodiment, the work vehicle 1 includes a hydraulic circuit 1C. The hydraulic circuit 1C includes pilot control valves CV31 to CV34 configured to control pilot pressures applied to the ports (PLa, PRa, PLb, PRb) instead of the operation valves OVA, OVB, OVC, OVD and the first to fourth shuttle valves SVa, SVb, SVc, SVd. The pilot control valves CV31 to CV34 are solenoid proportional valves including solenoids.

In the present embodiment, the pilot supply oil passage PA8 connects the pilot control valves CV31 to CV34 and the pilot supply oil passage PA8, and the first to fourth pilot oil passages PAl1 to PA14 are connected to the pilot control valves CV31 to CV34, respectively. In the present embodiment, the pilot supply oil passages PA1, PA8 and the first to fourth pilot oil passages PAl1 to PA14 correspond to a pilot oil feed circuit that connects the pilot pump and the first pump pilot port or the second pump pilot port. In the present embodiment, since the operation valves OVA, OVB, OVC, and OVD are not provided, there is no difference between the primary pilot pressure and the secondary pilot pressure. Therefore, in the present embodiment, these pressures are simply referred to as pilot pressures without being distinguished from each other.

In the normal mode, the controller 10 controls the pilot control valves CV31 to CV34 to output pilot pressure corresponding to FIG. 5 in accordance with the operation position detected by the operation detection sensor 18. In the creep mode, in order to limit the vehicle speed, even if the operation lever 55 is actually operated with the full stroke, it is regarded that the operation lever 55 is operated to the deemed operation position Ga. Specifically, when the operation position is from the G0 position to the Ga position, the pilot pressure is obtained from the correspondence relationship shown in FIG. 5 corresponding to the operation position detected by the operation detection sensor 18. When the operation position is equal to or more than the Ga position, it is assumed that the operation is performed to the deemed operation position Ga. In the present embodiment, the operated variable from the G0 position to the Ga position is referred to as a deemed operated variable r.

Figure 20:
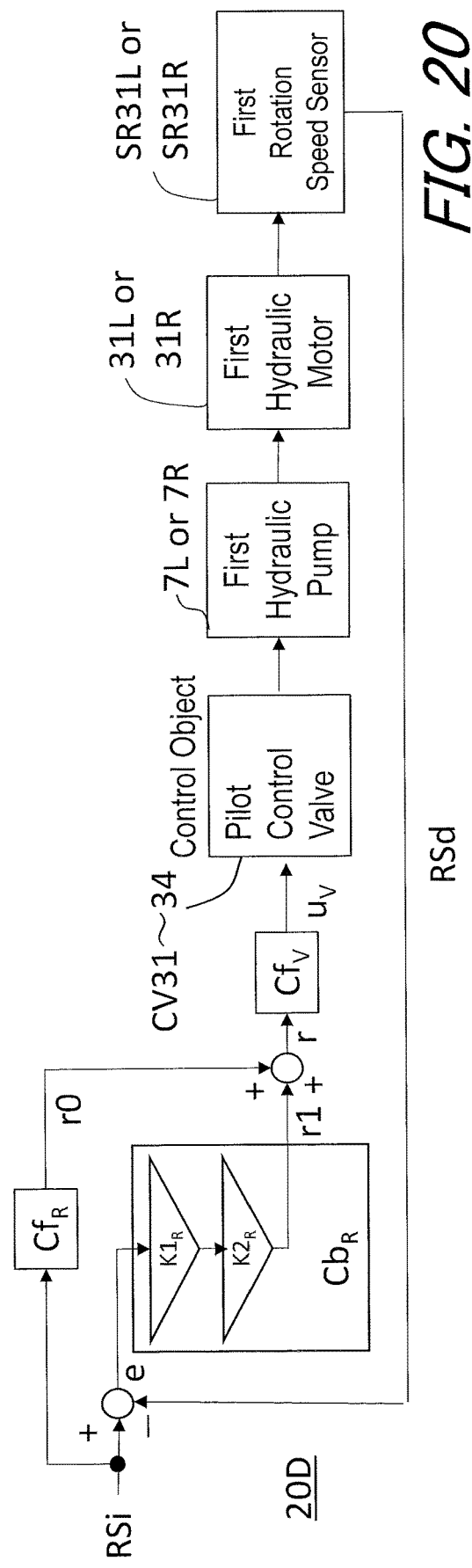
FIG. 20 is a control block diagram according to the fourth embodiment.

FIG. 20 is a control block diagram according to the fourth embodiment. The control system 20D according to the fourth embodiment is mainly different from the control system 20A according to the first embodiment in that the control target is the deemed operated variable r. However, most parts of the control system 20A are the same as those of the control system 20A, and thus the difference will be mainly described. The control system 20D includes a feed-forward controller $Cf_R$, a feedback controller $Cb_R$, a transducer Cbv. The feed-forward controller $Cf_R$ outputs a deemed operated variable r0 corresponding to the target rotational speed RSi of the first hydraulic motor. The memory 10b stores the form of a list or a conversion formula of the deemed operated variable r0 corresponding to the target rotational speed RSi. The feedforward controller $Cf_E$ derives the deemed operated variable r0 from the target rotational speed RSi using a stored list or conversion equation.

The feedback controller $Cb_R$ derives the adjusted deemed operated variable r1 by multiplying the speed difference e between the actual rotational speed RSd of the first hydraulic motor detected by the first rotational speed sensor and the target rotational speed RSi by the gain $K1_R$ and the gain $K2_R$. In the following fourth embodiment, the gain $K1_R$ and the gain $K2_R$ are also referred to as a first coefficient and a second coefficient, respectively. That is, the controller 10 determines the feedback gain of the feedback control based on the first coefficient (gain $K1_R$) and the second coefficient (gain $K2_R$). Then, the processor 10a sets the sum of the deemed operated variable r0 and the adjusted deemed operated variable r1 as the operated variable r. The transducer Cbv holds the relationship between the operated variable r and the pilot pressure uv as shown in FIG. 5, and outputs the pilot pressure uv corresponding to the input operated variable r. The processor 10a controls the pilot control valves CV31 to CV34 so as to output the pilot pressure uv.

The gain $K1_R$ is a value that increases as the target rotational speed RSi is smaller, and the third reference information 10r3 stores a correspondence relationship between the first coefficient (gain $K1_R$) and the target rotational speed RSi of the first hydraulic motor. This correspondence relationship is represented by replacing the first value $K1_{V_1\_1}$ in FIG. 8 with the first value $K1_{R\_1}$ corresponding to the gain $K1_R$, replacing the second value $K1_{V_1\_2}$ in FIG. 8 with the second value $K1_{R\_2}$ corresponding to the gain $K1_R$, and replacing the third value $K1_{V_1\_3}$ in FIG. 8 with the third value $K1_{R\_3}$ corresponding to the gain $K1_R$. The magnitude relationship among the first value $K1_{R\_1}$, the second value $K1_{R\_2}$, and the third value $K1_{R\_3}$ is the same as that in the first embodiment. The characteristics of the set line L3 and the set line L4, and the condition as to which of the set line L3 and the set line L4 the transition is made are the same as in the first embodiment.

The gain $K2_R$ is a value that increases as the absolute value DP1 of the first differential pressure DP1 increases, and the fourth reference information 10r4 stores a correspondence relationship between the second coefficient (gain $K2_R$) and the absolute value DP1 of the first differential pressure DPL. This correspondence relationship is represented by replacing the fourth value $K2_{V_1\_4}$ in FIG. 9 with the fourth value $K2_{R\_4}$ corresponding to the gain $K2_R$, replacing the fifth value $K2_{V_1\_5}$ in FIG. 9 with the fifth value $K2_{R\_5}$ corresponding to the gain $K2_R$, and replacing the sixth value $K3_{V_1\_6}$ in FIG. 9 with the sixth value $K2^R\_6$ corresponding to the gain $K2_R$. The magnitude relationship among the fourth value $K2_{R\_4}$, the fifth value $K2_{R\_5}$, and the sixth value $K2_{R\_6}$ is the same as that in the first embodiment. The characteristics of the set line L5 and the set line L5, and the condition as to which of the set line L5 and the set line L6 the transition is made are the same as in the first embodiment.

Figure 21:
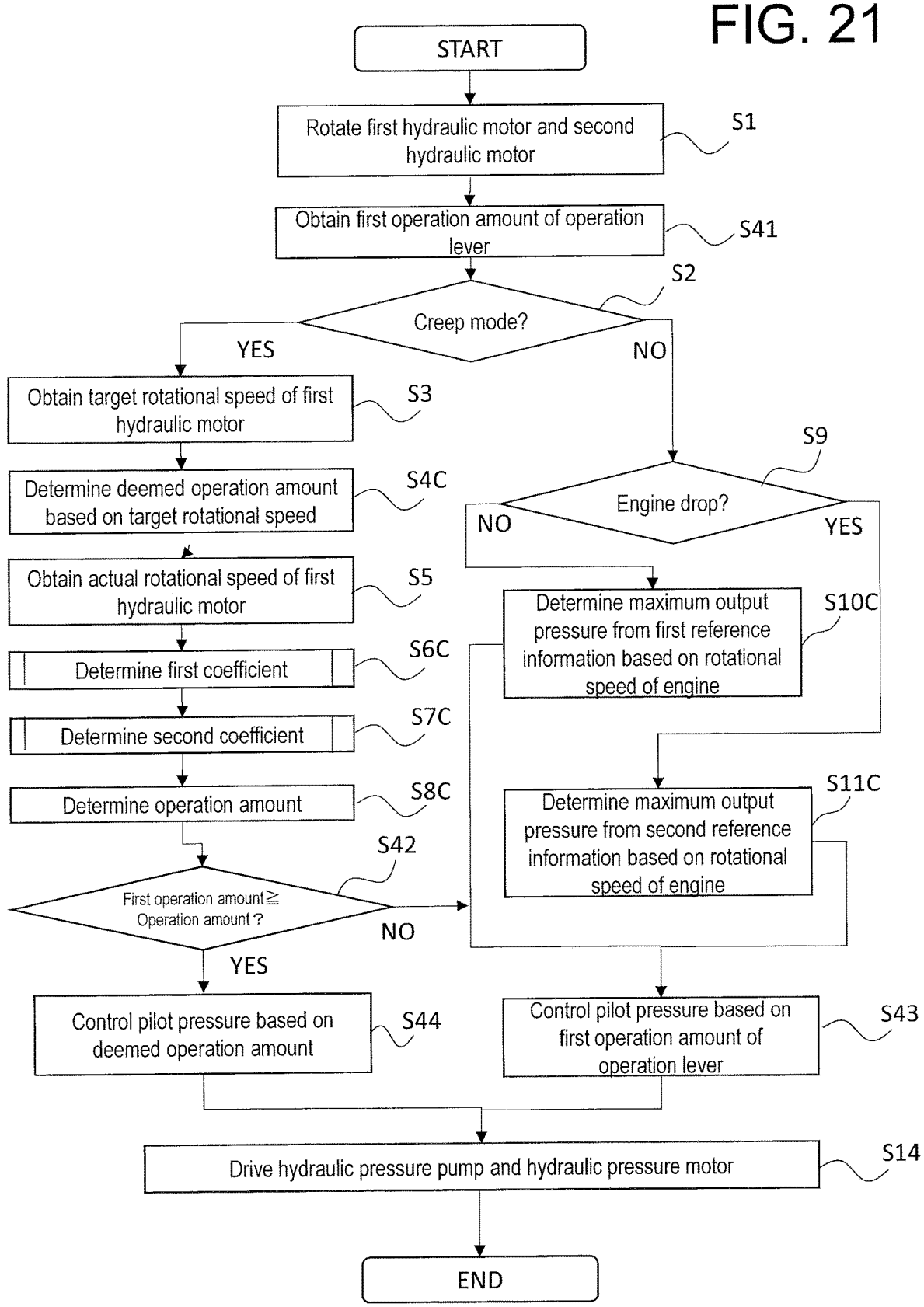
FIG. 21 is a flowchart showing the operation of the work vehicle according to the fourth embodiment.

FIG. 21 is a flowchart showing the operation of the work vehicle 1 according to the fourth embodiment. In FIG. 21, the same operations as those of the first embodiment are denoted by the same reference numerals, and detailed description thereof will be omitted. In this flowchart, the processing from step S1 to step S14 is executed at predetermined sampling intervals (for example, 20 μs). After the end of step S1, in step S41, the processor 10a acquires the first operated variable from the operation detection sensor 18. When there is no engine drop (No in step S9), in step S10C, the processor 10a is configured to determine the maximum output pressure (Pc) in FIG. 5 from the first reference information 10r1 based on the rotational speed RS of the engine 6. When there is an engine drop (Yes in step S9), in step S11C, the processor 10a is configured to determine the maximum output pressure (Pc) in FIG. 5 from the second reference information 10r2 based on the rotational speed RS of the engine 6. After the end of step S10D or step S11C, in step S43, the processor 10a determines the pilot pressure according to the first operated variable $r_E$ in a state where the maximum output pressure (Pc) is limited, and controls the pilot control valves CV31 to CV34 so that the determined pilot pressure is applied.

In step S4C instead of step S4, the processor 10a executes the processing of the feed-forward controller $Cf_R$ and outputs the deemed operated variable r0. After the processing of step S5, in step S6C, the processor 10a determines the first coefficient (gain $K1_R$) with reference to the third reference information 10r3 that stores the correspondence relationship between the first coefficient (gain $K1_R$) and the target rotational speed RSi of the first hydraulic motor. The determination method is the same as that in the first embodiment. Then, in step S7C, the processor 10a is configured to determine the second coefficient (gain $K2_R$) with reference to the fourth reference information 10r4 storing the correspondence relationship between the second coefficient (gain $K2_R$) and the absolute value of the first differential pressure DPL. The determination method is the same as that in the first embodiment.

In step S8C, the processor 10a determines the operated variable $r=r0+K1_R*K2_R*e$ based on the determined deemed operated variable r0, the first coefficient (gain $K1_R$), and the second coefficient (gain $K2_R$). That is, the operated variable r of the feedback control is defined as an operated variable of the travel instruction input device (operation lever 55) to which the instruction of the traveling direction is input by the user. Thereafter, in step S42, the processor 10a is configured to determine whether or not the first operated variable is equal to or greater than the operated variable r. In the creep mode, the operation is normally performed so that the first operated variable becomes equal to or larger than the operated variable r. When the first operated variable is smaller than the operated variable r (No in step S42), the process proceeds to step S43. When the first operated variable is equal to or greater than the operated variable r (Yes in step S42). In step S44, the processor 10a determines the pilot pressure according to the deemed operated variable, and controls the pilot control valves CV31 to CV34 such that the determined pilot pressure is applied. That is, the processor 10a adjusts the hydraulic pressure of the pilot circuit between the pilot pump and the pilot port for discharging the pilot oil toward the pilot port of the at least one hydraulic pump (the first hydraulic pump and the second hydraulic pump) in accordance with the operated variable r of the travel instruction input device (the operation lever 55). That is, the processor 10a performs feedback control with the control valve (CV31 to CV34) of the pilot pressure of the first hydraulic pump as a control target so as to reduce the speed difference e between the target rotational speed RSi of the first hydraulic motor corresponding to the target vehicle speed and the detected rotational speed RSd.

Operation and Effect of Fourth Embodiment

In the method of controlling the work vehicle 1 or the work vehicle 1 according to the fourth embodiment, it is possible to control the deemed operated variable to quickly return to the target vehicle speed as in the first embodiment.

Modification of Fourth Embodiment

The fourth embodiment shows an example in which the processor 10a adjusts the second coefficient (gain $K2_R$) for controlling the second pump pilot pressure applied to the second pump pilot port of the second hydraulic pump in accordance with the absolute value DP1 of the first differential pressure DP1 when the absolute value DP1 of the first differential pressure DP1 is greater than the absolute value of the second differential pressure. However, when the difference between the absolute value of the first differential pressure and the absolute value of the second differential pressure is within a predetermined range, the processor 10a may adjust the gain $K2_R$ according to the absolute value of the second differential pressure. In this case, the absolute value of the first differential pressure DP1 in FIG. 9 may be read as the absolute value of the second differential pressure, and the processor 10a may control the additional secondary pressure control valve ACV based on the vertical axis alone operated variable. With this configuration, when the absolute value of the first differential pressure and the second differential pressure are not significantly different from each other, it is possible to realize an operation such as turning close to the user's desire by separately controlling the left and right traveling devices. In addition, in the second embodiment, the operation detection sensor 18 may be provided in the travel instruction input device (operation lever 55), the above-described non-essential operated variable may be calculated based on the detection result of the operation detection sensor 18, and the secondary pressure control valve CV2 and the additional secondary pressure control valve ACV2 may be controlled as described above in accordance with the calculated non-essential operated variable. In this case, since the relief valves CV23 and CV24 are controlled using the deemed operated variable, the work vehicle 1 can be controlled to achieve a desired vehicle speed more quickly than when the control is performed by the pilot control valves CV31 to CV34 which are solenoid proportional valves as shown in FIG. 19.

Modifications According to All Embodiments

The values of the various thresholds may be changed according to the characteristics of the left hydraulic pump 7L, the right hydraulic pump 7R, the left hydraulic motor 31L, and the right hydraulic motor 31R, the characteristics of the reduction gear connected to the left hydraulic motor 31L, the characteristics of the reduction gear connected to the right hydraulic motor 31R, and the characteristics of the various control valves.

In the above example, only the P control is shown, but the I control and the D control may be included. In the above-described embodiment, the feedback gain of the feedback controller is determined based on the first coefficient and the second coefficient, but one of the first coefficient and the second coefficient may be omitted. When the second coefficient is omitted, the feedback gain is set to the first coefficient, and when the first coefficient is omitted, the feedback gain is set to the second coefficient. In this case, the operated variable may be determined by setting the coefficient omitted in step S6 or S7 in FIG. 10, S6A or S7A in FIG. 15, S6B or S7B in FIG. 18A, S6B or S7B in FIG. 18B, and S6C or S7C in FIG. 21.

Figure 22:
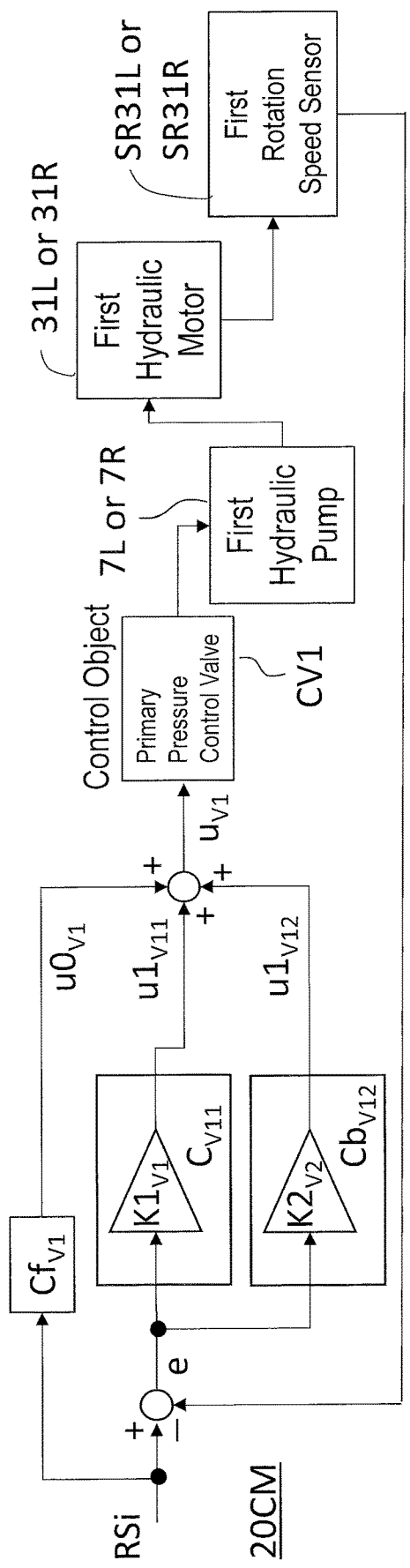
FIG. 22 is a control block diagram according to a modification of the first embodiment.
Figure 23:
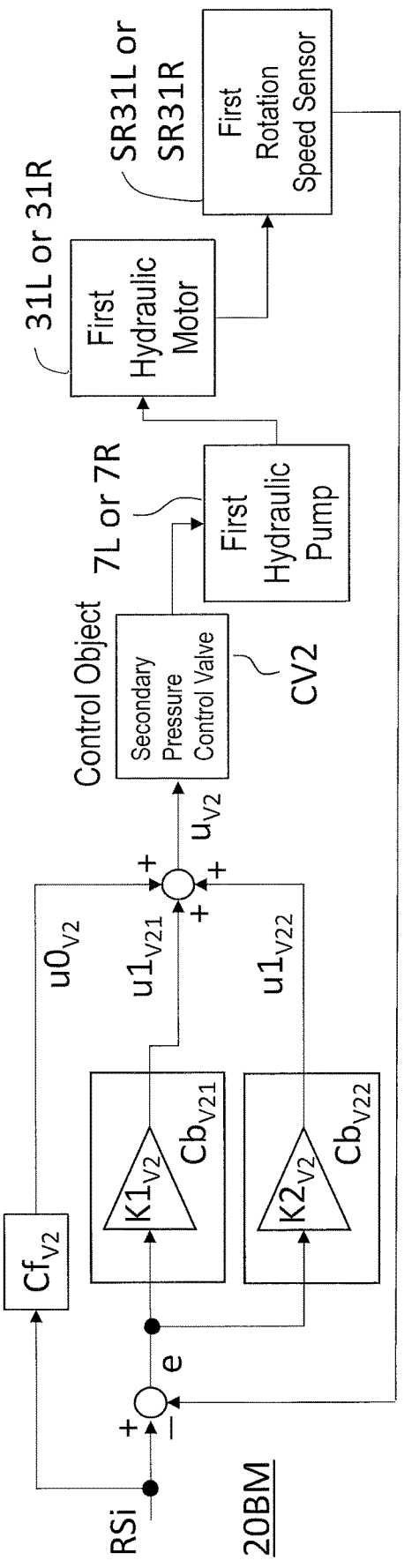
FIG. 23 is a control block diagram in a modification of the second embodiment.
Figure 24:
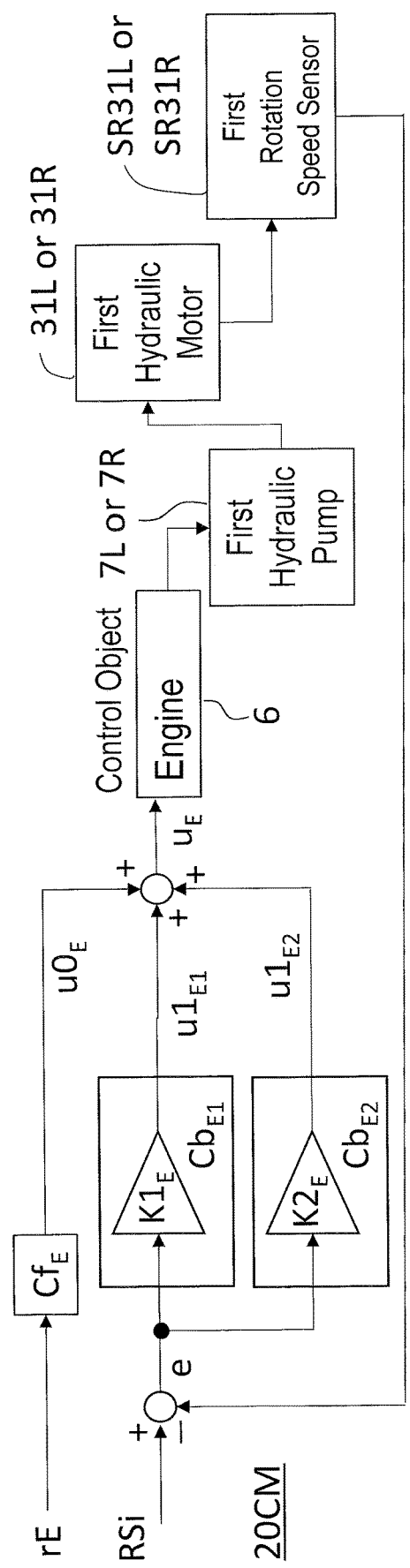
FIG. 24 shows a control block diagram in a modification of the third embodiment.
Figure 25:
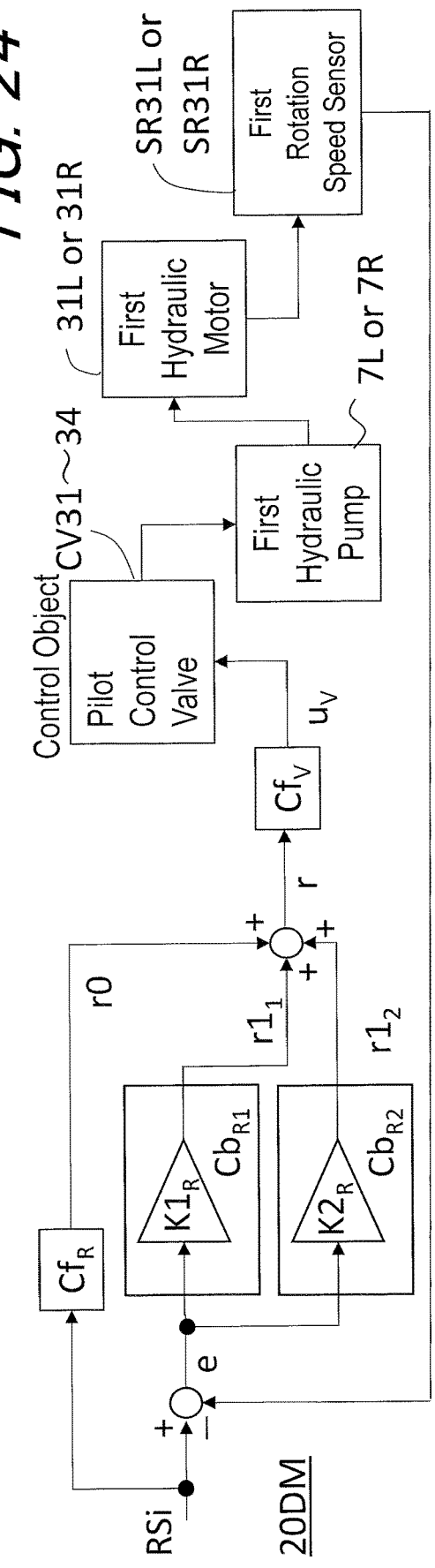
FIG. 25 shows a control block diagram in a modification of the fourth embodiment.

In the above-described example, both the first coefficient and the second coefficient are multiplied and fed back, but may be added and fed back. FIG. 22 is a control block diagram according to a modification of the first embodiment. FIG. 23 is a control block diagram according to a modification of the second embodiment. FIG. 24 is a control block diagram according to a modification of the third embodiment. FIG. 25 is a control block diagram according to a modification of the fourth embodiment. The control system 20AM according to the modification in the first embodiment includes the feedback controller CbV11 and the feedback controller CbV12 instead of a feedback controller Cbv1 of the control system 20A.

The feedback controller $Cb_{r11}$ derives an adjusted primary pilot pressure $u1_{r11}$ by multiplying the speed difference e by a gain $K1_{V1}$. The feedback controller $Cb_{V12}$ derives an adjusted primary pilot pressure $u1_{V12}$ by multiplying the speed difference e by a gain $K2_{V1}$. The processor 10a inputs the sum of the primary pilot pressure $u0_{V1}$, the adjusted primary pilot pressure $u1_{V11}$, and the adjusted primary pilot pressure $u1_{V12}$ to the primary pressure control valve CV1 as the operated variable $u_{V1}$. That is, the operated variable $u_{V1}=u0_{V1}+K1_{V1}*e+K2_{V1}*e$. In other respects, this embodiment is the same as the first embodiment. The magnitudes of the gains $K1_{V1}$ and $K2_{V1}$ may be different from the magnitudes of the gains $K1_{V1}$ and $K2_{V1}$ in the first embodiment, but the characteristics shown in FIGS. 8 and 9 are the same.

The control system 20BM according to the modified example of the second embodiment includes a feedback controller $Cb_{V21}$ and a feedback controller $Cb_{V22}$ instead of the feedback controller $Cbv_2$ of the control system 20B. The feedback controller $Cbv_{21}$ derives an adjusted secondary pilot pressure $u1_{V21}$ by multiplying the speed difference e by a gain $K1_{V2}$. The feedback controller $Cbv_{22}$ derives an adjusted secondary pilot pressure u1V22 by multiplying the speed difference e by a gain $K2_{V2}$. The processor 10a inputs the sum of the secondary pilot pressure u0V2, the adjusted secondary pilot pressure $u1_{V21}$, and the adjusted secondary pilot pressure $u1_{V22}$ to the secondary pressure control valve CV2 as the operated variable $u_{V2}$. That is, the operated variable $u_{V2}=u0_{V2}+K_{V2}*e+K2_{V2}*e$. In other respects, this embodiment is the same as the second embodiment. The magnitudes of the gains $K1_{V2}$ and $K2_{V2}$ may be different from the magnitudes of the gains $K1_{V2}$ and $K2_{V2}$ in the second embodiment, but the characteristics shown in FIGS. 8 and 9 are the same.

The control system 20CM according to the modified example of the third embodiment includes a feedback controller $Cb_{E1}$ and a feedback controller $Cb_{E2}$ instead of the feedback controller $Cb_E$ of the control system $Cb_{E1}$. The feedback controller $Cb_{E1}$ derives an adjusted target engine rotation speed $u1_{E1}$ by multiplying the speed difference e by a gain K1E. The feedback controller $Cb_{E2}$ derives an adjusted target engine rotation speed $u1_{E2}$ by multiplying the speed difference e by a gain $K2_E$. The processor 10a sets a sum of the target engine rotation speed uOE, the adjusted target engine rotation speed $u1_{E1}$, and the adjusted target engine rotation speed $u1_{E2}$ as an operated variable $u_E$ and outputs a rotation command corresponding to the operated variable $u_E$ to the injector, the supply pump, or the common-rail. That is, the operated variable $u_E=u0_E+K1_E*e+K2_E*e$. In other respects, this embodiment is the same as the third embodiment. The magnitudes of the gains $K1_E$ and $K2_E$ may be different from the magnitudes of the gains $K1_E$ and $K2_E$ in the third embodiment, but the characteristics shown in FIGS. 8 and 9 are the same.

The control system 20DM according to the modified example of the fourth embodiment includes a feedback controller $Cb_{R1}$ and a feedback controller $Cb_{R2}$ instead of the feedback controller $Cb_R$ of the control system 20D. The feedback controller $Cb_{R1}$ derives the adjusted deemed operated variable $r1_1$ by multiplying the speed difference e by the gain $K1_R$. The feedback controller $Cb_{R2}$ derives the adjusted deemed operated variable $r1_2$ by multiplying the speed difference e by the gain $K2_R$. The processor 10a sets the sum of the deemed operated variable r0, the adjusted deemed operated variable $r1_1$, and the adjusted deemed operated variable $r1_2$ as the operated variable r and outputs the operated variable r to the transducer Cbv. That is, the operated variable $r=r0+K1_R*e+K2_R*e$. In other respects, this embodiment is the same as the fourth embodiment. The magnitudes of the gains $K1_R$ and $K2_R$ may be different from the magnitudes of the gains $K1_R$ and $K2_R$ in the fourth embodiment, but the characteristics shown in FIGS. 8 and 9 are the same.

In the embodiments described above, each feedback controller is configured to provide a speed difference e. However, the output with respect to the speed difference e may be provided in the form of a map, and the output may be obtained by reading the map.

The term "comprising" and its derivatives are open-ended terms that specify the presence of elements but do not preclude the presence of other non-recited elements. This also applies to the terms "comprising", "including" and their derivatives.

The terms "member", "part", "element", "body", and "structure" may have multiple meanings, such as a single part or a plurality of parts.

Ordinal numbers such as "first" and "second" are merely terms for identifying configurations and do not have any other meaning (e.g., a particular order). For example, "a first element" does not imply that "a second element" is present, and "a second element" does not imply that "a first element" is present.

Terms of degree such as "substantially," "about," and "approximately," unless specifically stated in an embodiment, can mean a reasonable amount of deviation such that the end result is not significantly changed. All numerical values set forth in this application can be interpreted to include words such as "substantially," "about," and "approximately."

In this application, the phrase "at least one of A and B" should be interpreted to include A alone, B alone, and both A and B.

Obviously, numerous modifications and variations of the present invention are possible in light of the above teachings. Accordingly, the present invention may be practiced otherwise than as specifically disclosed herein without departing from the scope of the present invention.

What is claimed is:

1. A speed control method for a work vehicle, comprising:
   driving an engine to rotate a first hydraulic pump and a pilot pump provided in the work vehicle;
   supplying pilot oil from the pilot pump toward a pilot port of the first hydraulic pump;
   controlling, by a travel instruction input device via which an instruction of a traveling direction is input by a user, an operation valve provided on a pilot circuit between the pilot pump and the pilot port of the first hydraulic pump to control a pilot pressure of the first hydraulic pump;
   obtaining an upper limit speed to which a speed of the work vehicle is limited regardless of operation of the travel instruction input device;
   calculating a target vehicle speed that is limited to the upper limit speed;
   supplying hydraulic fluid from the first hydraulic pump to a first hydraulic motor to rotate the first hydraulic motor to drive a first traveling device provided in a vehicle body of the work vehicle;
   detecting a rotational speed of the first hydraulic motor;
   performing feedback control with respect to the engine configured to control a pilot pressure of the first hydraulic pump, the feedback control being performed to reduce a speed difference between the rotational speed detected and a target rotational speed of the first hydraulic motor corresponding to the target vehicle speed; and setting a feedback gain of the feedback control based on a first coefficient which becomes larger as the target rotational speed becomes lower, wherein an operated variable of the feedback control is set to a target rotational speed of the engine.

2. A speed control method for a work vehicle, comprising:

driving an engine to rotate a first hydraulic pump provided in the work vehicle;

supplying hydraulic fluid from the first hydraulic pump to a first hydraulic motor to rotate the first hydraulic motor to drive a first traveling device provided in a vehicle body of the work vehicle;

detecting a rotational speed of the first hydraulic motor;

performing feedback control with respect to at least one of the engine or a control valve configured to control a pilot pressure of the first hydraulic pump, the feedback control being performed to reduce a speed difference between the rotational speed detected and a target rotational speed of the first hydraulic motor corresponding to a target vehicle speed; and setting a feedback gain of the feedback control based on a first coefficient which becomes larger as the target rotational speed becomes lower, wherein the first coefficient is set to a first value when the target rotational speed is equal to or lower than a first target rotational speed, and wherein the first coefficient is set to a second value which is smaller than the first value when the target rotational speed is equal to or higher than a second target rotational speed that is higher than the first target rotational speed.

3. The speed control method according to claim 2, further comprising:

determining a rotational speed variation per unit time;

determining that a first condition is true when an absolute value of the rotational speed variation is smaller than a first threshold value or when the rotational speed variation is smaller than a second threshold value that is smaller than a value obtained by multiplying the first threshold value by −1;

determining that the first condition is false when the absolute value of the rotational speed variation is larger than or equal to the first threshold value and when the rotational speed variation is larger than or equal to the second threshold value;

determining that a second condition is true when an absolute value of the speed difference is larger than a third threshold value;

determining that the second condition is false when the absolute value of the speed difference is smaller than or equal to the third threshold value;

determining that a third condition is true when the target rotational speed is equal to or lower than a third target rotational speed which is equal to or lower than the second target rotational speed;

determining that the third condition is false when the third target rotational speed is higher than the third target rotational speed; and setting the first coefficient such that a value of the first coefficient when all of the first condition, the second condition, and the third condition are true is larger than a value of the first coefficient when any one of the first condition, the second condition, and the third condition is false.

4. The method according to claim 1, wherein the feedback gain is defined as the first coefficient.

5. A speed control method for a work vehicle, comprising:

driving an engine to rotate a first hydraulic pump provided in the work vehicle;

supplying hydraulic fluid from the first hydraulic pump to a first hydraulic motor to rotate the first hydraulic motor to drive a first traveling device provided in a vehicle body of the work vehicle;

detecting a rotational speed of the first hydraulic motor;

performing feedback control with respect to a primary pressure control valve configured to control a pilot pressure of the first hydraulic pump, the feedback control being performed to reduce a speed difference between the rotational speed detected and a target rotational speed of the first hydraulic motor corresponding to a target vehicle speed; and setting a feedback gain of the feedback control based on a first coefficient which becomes larger as the target rotational speed becomes lower, wherein an operated variable of the feedback control is to be input to the primary pressure control valve to adjust a primary pilot pressure which is a hydraulic pressure of a primary pilot oil passage connecting a pilot pump and an operation valve, the pilot pump being configured to supply pilot oil toward a pilot port of the first hydraulic pump, the operation valve being configured to be operated by a travel instruction input device via which an instruction of a travel direction is input by a user to change the primary pilot pressure to the pilot pressure.

6. A speed control method according to claim 1, for a work vehicle, comprising:

driving an engine to rotate a first hydraulic pump provided in the work vehicle;

supplying hydraulic fluid from the first hydraulic pump to a first hydraulic motor to rotate the first hydraulic motor to drive a first traveling device provided in a vehicle body of the work vehicle;

detecting a rotational speed of the first hydraulic motor;

performing feedback control with respect to a secondary pressure control valve configured to control a pilot pressure of the first hydraulic pump, the feedback control being performed to reduce a speed difference between the rotational speed detected and a target rotational speed of the first hydraulic motor corresponding to a target vehicle speed; and setting a feedback gain of the feedback control based on a first coefficient which becomes larger as the target rotational speed becomes lower, wherein an operated variable of the feedback control is to be input to the secondary pressure control valve to adjust the pilot pressure to a secondary pilot pressure which is a hydraulic pressure of a secondary pilot oil passage connecting an operation valve and a pilot port of the first hydraulic pump, the operation valve being configured to be controlled by a travel instruction input device via which an instruction of a traveling direction is input by a user to output the pilot pressure.

7. A speed control method, for a work vehicle, comprising: driving an engine to rotate a first hydraulic pump provided in the work vehicle; supplying hydraulic fluid from the first hydraulic pump to a first hydraulic motor to rotate the first hydraulic motor to drive a first traveling device provided in a vehicle body of the work vehicle; detecting a rotational speed of the first hydraulic motor; performing feedback control with respect to a pilot control valve, the feedback control being performed to reduce a speed difference between the rotational speed detected and a target rotational speed of the first hydraulic motor corresponding to a target vehicle speed; and setting a feedback gain of the feedback control based on a first coefficient which becomes larger as the target rotational speed becomes lower, wherein an operated variable of the feedback control is an operated variable of a travel instruction input device via which an instruction of a traveling direction is input by a user, and wherein the pilot control valve is configured to control a pilot pressure of the first hydraulic pump which is a hydraulic pressure of a pilot circuit between a pilot pump and a pilot port of the first hydraulic pump according to an operated variable of the travel instruction input device, the pilot pump being configured to supply pilot oil toward the pilot port of the first hydraulic pump.

8. A work vehicle comprising:
a vehicle body;
a first hydraulic motor configured to drive a first traveling device provided in the vehicle body;
a first hydraulic pump configured to supply hydraulic fluid to the first hydraulic motor;
an engine configured to drive the first hydraulic pump;
a first rotational speed sensor configured to detect a rotational speed of the first hydraulic motor; and
control circuitry configured to perform feedback control with respect to at least one of the engine or a control valve to control a pilot pressure of the first hydraulic pump, the feedback control being performed to reduce a speed difference between the rotational speed detected and a target rotational speed of the first hydraulic motor corresponding to a target vehicle speed,
wherein the control circuitry determines a feedback gain of the feedback control based on a first coefficient that increases as the target rotational speed decreases,
wherein the first coefficient is set to a first value when the target rotational speed is equal to or lower than a first target rotational speed, and
wherein the first coefficient is set to a second value which is smaller than the first value when the target rotational speed is equal to or higher than a second target rotational speed that is higher than the first target rotational speed.

9. The work vehicle according to claim 8,
wherein the control circuitry is configured to:
determine a rotational speed variation per unit time;
determine that a first condition is true when an absolute value of the rotational speed variation is smaller than a first threshold value or when the rotational speed variation is smaller than a second threshold value smaller than a value obtained by multiplying the first threshold value by −1;
determine that the first condition is false when the absolute value of the rotational speed variation is larger than or equal to the first threshold value and when the rotational speed variation is larger than or equal to the second threshold value;
determine that a second condition is true when an absolute value of the speed difference is larger than a third threshold value;
determine that the second condition is false when the absolute value of the speed difference is smaller than or equal to the third threshold value;
determine that a third condition is true when the target rotational speed is equal to or lower than a third target rotational speed that is equal to or lower than a second target rotational speed;
determine that the third condition is false when the target rotational speed is higher than the third target rotational speed;
set the first coefficient such that a value of the first coefficient when all of the first condition, the second condition, and the third condition are true is larger than a value of the first coefficient when any one of the first condition, the second condition, and the third condition is false.

10. A work vehicle comprising:
a vehicle body;
a first hydraulic motor configured to drive a first traveling device provided in the vehicle body;
a first hydraulic pump configured to supply hydraulic fluid to the first hydraulic motor;
a pilot pump configured to supply pilot oil toward a pilot port of the first hydraulic pump;
an engine configured to drive the first hydraulic pump and the pilot pump;
an operation valve configured to be operated by a travel instruction input device via which an instruction of a traveling direction is input by a user, the operation valve being provided on a pilot circuit between the pilot pump and the pilot port of the first hydraulic pump to control a pilot pressure of the first hydraulic pump;
a first rotational speed sensor configured to detect a rotational speed of the first hydraulic motor; and
control circuitry configured to:
obtain an upper limit speed to which a speed of the work vehicle is limited regardless of operation of the travel instruction input device;
calculate a target vehicle speed that is limited to the upper limit speed;
perform feedback control with respect to the engine to control the pilot pressure of the first hydraulic pump, the feedback control being performed to reduce a speed difference between the rotational speed detected and a target rotational speed of the first hydraulic motor corresponding to the target vehicle speed,
wherein the control circuitry determines a feedback gain of the feedback control based on a first coefficient that increases as the target rotational speed decreases, and
wherein an operated variable of the feedback control is set to a target rotational speed of the engine.

11. A work vehicle comprising:
a vehicle body;
a first hydraulic motor configured to drive a first traveling device provided in the vehicle body;
a first hydraulic pump configured to supply hydraulic fluid to the first hydraulic motor;
a pilot pump configured to supply pilot oil toward a pilot port of the first hydraulic pump;
an engine configured to drive the first hydraulic pump and the pilot pump;
an operation valve configured to be operated by a travel instruction input device via which an instruction of a traveling direction is input by a user;
a primary pressure control valve to adjust a primary pilot pressure which is a hydraulic pressure of a primary pilot oil passage connecting the pilot pump and the operation valve, the operation valve being configured to change the primary pilot pressure to a pilot pressure of the first hydraulic pump;
a first rotational speed sensor configured to detect a rotational speed of the first hydraulic motor; and control circuitry configured to perform feedback control with respect to the primary pressure control valve, the feedback control being performed to reduce a speed difference between the rotational speed detected and a target rotational speed of the first hydraulic motor corresponding to a target vehicle speed, wherein the control circuitry determines a feedback gain of the feedback control based on a first coefficient that increases as the target rotational speed decreases, and wherein an operated variable of the feedback control is to be input to the primary pressure control valve.

12. A work vehicle comprising:

a vehicle body;

a first hydraulic motor configured to drive a first traveling device provided in the vehicle body;

a first hydraulic pump configured to supply hydraulic fluid to the first hydraulic motor;

a pilot pump configured to supply pilot oil toward a pilot port of the first hydraulic pump;

an engine configured to drive the first hydraulic pump and the pilot pump;

an operation valve configured to be operated by a travel instruction input device via which an instruction of a traveling direction is input by a user to control a pilot pressure of the first hydraulic pump;

a secondary pressure control valve to adjust the pilot pressure to a secondary pilot pressure which is a hydraulic pressure of a secondary pilot oil passage connecting the operation valve and the pilot port of the first hydraulic pump;

a first rotational speed sensor configured to detect a rotational speed of the first hydraulic motor; and control circuitry configured to perform feedback control with respect to the secondary pressure control valve, the feedback control being performed to reduce a speed difference between the rotational speed detected and a target rotational speed of the first hydraulic motor corresponding to a target vehicle speed, wherein the control circuitry determines a feedback gain of the feedback control based on a first coefficient that increases as the target rotational speed decreases, and wherein an operated variable of the feedback control is to be input to the secondary pressure control valve.

13. A work vehicle comprising:

a vehicle body;

a first hydraulic motor configured to drive a first traveling device provided in the vehicle body;

a first hydraulic pump configured to supply hydraulic fluid to the first hydraulic motor;

a pilot pump configured to supply pilot oil toward a pilot port of the first hydraulic pump;

an engine configured to drive the first hydraulic pump and the pilot pump;

a travel instruction input device via which an instruction of a traveling direction is input by a user;

a pilot control valve configured to control a pilot pressure of the first hydraulic pump according to an operated variable of the travel instruction input device;

a first rotational speed sensor configured to detect a rotational speed of the first hydraulic motor; and control circuitry configured to perform feedback control with respect to the pilot control valve, the feedback control being performed to reduce a speed difference between the rotational speed detected and a target rotational speed of the first hydraulic motor corresponding to a target vehicle speed, wherein the control circuitry determines a feedback gain of the feedback control based on a first coefficient that increases as the target rotational speed decreases, and wherein an operated variable of the feedback control is an operated variable of the travel instruction input device.

* * * * *